US012106301B2

(12) United States Patent
Fortney et al.

(10) Patent No.: US 12,106,301 B2
(45) Date of Patent: Oct. 1, 2024

(54) SECURE PAYMENT PROCESSING

(71) Applicant: The Clearing House Payments Company L.L.C., New York, NY (US)

(72) Inventors: David Fortney, Winston-Salem, NC (US); Michael Meinolf, Mequon, WI (US)

(73) Assignee: The Clearing House Payments Company L.L.C., New York, NY (US)

( * ) Notice: Subject to any disclaimer, the term of this patent is extended or adjusted under 35 U.S.C. 154(b) by 0 days.

(21) Appl. No.: 18/487,990

(22) Filed: Oct. 16, 2023

(65) Prior Publication Data
US 2024/0119453 A1    Apr. 11, 2024

Related U.S. Application Data

(60) Continuation of application No. 17/685,983, filed on Mar. 3, 2022, now Pat. No. 11,816,666, which is a
(Continued)

(51) Int. Cl.
*G06Q 20/00* (2012.01)
*G06Q 20/10* (2012.01)
(Continued)

(52) U.S. Cl.
CPC ....... *G06Q 20/4012* (2013.01); *G06Q 20/105* (2013.01); *G06Q 20/36* (2013.01); *G06Q 20/3821* (2013.01)

(58) Field of Classification Search
CPC .. G06Q 20/4012; G06Q 20/105; G06Q 20/36; G06Q 20/3821; G06Q 20/027; G06Q 20/385; G06Q 20/425; G06Q 20/351
(Continued)

(56) References Cited

U.S. PATENT DOCUMENTS 3,852,571 A   12/1974 Hal et al.
4,201,978 A    5/1980 Nally
(Continued)

FOREIGN PATENT DOCUMENTS

CA    2131667 A1    6/1995
EP    0 029 733 A2  6/1981
(Continued)

OTHER PUBLICATIONS

250 U.S. Banks to Use NCR, Cincinnati Bell Financial Systems, AT&T News Release, http://www.att.com/news/0593/930504.ncd.html, 2 pages (May 4, 1993).
(Continued)

*Primary Examiner* — Dante Ravetti
(74) *Attorney, Agent, or Firm* — Merchant & Gould P.C.

(57) ABSTRACT

Systems and methods for secure payment processing are disclosed. An issuer vault generates payment items, which correspond to consumer account information and which replicate the structure of the account information but do not include consumers' actual account number. The payment items, rather than the actual account information, are communicated to on-line and mobile payment services for use by consumers in payment transactions. When a consumer uses a payment item in a payment transaction and the transaction undergoes authorization processing, the payment authorization network uses the payment item to request and receive the actual account information from the issuer vault. The authorization network uses the actual account information for the limited use of authorizing the transaction. Once the transaction has been authorized using the actual account information, the processing of the transaction continues using the payment item information rather than the actual account information.

20 Claims, 19 Drawing Sheets

Related U.S. Application Data division of application No. 14/926,112, filed on Oct. 29, 2015, now Pat. No. 11,295,308.

(60) Provisional application No. 62/072,021, filed on Oct. 29, 2014.

(51) Int. Cl.
  *G06Q 20/36* (2012.01)
  *G06Q 20/38* (2012.01)
  *G06Q 20/40* (2012.01)

(58) Field of Classification Search
  USPC .......... 705/16, 21, 59; 380/44, 262, 278
  See application file for complete search history.

(56) References Cited

U.S. PATENT DOCUMENTS

| | | |
|---|---|---|
| 4,205,780 A | 6/1980 | Burns et al. |
| 4,264,808 A | 4/1981 | Owens et al. |
| 4,268,715 A | 5/1981 | Atalla |
| 4,270,042 A | 5/1981 | Case |
| 4,321,672 A | 3/1982 | Braun et al. |
| 4,326,258 A | 4/1982 | de la Guardia |
| 4,404,649 A | 9/1983 | Nunley et al. |
| 4,417,136 A | 11/1983 | Rushby et al. |
| 4,457,015 A | 6/1984 | Nally et al. |
| 4,491,725 A | 1/1985 | Pritchard |
| 4,500,750 A | 2/1985 | Elander et al. |
| 4,523,330 A | 6/1985 | Cain |
| 4,555,617 A | 11/1985 | Brooks et al. |
| 4,578,530 A | 3/1986 | Zeidler |
| 4,602,936 A | 7/1986 | Topfl et al. |
| 4,617,457 A | 10/1986 | Granzow et al. |
| 4,652,990 A | 3/1987 | Pailen et al. |
| 4,672,377 A | 6/1987 | Murphy et al. |
| 4,673,802 A | 6/1987 | Ohmae et al. |
| 4,675,815 A | 6/1987 | Kuroki et al. |
| 4,680,803 A | 7/1987 | Dilella |
| 4,694,147 A | 9/1987 | Amemiya et al. |
| 4,723,283 A | 2/1988 | Nagasawa et al. |
| 4,745,267 A | 5/1988 | Davis et al. |
| 4,747,058 A | 5/1988 | Ho |
| 4,748,557 A | 5/1988 | Tamada et al. |
| 4,750,201 A | 6/1988 | Hodgson et al. |
| 4,755,940 A | 7/1988 | Brachtl et al. |
| 4,757,543 A | 7/1988 | Tamada et al. |
| 4,758,530 A | 7/1988 | Schubert |
| 4,771,460 A | 9/1988 | Tamada et al. |
| 4,799,156 A | 1/1989 | Shavit et al. |
| 4,810,866 A | 3/1989 | Lord, Jr. |
| 4,823,264 A | 4/1989 | Deming |
| 4,843,220 A | 6/1989 | Haun |
| 4,858,121 A | 8/1989 | Barber et al. |
| 4,882,779 A | 11/1989 | Rahtgen |
| 4,888,812 A | 12/1989 | Dinan et al. |
| 4,910,774 A | 3/1990 | Barakat |
| 4,912,762 A | 3/1990 | Lee et al. |
| 4,922,503 A | 5/1990 | Leone |
| 4,926,325 A | 5/1990 | Benton et al. |
| 4,941,125 A | 7/1990 | Boyne |
| 4,960,981 A | 10/1990 | Benton et al. |
| 4,961,142 A | 10/1990 | Elliott et al. |
| 4,962,531 A | 10/1990 | Sipman et al. |
| 4,977,595 A | 12/1990 | Ohta et al. |
| 4,985,921 A | 1/1991 | Schwartz |
| 5,003,594 A | 3/1991 | Shinagawa |
| 5,014,311 A | 5/1991 | Schrenk |
| 5,016,277 A | 5/1991 | Hamilton |
| 5,053,607 A | 10/1991 | Carlson et al. |
| 5,054,096 A | 10/1991 | Beizer |
| 5,081,680 A | 1/1992 | Bennett |
| 5,091,968 A | 2/1992 | Higgins et al. |
| 5,093,787 A | 3/1992 | Simmons |
| 5,095,480 A | 3/1992 | Fenner |
| 5,111,395 A | 5/1992 | Smith et al. |
| 5,122,950 A | 6/1992 | Benton et al. |
| 5,123,047 A | 6/1992 | Rosenow |
| 5,144,115 A | 9/1992 | Yoshida |
| 5,159,548 A | 10/1992 | Caslavka |
| 5,159,592 A | 10/1992 | Perkins |
| 5,163,098 A | 11/1992 | Dahbura |
| 5,168,444 A | 12/1992 | Cukor et al. |
| 5,170,466 A | 12/1992 | Rogan et al. |
| 5,173,594 A | 12/1992 | McClure |
| 5,175,682 A | 12/1992 | Higashiyama et al. |
| 5,175,766 A | 12/1992 | Hamilton |
| 5,185,798 A | 2/1993 | Hamada et al. |
| 5,187,750 A | 2/1993 | Behera |
| 5,195,133 A | 3/1993 | Kapp et al. |
| 5,198,975 A | 3/1993 | Baker et al. |
| 5,200,993 A | 4/1993 | Wheeler et al. |
| 5,204,811 A | 4/1993 | Bednar et al. |
| 5,214,697 A | 5/1993 | Saito |
| 5,220,501 A | 6/1993 | Lawlor et al. |
| 5,231,569 A | 7/1993 | Myatt et al. |
| 5,233,547 A | 8/1993 | Kapp et al. |
| 5,233,656 A | 8/1993 | Langrand et al. |
| 5,235,433 A | 8/1993 | Clarkson et al. |
| 5,237,158 A | 8/1993 | Kern et al. |
| 5,237,159 A | 8/1993 | Stephens et al. |
| 5,237,620 A | 8/1993 | Deaton et al. |
| 5,241,600 A | 8/1993 | Hillis |
| 5,256,863 A | 10/1993 | Ferguson et al. |
| 5,259,025 A | 11/1993 | Monroe et al. |
| 5,262,942 A | 11/1993 | Earle |
| 5,265,007 A | 11/1993 | Barnhard, Jr. et al. |
| 5,274,567 A | 12/1993 | Kallin et al. |
| 5,283,829 A | 2/1994 | Anderson |
| 5,287,497 A | 2/1994 | Behera |
| 5,317,637 A | 5/1994 | Pichlmaier et al. |
| 5,321,238 A | 6/1994 | Kamata et al. |
| 5,321,751 A | 6/1994 | Ray et al. |
| 5,321,816 A | 6/1994 | Rogan et al. |
| 5,326,959 A | 7/1994 | Perazza |
| 5,329,589 A | 7/1994 | Fraser et al. |
| 5,337,358 A | 8/1994 | Axelrod et al. |
| 5,341,428 A | 8/1994 | Schatz |
| 5,343,529 A | 8/1994 | Goldfine et al. |
| 5,345,090 A | 9/1994 | Hludzinski |
| 5,373,550 A | 12/1994 | Campbell et al. |
| 5,383,113 A | 1/1995 | Kight et al. |
| 5,396,558 A | 3/1995 | Ishiguro et al. |
| 5,408,531 A | 4/1995 | Nakajima |
| 5,412,190 A | 5/1995 | Josephson et al. |
| 5,426,281 A | 6/1995 | Abecassis |
| 5,434,928 A | 7/1995 | Wagner et al. |
| 5,436,970 A | 7/1995 | Ray et al. |
| 5,440,634 A | 8/1995 | Jones et al. |
| 5,444,794 A | 8/1995 | Uhland, Sr. |
| 5,446,796 A | 8/1995 | Ishiguro et al. |
| 5,453,601 A | 9/1995 | Rosen |
| 5,454,575 A | 10/1995 | Del Buono |
| 5,455,407 A | 10/1995 | Rosen |
| 5,457,747 A | 10/1995 | Drexler et al. |
| 5,465,206 A | 11/1995 | Hilt et al. |
| 5,473,143 A | 12/1995 | Vak et al. |
| 5,479,510 A | 12/1995 | Olsen et al. |
| 5,484,988 A | 1/1996 | Hills et al. |
| 5,497,317 A | 3/1996 | Hawkins et al. |
| 5,502,765 A | 3/1996 | Ishiguro et al. |
| 5,506,691 A | 4/1996 | Bednar et al. |
| 5,523,167 A | 6/1996 | Hunt et al. |
| 5,524,073 A | 6/1996 | Stambler |
| 5,528,705 A | 6/1996 | Reasoner, Jr. et al. |
| 5,532,464 A | 7/1996 | Josephson et al. |
| 5,539,822 A | 7/1996 | Lett |
| 5,539,825 A | 7/1996 | Akiyama et al. |
| 5,544,043 A | 8/1996 | Miki et al. |
| 5,544,255 A | 8/1996 | Smithies et al. |
| 5,557,518 A | 9/1996 | Rosen |
| 5,577,121 A | 11/1996 | Davis et al. |
| 5,590,038 A | 12/1996 | Pitroda |
| 5,594,226 A | 1/1997 | Steger |

(56) References Cited

U.S. PATENT DOCUMENTS

| | | |
|---|---|---|
| 5,596,642 A | 1/1997 | Davis et al. |
| 5,602,933 A | 2/1997 | Blackwell et al. |
| 5,602,936 A | 2/1997 | Green et al. |
| 5,604,640 A | 2/1997 | Zipf et al. |
| 5,604,802 A | 2/1997 | Holloway |
| 5,608,800 A | 3/1997 | Hoffmann et al. |
| 5,613,001 A | 3/1997 | Bakhoum |
| 5,615,269 A | 3/1997 | Micali |
| 5,621,796 A | 4/1997 | Davis et al. |
| 5,621,797 A | 4/1997 | Rosen |
| 5,623,547 A | 4/1997 | Jones et al. |
| 5,625,694 A | 4/1997 | Lee et al. |
| 5,629,981 A | 5/1997 | Nerlikar |
| 5,633,930 A | 5/1997 | Davis et al. |
| 5,642,419 A | 6/1997 | Rosen |
| 5,647,017 A | 7/1997 | Smithies et al. |
| 5,649,116 A | 7/1997 | McCoy et al. |
| 5,649,117 A | 7/1997 | Landry |
| 5,652,786 A | 7/1997 | Rogers |
| 5,657,389 A | 8/1997 | Houvener |
| 5,657,396 A | 8/1997 | Rudolph et al. |
| 5,659,616 A | 8/1997 | Sudia |
| 5,668,897 A | 9/1997 | Stolfo |
| 5,673,333 A | 9/1997 | Johnston |
| 5,677,955 A | 10/1997 | Doggett et al. |
| 5,682,549 A | 10/1997 | Tanaka et al. |
| 5,684,965 A | 11/1997 | Pickering |
| 5,691,524 A | 11/1997 | Josephson |
| 5,699,528 A | 12/1997 | Hogan |
| 5,703,344 A | 12/1997 | Bezy et al. |
| 5,708,810 A | 1/1998 | Kern et al. |
| 5,710,887 A | 1/1998 | Chelliah et al. |
| 5,715,298 A | 2/1998 | Rogers |
| 5,717,868 A | 2/1998 | James |
| 5,732,400 A | 3/1998 | Mandler et al. |
| 5,742,668 A | 4/1998 | Pepe et al. |
| 5,742,888 A | 4/1998 | Fuchiwaki et al. |
| 5,751,842 A | 5/1998 | Riach et al. |
| 5,754,673 A | 5/1998 | Brooks et al. |
| 5,760,916 A | 6/1998 | Dellert et al. |
| 5,778,178 A | 7/1998 | Arunachalam |
| 5,781,654 A | 7/1998 | Carney |
| 5,783,808 A | 7/1998 | Josephson |
| 5,784,503 A | 7/1998 | Bleecker, III et al. |
| 5,784,610 A | 7/1998 | Copeland, III et al. |
| 5,787,403 A | 7/1998 | Randle |
| 5,790,260 A | 8/1998 | Myers |
| 5,790,790 A | 8/1998 | Smith et al. |
| 5,793,869 A | 8/1998 | Claflin, Jr. |
| 5,832,460 A | 11/1998 | Bednar et al. |
| 5,832,463 A | 11/1998 | Funk |
| 5,832,464 A | 11/1998 | Houvener et al. |
| 5,848,400 A | 12/1998 | Chang |
| 5,857,034 A | 1/1999 | Tsuchiya et al. |
| 5,870,456 A | 2/1999 | Rogers |
| 5,870,724 A | 2/1999 | Lawlor et al. |
| 5,870,725 A | 2/1999 | Bellinger et al. |
| 5,873,072 A | 2/1999 | Kight et al. |
| 5,884,271 A | 3/1999 | Pitroda |
| 5,893,080 A | 4/1999 | McGurl et al. |
| 5,903,874 A | 5/1999 | Leonard et al. |
| 5,903,880 A | 5/1999 | Biffar |
| 5,903,881 A | 5/1999 | Schrader et al. |
| 5,910,988 A | 6/1999 | Ballard |
| 5,915,023 A | 6/1999 | Bernstein |
| 5,917,965 A | 6/1999 | Cahill et al. |
| 5,920,847 A | 7/1999 | Kolling et al. |
| 5,925,865 A | 7/1999 | Steger |
| 5,926,288 A | 7/1999 | Dellert et al. |
| 5,930,778 A | 7/1999 | Geer |
| 5,937,396 A | 8/1999 | Konya |
| 5,940,844 A | 8/1999 | Cahill et al. |
| 5,956,700 A | 9/1999 | Landry |
| 5,963,647 A | 10/1999 | Downing et al. |
| 5,963,925 A | 10/1999 | Kolling et al. |
| 5,973,731 A | 10/1999 | Schwab |
| 5,978,780 A | 11/1999 | Watson |
| 5,987,500 A | 11/1999 | Arunachalam |
| 5,999,625 A | 12/1999 | Bellare et al. |
| 6,006,208 A | 12/1999 | Forst et al. |
| 6,021,202 A | 2/2000 | Anderson et al. |
| 6,029,150 A | 2/2000 | Kravitz |
| 6,029,151 A | 2/2000 | Nikander |
| 6,032,133 A | 2/2000 | Hilt et al. |
| 6,032,137 A | 2/2000 | Ballard |
| 6,036,344 A | 3/2000 | Goldenberg |
| 6,047,051 A | 4/2000 | Ginzboorg et al. |
| 6,049,785 A | 4/2000 | Gifford |
| 6,049,786 A | 4/2000 | Smorodinsky |
| 6,055,567 A | 4/2000 | Ganesan et al. |
| 6,058,382 A | 5/2000 | Kasai et al. |
| 6,069,896 A | 5/2000 | Borgstahl et al. |
| 6,070,150 A | 5/2000 | Remington et al. |
| 6,076,068 A | 6/2000 | DeLapa et al. |
| 6,076,074 A | 6/2000 | Cotton et al. |
| 6,108,104 A | 8/2000 | Tesavis |
| 6,115,509 A | 9/2000 | Yeskel |
| 6,138,107 A | 10/2000 | Elgamal |
| 6,145,738 A | 11/2000 | Stinson et al. |
| 6,173,272 B1 | 1/2001 | Thomas et al. |
| 6,181,837 B1 | 1/2001 | Cahill et al. |
| 6,189,785 B1 | 2/2001 | Lowery |
| 6,192,142 B1 | 2/2001 | Pare, Jr. et al. |
| 6,192,407 B1 | 2/2001 | Smith et al. |
| 6,199,077 B1 | 3/2001 | Inala et al. |
| 6,202,054 B1 | 3/2001 | Lawlor et al. |
| 6,209,095 B1 | 3/2001 | Anderson et al. |
| 6,212,556 B1 | 4/2001 | Arunachalam |
| 6,223,168 B1 | 4/2001 | McGurl et al. |
| 6,230,148 B1 | 5/2001 | Pare, Jr. et al. |
| 6,243,689 B1 | 6/2001 | Norton |
| 6,260,024 B1 | 7/2001 | Shkedy |
| 6,269,348 B1 | 7/2001 | Pare, Jr. et al. |
| 6,278,993 B1 | 8/2001 | Kumar et al. |
| 6,282,523 B1 | 8/2001 | Tedesco et al. |
| 6,283,366 B1 | 9/2001 | Hills et al. |
| 6,285,991 B1 | 9/2001 | Powar |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,857 B1 | 10/2001 | Heindel et al. |
| 6,317,745 B1 | 11/2001 | Thomas et al. |
| 6,317,783 B1 | 11/2001 | Freishtat et al. |
| 6,324,525 B1 | 11/2001 | Kramer et al. |
| 6,324,526 B1 | 11/2001 | D'Agostino |
| 6,327,577 B1 | 12/2001 | Garrison et al. |
| 6,330,544 B1 | 12/2001 | Walker et al. |
| 6,334,116 B1 | 12/2001 | Ganesan et al. |
| 6,338,050 B1 | 1/2002 | Conklin et al. |
| 6,351,553 B1 | 2/2002 | Hayosh |
| 6,353,811 B1 | 3/2002 | Weissman |
| 6,363,362 B1 | 3/2002 | Burfield et al. |
| 6,385,595 B1 | 5/2002 | Kolling et al. |
| 6,385,652 B1 | 5/2002 | Brown et al. |
| 6,405,245 B1 | 6/2002 | Burson et al. |
| 6,408,284 B1 | 6/2002 | Hilt et al. |
| 6,411,939 B1 | 6/2002 | Parsons |
| 6,412,073 B1 | 6/2002 | Rangan |
| 6,438,527 B1 | 8/2002 | Powar |
| 6,442,590 B1 | 8/2002 | Inala et al. |
| 6,477,565 B1 | 11/2002 | Daswani et al. |
| 6,493,685 B1 | 12/2002 | Ensel et al. |
| 6,510,451 B2 | 1/2003 | Wu et al. |
| 6,517,587 B2 | 2/2003 | Satyavolu et al. |
| 6,553,346 B1 | 4/2003 | Walker et al. |
| 6,567,850 B1 | 5/2003 | Freishtat et al. |
| 6,574,377 B1 | 6/2003 | Cahill et al. |
| 6,578,015 B1 | 6/2003 | Haseltine et al. |
| 6,594,647 B1 | 7/2003 | Randle et al. |
| 6,594,766 B2 | 7/2003 | Rangan et al. |
| 6,633,910 B1 | 10/2003 | Rajan et al. |
| 6,647,376 B1 | 11/2003 | Farrar et al. |
| 6,678,664 B1 | 1/2004 | Ganesan |
| 6,694,300 B1 | 2/2004 | Walker et al. |

(56) References Cited

U.S. PATENT DOCUMENTS

| | | |
|---|---|---|
| 6,725,425 B1 | 4/2004 | Rajan et al. |
| 6,738,804 B1 | 5/2004 | Lo |
| 6,748,367 B1 | 6/2004 | Lee |
| 6,802,042 B2 | 10/2004 | Rangan et al. |
| 6,826,545 B2 | 11/2004 | Kawashima et al. |
| 6,842,782 B1 | 1/2005 | Malik et al. |
| 6,856,974 B1 | 2/2005 | Ganesan et al. |
| 6,856,975 B1 | 2/2005 | Inglis |
| 6,859,212 B2 | 2/2005 | Kumar et al. |
| 6,863,214 B2 | 3/2005 | Garner, IV et al. |
| 6,865,680 B1 | 3/2005 | Wu et al. |
| 6,871,220 B1 | 3/2005 | Rajan et al. |
| 6,910,023 B1 | 6/2005 | Schibi |
| 6,932,268 B1 | 8/2005 | McCoy et al. |
| 6,934,691 B1 | 8/2005 | Simpson et al. |
| 6,945,453 B1 | 9/2005 | Schwarz, Jr. |
| 6,948,063 B1 | 9/2005 | Ganesan et al. |
| 6,968,319 B1 | 11/2005 | Remington et al. |
| 6,980,973 B1 | 12/2005 | Karpenko |
| 6,996,542 B1 | 2/2006 | Landry |
| 7,004,382 B2 | 2/2006 | Sandru |
| 7,013,310 B2 | 3/2006 | Messing et al. |
| 7,028,008 B2 | 4/2006 | Powar |
| 7,028,886 B1 | 4/2006 | Maloney |
| 7,039,656 B1 | 5/2006 | Tsai et al. |
| 7,076,458 B2 | 7/2006 | Lawlor et al. |
| 7,085,997 B1 | 8/2006 | Wu et al. |
| 7,089,208 B1 | 8/2006 | Levchin et al. |
| 7,099,845 B2 | 8/2006 | Higgins et al. |
| 7,107,244 B2 | 9/2006 | Kight et al. |
| 7,110,969 B1 | 9/2006 | Bennett et al. |
| 7,110,993 B2 | 9/2006 | Soulanille et al. |
| 7,120,602 B2 | 10/2006 | Kitchen et al. |
| 7,146,338 B2 | 12/2006 | Kight et al. |
| 7,155,508 B2 | 12/2006 | Sankuratripati et al. |
| 7,158,955 B2 | 1/2007 | Diveley et al. |
| 7,165,052 B2 | 1/2007 | Diveley et al. |
| 7,165,723 B2 | 1/2007 | McGlamery et al. |
| 7,167,711 B1 | 1/2007 | Dennis |
| 7,175,074 B2 | 2/2007 | Mejias et al. |
| 7,177,846 B2 | 2/2007 | Moenickheim et al. |
| 7,178,096 B2 | 2/2007 | Rangan et al. |
| 7,181,430 B1 | 2/2007 | Buchanan et al. |
| 7,191,150 B1 | 3/2007 | Shao et al. |
| 7,191,151 B1 | 3/2007 | Nosek |
| 7,200,551 B1 | 4/2007 | Senez |
| 7,200,804 B1 | 4/2007 | Khavari et al. |
| 7,203,845 B2 | 4/2007 | Sokolic et al. |
| 7,213,003 B1 | 5/2007 | Kight et al. |
| 7,225,156 B2 | 5/2007 | Fisher et al. |
| 7,225,464 B2 | 5/2007 | Satyavolu et al. |
| 7,236,950 B2 | 6/2007 | Savage et al. |
| 7,240,031 B1 | 7/2007 | Kight et al. |
| 7,249,080 B1 | 7/2007 | Hoffman et al. |
| 7,249,094 B2 | 7/2007 | Levchin et al. |
| 7,251,656 B2 | 7/2007 | Keown et al. |
| 7,263,548 B2 | 8/2007 | Daswani et al. |
| 7,296,004 B1 | 11/2007 | Garrison et al. |
| 7,302,408 B2 | 11/2007 | Engdahl et al. |
| 7,302,411 B2 | 11/2007 | Ganesan et al. |
| 7,308,426 B1 | 12/2007 | Pitroda |
| 7,313,813 B2 | 12/2007 | Rangan et al. |
| 7,321,874 B2 | 1/2008 | Dilip et al. |
| 7,321,875 B2 | 1/2008 | Dilip et al. |
| 7,330,831 B2 | 2/2008 | Biondi et al. |
| 7,334,128 B2 | 2/2008 | Ganesan et al. |
| 7,356,502 B1 | 4/2008 | LaBadie et al. |
| 7,366,696 B1 | 4/2008 | Ganesan et al. |
| 7,366,697 B2 | 4/2008 | Kitchen et al. |
| 7,370,014 B1 | 5/2008 | Vasavada et al. |
| 7,383,223 B1 | 6/2008 | Dilip et al. |
| 7,383,226 B2 | 6/2008 | Kight et al. |
| 7,392,223 B1 | 6/2008 | Ganesan et al. |
| 7,395,319 B2 | 7/2008 | Harris et al. |
| 7,415,610 B2 | 8/2008 | Ganesan et al. |
| 7,424,520 B2 | 9/2008 | Daswani et al. |
| 7,426,638 B2 | 9/2008 | Ganesan et al. |
| 7,447,347 B2 | 11/2008 | Weber |
| 7,474,779 B2 | 1/2009 | Duncan |
| 7,490,063 B2 | 2/2009 | Garrison et al. |
| 7,502,749 B2 | 3/2009 | Ganesan et al. |
| 7,505,937 B2 | 3/2009 | Dilip et al. |
| 7,526,448 B2 | 4/2009 | Zielke et al. |
| 7,533,058 B2 | 5/2009 | Kulakowski |
| 7,536,340 B2 | 5/2009 | Dheer et al. |
| 7,558,795 B2 | 7/2009 | Malik et al. |
| 7,606,752 B2 | 10/2009 | Hazlehurst et al. |
| 7,606,787 B2 | 10/2009 | Keown et al. |
| 7,610,245 B2 | 10/2009 | Dent et al. |
| 7,636,686 B2 | 12/2009 | Pierdinock et al. |
| 7,636,688 B2 | 12/2009 | Kitchen et al. |
| 7,640,197 B1 | 12/2009 | Gentry et al. |
| 7,644,023 B2 | 1/2010 | Kumar et al. |
| 7,644,036 B2 | 1/2010 | McCoy et al. |
| 7,653,598 B1 | 1/2010 | Hamilton et al. |
| 7,657,484 B2 | 2/2010 | Ganesan et al. |
| 7,660,766 B1 | 2/2010 | Lawson et al. |
| 7,672,879 B1 | 3/2010 | Kumar et al. |
| 7,685,525 B2 | 3/2010 | Kumar et al. |
| 7,693,790 B2 | 4/2010 | Lawlor et al. |
| 7,702,583 B1 | 4/2010 | Hamilton et al. |
| 7,702,585 B2 | 4/2010 | Lyda et al. |
| 7,711,626 B2 | 5/2010 | Nanjundamoorthy et al. |
| 7,711,690 B1 | 5/2010 | Garrison et al. |
| 7,725,389 B1 | 5/2010 | D'Aquisto et al. |
| 7,729,283 B2 | 6/2010 | Ferguson et al. |
| 7,729,969 B1 | 6/2010 | Smith, III et al. |
| 7,729,996 B2 | 6/2010 | Zito |
| 7,734,541 B2 | 6/2010 | Kumar et al. |
| 7,752,130 B2 | 7/2010 | Byrd et al. |
| 7,752,535 B2 | 7/2010 | Satyavolu |
| 7,778,901 B2 | 8/2010 | Ganesan et al. |
| 7,788,172 B2 | 8/2010 | Kight et al. |
| 7,792,749 B2 | 9/2010 | Ganesan |
| 7,886,156 B2 | 2/2011 | Franchi |
| 7,979,348 B2 | 7/2011 | Thomas et al. |
| 8,032,932 B2 | 10/2011 | Speyer et al. |
| 8,073,772 B2 | 12/2011 | Bishop et al. |
| 8,327,429 B2 | 12/2012 | Speyer et al. |
| 8,369,601 B2 | 2/2013 | Lugg |
| 8,423,453 B1 | 4/2013 | Elliott |
| 8,688,580 B1 | 4/2014 | Guenther et al. |
| 8,725,607 B2 | 5/2014 | Dunn et al. |
| 8,725,609 B2 | 5/2014 | Pawelczyk et al. |
| 9,135,620 B2 | 9/2015 | Chen et al. |
| 9,195,984 B1 | 11/2015 | Spector et al. |
| 9,264,902 B1 | 2/2016 | Ward et al. |
| 9,600,817 B2 | 3/2017 | Bondesen et al. |
| 9,693,234 B2 | 6/2017 | Cook |
| 9,715,689 B1 | 7/2017 | Ellis et al. |
| 9,741,037 B2 | 8/2017 | Garlick et al. |
| 9,799,011 B2 | 10/2017 | Dunn et al. |
| 10,262,306 B2 | 4/2019 | Pawelczyk et al. |
| 10,387,879 B2 | 8/2019 | Thomas et al. |
| 10,636,018 B2 | 4/2020 | Dunn et al. |
| 10,643,190 B2 | 5/2020 | Dunn et al. |
| 10,685,337 B2 | 6/2020 | Dunn et al. |
| 11,042,882 B2 | 6/2021 | Ledford et al. |
| 11,295,308 B1 | 4/2022 | Fortney et al. |
| 11,301,824 B2 | 4/2022 | Dunn et al. |
| 11,436,577 B2 | 9/2022 | Davey et al. |
| 11,694,168 B2 | 7/2023 | Ledford et al. |
| 11,816,666 B2 | 11/2023 | Fortney et al. |
| 11,829,967 B2 | 11/2023 | Davey et al. |
| 2001/0000537 A1 | 4/2001 | Inala et al. |
| 2001/0016034 A1 | 8/2001 | Singh et al. |
| 2001/0023414 A1 | 9/2001 | Kumar et al. |
| 2001/0024157 A1 | 9/2001 | Hansmann et al. |
| 2001/0032182 A1 | 10/2001 | Kumar et al. |
| 2001/0032183 A1 | 10/2001 | Landry |
| 2001/0051907 A1 | 12/2001 | Kumar et al. |
| 2002/0002536 A1 | 1/2002 | Braco |
| 2002/0007323 A1 | 1/2002 | Tamatsu |
| 2002/0010612 A1 | 1/2002 | Smith et al. |

(56) References Cited

U.S. PATENT DOCUMENTS

| | | |
|---|---|---|
| 2002/0010677 A1 | 1/2002 | Kitchen et al. |
| 2002/0015480 A1 | 2/2002 | Daswani et al. |
| 2002/0019808 A1 | 2/2002 | Sharma |
| 2002/0019809 A1 | 2/2002 | Kitchen et al. |
| 2002/0023108 A1 | 2/2002 | Daswani et al. |
| 2002/0046167 A1 | 4/2002 | Kitchen et al. |
| 2002/0046168 A1 | 4/2002 | Kitchen et al. |
| 2002/0049671 A1 | 4/2002 | Trende et al. |
| 2002/0049672 A1 | 4/2002 | Kitchen et al. |
| 2002/0052840 A1 | 5/2002 | Kitchen et al. |
| 2002/0059139 A1 | 5/2002 | Evans |
| 2002/0059369 A1 | 5/2002 | Kern et al. |
| 2002/0062282 A1 | 5/2002 | Kight et al. |
| 2002/0065773 A1 | 5/2002 | Kight et al. |
| 2002/0069161 A1 | 6/2002 | Eckert et al. |
| 2002/0077952 A1 | 6/2002 | Eckert et al. |
| 2002/0077961 A1 | 6/2002 | Eckert et al. |
| 2002/0077978 A1 | 6/2002 | O'Leary et al. |
| 2002/0087454 A1 | 7/2002 | Calo et al. |
| 2002/0087455 A1 | 7/2002 | Tsagarakis et al. |
| 2002/0087461 A1 | 7/2002 | Ganesan et al. |
| 2002/0087465 A1 | 7/2002 | Ganesan et al. |
| 2002/0091635 A1 | 7/2002 | Dilip et al. |
| 2002/0111886 A1 | 8/2002 | Chenevich et al. |
| 2002/0128964 A1 | 9/2002 | Baker et al. |
| 2002/0128968 A1 | 9/2002 | Kitchen et al. |
| 2002/0143655 A1 | 10/2002 | Elston et al. |
| 2002/0174048 A1 | 11/2002 | Dheer et al. |
| 2002/0184144 A1 | 12/2002 | Byrd et al. |
| 2002/0194137 A1 | 12/2002 | Park et al. |
| 2003/0014489 A1 | 1/2003 | Inala et al. |
| 2003/0018571 A1 | 1/2003 | Eckert et al. |
| 2003/0023552 A1 | 1/2003 | Kight et al. |
| 2003/0037002 A1 | 2/2003 | Higgins et al. |
| 2003/0089768 A1 | 5/2003 | Page |
| 2003/0120774 A1 | 6/2003 | Satyavolu et al. |
| 2003/0126075 A1 | 7/2003 | Mascavage, III et al. |
| 2003/0158811 A1 | 8/2003 | Sanders et al. |
| 2003/0182206 A1 | 9/2003 | Hendrix et al. |
| 2003/0187925 A1 | 10/2003 | Inala et al. |
| 2003/0191701 A1 | 10/2003 | Haseltine et al. |
| 2003/0191711 A1 | 10/2003 | Jamison et al. |
| 2003/0191832 A1 | 10/2003 | Satyavolu et al. |
| 2003/0195844 A1 | 10/2003 | Hogan |
| 2003/0208421 A1 | 11/2003 | Vicknair et al. |
| 2003/0208441 A1 | 11/2003 | Poplawski et al. |
| 2003/0225705 A1 | 12/2003 | Park et al. |
| 2003/0236728 A1 | 12/2003 | Sunderji et al. |
| 2004/0034594 A1 | 2/2004 | Thomas et al. |
| 2004/0039701 A1 | 2/2004 | Nakamura et al. |
| 2004/0059671 A1 | 3/2004 | Nozaki et al. |
| 2004/0059672 A1 | 3/2004 | Baig et al. |
| 2004/0059673 A1 | 3/2004 | Kitchen et al. |
| 2004/0064407 A1 | 4/2004 | Kight et al. |
| 2004/0064408 A1 | 4/2004 | Kight et al. |
| 2004/0064409 A1 | 4/2004 | Kight et al. |
| 2004/0064410 A1 | 4/2004 | Kight et al. |
| 2004/0071333 A1 | 4/2004 | Douglas et al. |
| 2004/0078423 A1 | 4/2004 | Satyavolu et al. |
| 2004/0078464 A1 | 4/2004 | Rajan et al. |
| 2004/0083167 A1 | 4/2004 | Kight et al. |
| 2004/0083171 A1 | 4/2004 | Kight et al. |
| 2004/0088235 A1 | 5/2004 | Ziekle et al. |
| 2004/0093305 A1 | 5/2004 | Kight et al. |
| 2004/0133515 A1 | 7/2004 | McCoy et al. |
| 2004/0139005 A1 | 7/2004 | Ganesan |
| 2004/0139009 A1 | 7/2004 | Kozee et al. |
| 2004/0139010 A1 | 7/2004 | McMichael et al. |
| 2004/0139011 A1 | 7/2004 | Kozee et al. |
| 2004/0143552 A1 | 7/2004 | Weichert et al. |
| 2004/0148235 A1 | 7/2004 | Craig et al. |
| 2004/0148252 A1 | 7/2004 | Fleishman |
| 2004/0215543 A1 | 10/2004 | Betz et al. |
| 2004/0225609 A1 | 11/2004 | Greene |
| 2004/0236653 A1 | 11/2004 | Sokolic et al. |
| 2004/0236681 A1 | 11/2004 | Modigliani et al. |
| 2005/0010483 A1 | 1/2005 | Ling |
| 2005/0010523 A1 | 1/2005 | Myklebust et al. |
| 2005/0086136 A1 | 4/2005 | Love et al. |
| 2005/0086165 A1 | 4/2005 | Pawelczyk et al. |
| 2005/0119971 A1 | 6/2005 | Zito |
| 2005/0137960 A1 | 6/2005 | Brann et al. |
| 2005/0137978 A1 | 6/2005 | Ganesan et al. |
| 2005/0149439 A1 | 7/2005 | Suisa |
| 2005/0154923 A1 | 7/2005 | Lok et al. |
| 2005/0165695 A1 | 7/2005 | Berardi et al. |
| 2005/0171899 A1 | 8/2005 | Dunn et al. |
| 2005/0171900 A1 | 8/2005 | Onneken |
| 2005/0177505 A1 | 8/2005 | Keeling et al. |
| 2005/0182720 A1 | 8/2005 | Willard et al. |
| 2005/0187867 A1 | 8/2005 | Sokolic et al. |
| 2005/0192901 A1 | 9/2005 | McCoy et al. |
| 2005/0198377 A1 | 9/2005 | Ferguson et al. |
| 2005/0203835 A1 | 9/2005 | Nhaissi et al. |
| 2005/0203844 A1 | 9/2005 | Ferguson et al. |
| 2005/0210297 A1 | 9/2005 | Wu et al. |
| 2005/0222954 A1 | 10/2005 | Keown et al. |
| 2006/0047724 A1 | 3/2006 | Messing et al. |
| 2006/0106717 A1 | 5/2006 | Randle et al. |
| 2006/0136595 A1 | 6/2006 | Satyavolu |
| 2006/0184451 A1 | 8/2006 | Ganesan et al. |
| 2006/0195398 A1 | 8/2006 | Dheer et al. |
| 2006/0206425 A1 | 9/2006 | Sharma |
| 2006/0230343 A1 | 10/2006 | Armandpour et al. |
| 2006/0253340 A1 | 11/2006 | Levchin et al. |
| 2006/0253463 A1 | 11/2006 | Wu et al. |
| 2006/0282381 A1 | 12/2006 | Ritchie |
| 2007/0011090 A1 | 1/2007 | Baker et al. |
| 2007/0067239 A1 | 3/2007 | Dheer et al. |
| 2007/0088821 A1 | 4/2007 | Sankuratripati et al. |
| 2007/0094151 A1 | 4/2007 | Moenickheim et al. |
| 2007/0100748 A1 | 5/2007 | Dheer et al. |
| 2007/0106612 A1 | 5/2007 | O'Brien et al. |
| 2007/0121840 A1 | 5/2007 | Ganesan et al. |
| 2007/0125840 A1 | 6/2007 | Law et al. |
| 2007/0130347 A1 | 6/2007 | Rangan et al. |
| 2007/0131758 A1 | 6/2007 | Mejias et al. |
| 2007/0156584 A1 | 7/2007 | Barnes et al. |
| 2007/0162769 A1 | 7/2007 | Sokolic et al. |
| 2007/0179885 A1 | 8/2007 | Bird et al. |
| 2007/0180380 A1 | 8/2007 | Khavari et al. |
| 2007/0208645 A1 | 9/2007 | Hoffman et al. |
| 2007/0230371 A1 | 10/2007 | Tumminaro |
| 2007/0233615 A1 | 10/2007 | Tumminaro |
| 2007/0239601 A1 | 10/2007 | Ganesan et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0027874 A1 | 1/2008 | Monseignat et al. |
| 2008/0032741 A1 | 2/2008 | Tumminaro |
| 2008/0033878 A1 | 2/2008 | Krikorian et al. |
| 2008/0052226 A1 | 2/2008 | Agarwal et al. |
| 2008/0082454 A1 | 4/2008 | Dilip et al. |
| 2008/0086403 A1 | 4/2008 | Dilip et al. |
| 2008/0086426 A1 | 4/2008 | Dilip et al. |
| 2008/0091663 A1 | 4/2008 | Inala et al. |
| 2008/0097899 A1 | 4/2008 | Jackson et al. |
| 2008/0133407 A1 | 6/2008 | Guillory et al. |
| 2008/0263069 A1 | 10/2008 | Harris et al. |
| 2008/0275816 A1 | 11/2008 | Hazlehurst |
| 2008/0288376 A1 | 11/2008 | Panthaki et al. |
| 2008/0288400 A1 | 11/2008 | Panthaki et al. |
| 2008/0301022 A1 | 12/2008 | Patel et al. |
| 2008/0301023 A1 | 12/2008 | Patel et al. |
| 2008/0306846 A1 | 12/2008 | Ferguson |
| 2008/0319880 A1 | 12/2008 | D'Aquisto et al. |
| 2009/0006205 A1 | 1/2009 | Bixler et al. |
| 2009/0006582 A1 | 1/2009 | Daswani et al. |
| 2009/0024505 A1 | 1/2009 | Patel et al. |
| 2009/0063197 A1 | 3/2009 | Lisle |
| 2009/0076950 A1 | 3/2009 | Chang et al. |

(56) References Cited

U.S. PATENT DOCUMENTS

| | | |
|---|---|---|
| 2009/0119190 A1 | 5/2009 | Realini |
| 2009/0125446 A1 | 5/2009 | Saunders et al. |
| 2009/0132289 A1 | 5/2009 | Stenman et al. |
| 2009/0138394 A1 | 5/2009 | Garrison et al. |
| 2009/0222369 A1 | 9/2009 | Zoldi et al. |
| 2009/0265241 A1 | 10/2009 | Bishop et al. |
| 2009/0265774 A1 | 10/2009 | Malik et al. |
| 2009/0271854 A1 | 10/2009 | Hazlehurst et al. |
| 2009/0287601 A1 | 11/2009 | Tumminaro et al. |
| 2009/0287613 A1 | 11/2009 | Pierdinock et al. |
| 2009/0319410 A1 | 12/2009 | Kight et al. |
| 2009/0319425 A1 | 12/2009 | Tumminaro et al. |
| 2010/0004990 A1 | 1/2010 | Hazlehurst et al. |
| 2010/0005025 A1 | 1/2010 | Kumar et al. |
| 2010/0017332 A1 | 1/2010 | Kight et al. |
| 2010/0030687 A1 | 2/2010 | Panthaki et al. |
| 2010/0100462 A1 | 4/2010 | Lyda et al. |
| 2010/0100466 A1 | 4/2010 | Garrison et al. |
| 2010/0100467 A1 | 4/2010 | McCoy et al. |
| 2010/0138243 A1 | 6/2010 | Carroll |
| 2010/0198645 A1 | 8/2010 | Heiss et al. |
| 2011/0125613 A1 | 5/2011 | Franchi |
| 2011/0202415 A1 | 8/2011 | Casares et al. |
| 2011/0295746 A1 | 12/2011 | Thomas et al. |
| 2012/0047075 A1 | 2/2012 | Balistierri et al. |
| 2012/0226582 A1* | 9/2012 | Hammad .......... G06Q 20/425 705/35 |
| 2012/0284175 A1 | 11/2012 | Wilson et al. |
| 2013/0018793 A1 | 1/2013 | Wong et al. |
| 2013/0144783 A1 | 6/2013 | Bishop |
| 2013/0262296 A1 | 10/2013 | Thomas et al. |
| 2013/0268839 A1 | 10/2013 | Lefebvre et al. |
| 2013/0293363 A1 | 11/2013 | Plymouth et al. |
| 2013/0297501 A1 | 11/2013 | Monk et al. |
| 2014/0052553 A1 | 2/2014 | Uzo |
| 2014/0067677 A1 | 3/2014 | Ali et al. |
| 2014/0089182 A1 | 3/2014 | Short et al. |
| 2014/0164246 A1 | 6/2014 | Thomas et al. |
| 2014/0188728 A1 | 7/2014 | Dheer et al. |
| 2014/0289106 A1 | 9/2014 | Pawelczyk et al. |
| 2015/0046319 A1 | 2/2015 | Thomas et al. |
| 2015/0161597 A1 | 6/2015 | Subramanian et al. |
| 2015/0254665 A1 | 9/2015 | Bondesen et al. |
| 2015/0324801 A1 | 11/2015 | Thomas et al. |
| 2016/0019536 A1 | 1/2016 | Ortiz et al. |
| 2016/0092872 A1 | 3/2016 | Prakash et al. |
| 2016/0358163 A1 | 12/2016 | Kumar et al. |
| 2016/0359829 A1 | 12/2016 | Gulledge |
| 2017/0004501 A1 | 1/2017 | Ledford et al. |
| 2017/0221066 A1 | 8/2017 | Ledford et al. |
| 2017/0344960 A1 | 11/2017 | Garlick et al. |
| 2017/0344964 A1 | 11/2017 | Garlick et al. |
| 2017/0353420 A1 | 12/2017 | Garlick et al. |
| 2017/0372319 A1 | 12/2017 | Garlick et al. |
| 2018/0012199 A1 | 1/2018 | Dunn et al. |
| 2018/0012200 A1 | 1/2018 | Dunn et al. |
| 2018/0012201 A1 | 1/2018 | Dunn et al. |
| 2018/0174140 A1 | 1/2018 | Garlick et al. |
| 2018/0308070 A1 | 10/2018 | Raina |
| 2019/0043052 A1 | 2/2019 | Ledford et al. |
| 2019/0163790 A1 | 5/2019 | Jennings et al. |
| 2019/0220833 A1 | 7/2019 | Pawelczyk et al. |
| 2019/0333068 A1 | 10/2019 | Thomas et al. |
| 2019/0340590 A1 | 11/2019 | Davey et al. |
| 2021/0073750 A1 | 3/2021 | Ledford et al. |

FOREIGN PATENT DOCUMENTS

| | | |
|---|---|---|
| EP | 0 593 209 A2 | 4/1994 |
| EP | 0 661 654 A2 | 7/1995 |
| GB | 2 328 310 A | 2/1999 |
| GB | 2533379 A | 6/2016 |
| GB | 2533380 A | 6/2016 |
| GB | 2533432 A | 6/2016 |
| GB | 2533562 A | 6/2016 |
| GB | 2537087 A | 10/2016 |
| WO | 90/04837 A1 | 5/1990 |
| WO | 91/06058 A1 | 5/1991 |
| WO | 93/02424 A1 | 2/1993 |
| WO | 95/12859 A1 | 5/1995 |
| WO | 97/07468 A1 | 2/1997 |
| WO | 97/22060 A1 | 6/1997 |
| WO | 98/18095 A1 | 4/1998 |
| WO | 98/47100 A1 | 10/1998 |
| WO | 98/58356 A2 | 12/1998 |
| WO | 99/56219 A1 | 11/1999 |
| WO | 02/17196 A1 | 2/2002 |
| WO | 03/060749 A1 | 7/2003 |
| WO | 2007/053123 A2 | 5/2007 |
| WO | 2007/056274 A2 | 5/2007 |
| WO | 2008/027620 A1 | 3/2008 |
| WO | 2008/027621 A1 | 3/2008 |
| WO | 2008/060725 A2 | 5/2008 |
| WO | 2009/114876 A2 | 9/2009 |
| WO | 2009/152184 A1 | 12/2009 |
| WO | 2016/097672 A1 | 6/2016 |
| WO | 2016/097673 A1 | 6/2016 |
| WO | 2016/097674 A1 | 6/2016 |
| WO | 2016/097675 A1 | 6/2016 |

OTHER PUBLICATIONS

"3174 Configuration," http://www.commercecomputer.com/3174.html, Commerce Computer Corporation, 3 pages (Downloaded Oct. 7, 2002).

3174 Network Processor, Specification Sheet, http://ecc400.com/ibm/controllers/314.prod.htm, Downloaded Oct. 7, 2002.

7780 Mid-Range Item Processing—Product Overview, NCR Corporation, http://www.ncr.com/products/hardware/hw_7780_ts_product.htm, 4 pages (Downloaded Nov. 15, 2002).

7780 Mid-Range Item Processing—Technical Specifications, NCR Corporation, http://www.ncr.com/products/hardware/hw_7780_ts_product.htm, 1 page (Downloaded Nov. 15, 2002).

7780—The Robust, Reliable Solution . . . for Processing Varying Volumes in any Environment, NCR Corporation, 8 pages (1998).

"820 Payment Order/Remittance Advice" Version: X12-4010, pp. 1-61, Sep. 2005.

"835 Health Care Claim Payment/Advice" Version: 1.0 Final, pp. 1-70, Jul. 20, 2011.

"A Primer on HIPAA and the ACH Network," Banking Industry HIPAA Task Force, pp. 1-34.

About FSTC, Financial Services Technology Consortium, http://www.fstc.org/about/history.cfm, 2 pages (Downloaded Feb. 27, 2003).

"ACI Proactive Risk Manager™ for Enterprise Risk—Product Flyer," ACI Universal Payments, www.aciworldwide.com, 4 pages, 2016.

Addink et al., "AS/400 ImagePlus System View," IBM Systems Journal, vol. 29, No. 3, pp. 451-466 (1990).

"American National Standard For Financial Image Interchange: Architecture, Overview and System Design Specification," American Bankers Association, American National Standards Institute, Inc., pp. 1-202 (1994).

Anderson, Re: Electronic Check and Check Law, Letter to Robert Ballen, 2 pages (Apr. 8, 1996).

Anderson et al., "ImagePlus Workstation Program," IBM Systems Journal, vol. 29, No. 3, pp. 398-407 (1990).

"ANSI/ABA X9.46-1995, Draft version 0.13, American National Standard For Financial Image Interchange: Architecture, Overview and System Design Specification," American Bankers Association, American National Standards Institute, Inc., 229 pages (1995).

"ANSI/ABA X9.46-1997, American National Standard For Financial Image Interchange: Architecture, Overview and System Design Specification," American Banker Association, American National Standards Institute, Inc., 245 pages (Jan. 21, 1997).

Arnold B. et al., "Increasing eBilling in the Healthcare Industry Without Running Afoul of Privacy Laws," 2011 Payments, pp. 1-29, Apr. 3-6, 2011.

(56) References Cited

OTHER PUBLICATIONS

AT&T Global Offers One-Step Imaging. (AT&T Global Information Solutions) (Brief Article), American Banker, vol. 159, No. 39, p. 14A(1), 1 page (Feb. 28, 1994).
AT&T Partners with Fiserv to Form Single Source Provider for Leading Image Item Processing Solutions, PR Newswire, p. 913C1011, 2 pages (Sep. 13, 1995).
Atzel, Article Order, Email to Marshall J. Hambro, 1 page (Oct. 9, 2001).
"Authentication in an Internet Banking Environment," Federal Financial Institutions Examination Council, http://www.ffiec.gov/pdf/authentication_guidance.pdf, pp. 1-14, published 2005.
Avers et al., "ImagePlus as a Model for Application Solution Development," IBM Systems Journal, vol. 29, No. 3, pp. 356-370 {1990}.
Baby Boomers, Generation X are Both Addicted to the ATM, AT&T News Release, http://www.att.com/news/0295/950228.nca.html, 3 pages (Feb. 28, 1995).
Banctec Inc. has Received Another Order for Its Image Statement Processing Product. (First National Bank of Chicago Orders ImageFirst), Financial Services Report, vol. 8, No. 22, p. 5(2) (Nov. 13, 1991).
Banet, Document Image Processing, 1991: The Imaging Edge, Seybold Report on Publishing Systems, vol. 20, No. 19, p. 22(8), 10 pages (Jun. 24, 1991).
Bank Automation News, Phillips Business Information, vol. 9, Issue 6, 2 pages (Apr. 2, 1997).
Banks to Check Out Imaging (Solutions), Communicationsweek International, No. 093, p. 46, 2 pages (Oct. 19, 1992).
Barhel, "NCR and Unisys Exchange Check Images in a Pivotal Test. (Computer Makers Test Compatibility of Check Imaging Systems)," American Banker, vol. 158, No. 67, p. 3(1), 2 pages (Apr. 8, 1993).
Barthel, "Unisys, Banctec Offer PC-based Imaging: High-tech Check Statements Produced; Community Banks are Market, (Banctec Systems Inc.)," American Banker, vol. 157, No. 195, p. 3(1) (Oct. 8, 1992).
Bartholomew, "More Checks On Checks—Bank of America Plans to Convert to an IBM Imaging System that Screens Checks Faster and More Thoroughly (Spotlight)," Informationweek, No. 504, p. 32 (Dec. 5, 1994).
Bartimo et al., "Fine Tuning the Terminal Picture," ComputerWorld, Special Report, vol. XVII, No. 35, 48 pages (Aug. 29, 1983).
Beckett, P., "Credit-card Firms Get Into Web Game," Asian Wall Street Journal, p. N1, 1 page (Apr. 3, 2001).
Behnke, "NSSDC's Mass Storage System Evolves," NSSDC, http://nssdc.gsfc.gov/nssdc_news/march95/09_j_behnke_0395.html, 2 pages (Mar. 1995).
Bill Processing: US West Re-engineers with $7.2 Million Unisys Image-based Remittance Processing Solution, EDGE, On & About AT&T, vol. 10, No. 378, 3 pages (Oct. 23, 1995).
Blankenhorn, "Cincinnati Bell and Unisys Go Into Bank Imaging. (Cincinnati Bell Information Systems, Inc.)", Newsbytes, p. NEW10240020, 1 page (Oct. 24, 1990).
Block, USAA Federal Gets Imaging System. (USAA Federal Savings Bank, Cincinatti Bell Information Systems Inc.) (Brief Article), American Banker, vol. 159, No. 49, p. 6A(1), page (Mar. 14, 1994).
Booker, "Bank to Test Scalable NCR Imaging for Check Processing," Computerworld, p. 66, 2 pages (Dec. 14, 1992).
Broadway & Seymour Announces Client/Server Product for Item and Image Processing, Business Wire, p. 03201186, 2 pages (Mar. 20, 1995).
Broadway & Seymore Announces New VISUALIMPACT Release, Business Wire, p. 3291274, 2 pages (Mar. 29, 1996).
Broadway & Seymour to Invest in Two Strategic Initiatives, Business Wire, p. 03151248, 2 pages (Mar. 15, 1995).
Brooks, A., "Still Waiting for the E-Mail and Faxes to Start Coming In?", The New York Times, (East Coast Late Edition), New York, NY, Dec. 19, 1996, p. C7, 2 pages.
Brown, "Imaging May Dramatically Alter Bank Data Networks," Network World, vol. 6, No. 19, p. 6(2), 1 page (May 15, 1989).
Brown, R.J., ANSI X9.46, Data Structure Reference, IBM Corporations, 16 pages (Jul. 31, 1995).
Brown, R.J., "FSTC Image Interchange Project: Pilot Phase-1A Preliminary Architecture and Project Plan," 34 pages (Jun. 30, 1995).
Buchok, "OCR Gets Processing Credit," Computing Canada, vol. 19, No. 26, p. 30(1), 1 page (Dec. 20, 1993).
"By-law No. 7 Respecting the Large Value Transfer System," Canada Gazette, Part I, vol. 132, No. 16 (Canadian Government Publishing, online: Archive 1998, Part I, http://canadagazette.gc.ca/partI/1998/19980418/pdf/g1-13216.pdf, Apr. 18, 1998, 71 pages.
Cahill, T.P., "Image Processing Applications at the Chase Manhattan Bank," 2 pages (date unknown).
Cantwell, Data Compression Over Frame Relay Implementation Agreement FRF.9, Frame Relay Forum Technical Committee, 38 pages (Jan. 22, 1996).
"CAQH Committee on Operating Rules for Information Exchange (CORE), Phase III CORE EFT & ERA Operating Rule Set," pp. 1-138, Jun. 2012.
Carey, T.W., "Quicken versus Money," PC World, vol. 14, No. 4, p. 162(6), 8 pages (Apr. 1996).
Casey et al., "Intelligent Forms Processing," IBM Systems Journal, vol. 29, No. 3, pp. 435-450 (1990).
CashFlex Selects NCR Item Processing Systems for Lockbox, AT&T News Release, http://www.att.com/news/0793/930712.ncd.html, 2 pages (Jul. 12, 1993).
Chase's New Image (Chase Manhattan Awards 12-yrs Image-processing Contract to Flserv; Contract Could Generate $40 mil/yr in Revenue for Flserv), Information Week, No. 517, p. 14, 1 page (Mar. 6, 1995).
"Check Adjustment Quick Reference Guide," Federal Reserve System, 10 pages (Jul. 1996).
Check Adjustment Request Federal Reserve Bank, Form FRBADJ, 1 page (Sep. 1993).
"Check Clearing for the 21st Century Act: Frequently Asked Questions about Check 21," http://www.federalreserve.gov/paymentsystems/truncation/faqs.htm, The Federal Reserve Board, 2 pages (Jan. 27, 2005).
Check Image Exchange Project—Project Participants, FSTC Projects, FSTC, http://www.fstc.org/projects/imaging/participants.cfm, 1 page (Downloaded Oct. 30, 2002).
Check-Image Interchange Inches Closer (New York Clearing House, Chase Manhattan Bank and Federal Reserve Bank of Boston All Launch Check-image Interchange Program), Bank Technology News, vol. 10, No. 1, p. 19+, 2 pages (Jan. 1997).
"Check Image Processing Archive and Retrieval System Proposal: Technical Volume—Total System Solution Overview," BancTec, Incorporated, 128 pages (Jul. 8, 1994).
Check Image Processing Delivers Truncation Benefits Today, NCR Reports—Financial Services Trends & Technologies, NCR Corporation, vol. 1, Iss. 8, 13 pages (1997).
Check Technology Case Stays in Texas, IP Law Bulletin, 4 pages (Oct. 13, 2005).
Checks & Checking: Check Imaging at the Teller Station, Bank Technology News, vol. 9, No. 10, p. 37 (Oct. 1996).
Chemical Chooses IBM Check Imaging (Chemical Banking Corp to Install IBM's ImagePlus High Performance Transaction System to Process 9 Mil Checks Daily), Bank Technology News, vol. 8, No. 9, p. 11 (Sep. 1995).
Cincinnati Bell: CBIS & Unisys in Major Imaging Agreement, EDGE, On & About AT&T, vol. 5, No. 118, 1 page (Oct. 29, 1990).
Cincinnati Bell Information Systems (Integrator Briefs), Computer Reseller News, No. 534, p. 129 (Jul. 12, 1993).
Cisco Partners with AT&T CMS on Network Switch Manufacturing, Lucent Technologies, http://www.lucent.com/press/0995/950926.mma.html, 2 pages (Sep. 26, 1995).
Citibank, New Castle Installation, one page (no date available).
Cooney, "*Frame* * Relay* Comes to Computerm Extenders," Network World, p. 14, 2 pages (Jun. 28, 1993).
Company Background and Product Guide, MagTek, 42 pages (no date available).

(56) References Cited

OTHER PUBLICATIONS

Computerm Announces Remote Check Imaging Support for VMC 8200 High-speed Channel Extension System, PR Newswire, p. 408LAM012, 2 pages (Apr. 8, 1996).
Computerm Earns MCI "Level 1" Approval; Computerm's Industry Exclusive Native *Frame * * Relay* Interface Passes Test for Interoperability with MCI's *Frame* * Relay* Services, Business Wire, p. 4121139, 2 pages (Apr. 12, 1995).
Computerm Eases Remote Imaging, (Introduces Remote Image Solution) Brief Article, American Banker, vol. 158, No. 156, p. 13A(1), 1 page (Aug. 16, 1993).
Computerm Enables Boatmen's Bancshares to Execute Remote Check Imaging, PR Newswire, p. 408LAM013 (Apr. 8, 1996).
Cortese, Image Yields Interest at Banks, Collaboration Results in Imaging System to Automate Check Processing, Computerworld, p. 6, 2 pages (Mar. 19, 1990).
Costanzo, "As Banks Cling To The Conventional, Check-imaging Struts Its Stuff," Bank Technology News, p. 1, 5 pages (Mar. 1994).
Crockett, Systematics to Use Deposited-check Imaging; Installation at Firm's N.J. Center Would Be The First By An Outsourcer, Systematics Financial Services Inc., Unisys Corp., American Banker, vol. 158, No. 95, p. 3(1), 2 pages (May 19, 1993).
Crone, Reducing Data Processing Costs with a Remote Item Processing System, Bank Administration, vol. 62, No. 10, pp. 44-46 (Oct. 1986).
Cummings, S., "Home Banking with Quicken," New York: MIS Press, 15 pages (1996).
Current Check Flow, PowerPoint Presentation, Check[1].ppt, pp. 1-4.
"Declaration of Richard Jesmajian," In re Claudio R. Ballard for Remote Image Capture with Centralized Processing and Storage, 3 pages (Nov. 18, 2005).
Department of Health and Human Services, Federal Register, vol. 77, No. 6, pp. 1556-1590, Jan. 10, 2012.
Depompa, "IBM Adds Image-based Processing," MIS Week, vol. 11, No. 12, p. 12(1), 2 pages (Mar. 19, 1990).
Dinan et al., "ImagePlus High Performance Transaction System," IBM Systems Journal, vol. 29, No. 3, pp. 421-434 (1990).
Dowdell, "Security," Email to fstc-imagE, 2 pages (Apr. 27, 1996).
ECheck: Homepage, http://www.echeck.org, Downloaded Feb. 27, 2003, 1 page.
"Electronic Check Adjustments: Are You Using FedLine?", The Federal Reserve Bank of St. Louis, http://www.stlouisfed.com/publications/pq/1998/a/pq1998a5.html, 3 pages (Spring 1998).
"Electronic Imaging '88—International Electronic Imaging Exposition & Conference," (Advance Printing of Paper Summaries), Anaheim, California, Mar. 28-31, 1988, 26 pages.
Electronic Payment Systems Support/Check Processing Control System: Program Reference and Operations Manual, IBM Corporation, 6 pages (Jun. 1986).
Encryption and Digital Signature Explained, Northern Telecom Inc., 4 pages (no date available).
European Search Report for Application No. 03728532.7 mailed Feb. 15, 2008, 3 pages.
Evans, "The End of Paper Wait: Document Imaging. (includes related articles on successful document imaging implementations at Borgess Medical Center, the Huntington Internal Medicine Group, the University of Alabama Health Services Foundation and Quest Diagnostics)(Industry Trend or Event)," Health Management Technology, vol. 18, No. 2, p. 16(5), 7 pages (Feb. 1997).
Fassett, "Impact of Imaging," Bank Management, vol. 67, No. 11, p. 56, 1 page (Nov. 1991).
"Financial EDI over the Internet, A pilot conducted by BankAmerica and Lawrence Livermore National Laboratory," Bank of America, 1996. http://www.bofa.com/batoday/edi_briefing.html, 7 pages (Copyright 1996).
"Financial Services Technology Consortium—Interbank Check Imaging Project—White Paper (Draft)," FSTC, pp. 1-29 (Jun. 20, 1994).
Fisher, "IBM, Customers Continue Work on Document Image Processor," Datamation, vol. 34, No. 19, 3 pages (Oct. 1, 1988).

Fitch, "Check Image Capture Speeds Up Positive Pay Reconcilement," Corporate Cashflow, pp. 7 & 11 (Feb. 1995).
Fitch, "Digital Image Systems Speed Return Items, Exceptions," Corporate Cashflow, pp. 8 & 10 (May 1996).
Frequently Asked Questions on Drive Space Issues, Drive Space FAQ, 1 page (date unknown).
Fricke, "PACES Paperless Automated Check Exchange & Settlement Next Steps," Chase Manhattan Bank, 10 pages (Aug. 12, 1997).
Frost National Bank Selects NCR Over Old Mainframe Environment, AT&T News Release, http://www.aft.com/news/0493/930428.nca.html, 2 pages (Apr. 28, 1993).
"FSTC Check Image Interchange Project—Archive Storage and Retrieval Component Decomposition," 20 pages (May 25, 1995).
FSTC Demonstrates Interbank Check Image Pilot; Multi-vendor System Speeds Check Clearing, Cuts Fraud, FSTC Projects—Check Image Exchange Project, Press Release, http://www.fstc.orq/projects/imaging/public/information.cfm, 2 pages (Dec. 12, 1995).
FSTC Financial Services Technology Consortium, PowerPoint Presentation, Ansi6v4[1].ppt, pp. 1-27 (no date available).
FSTC Interbank Check Imaging Unisys Monthly Status Report, pp. 1-7 (Jun. 26, 1996).
FSTC Interbank Check Imaging Unisys Monthly Status Report, pp. 1-9 (Jul. 22, 1996).
FSTC Projects, Check Image Exchange Project (a.k.a Interbank Check Imaging Project), Financial Services Technology Consortium, http://www.fstc.org/projects/imaging/index.cfm, 6 pages (Downloaded Oct. 30, 2002).
Garvey, "Check Processing Goes Digital—Chase Manhattan Bank to Store Checks Electronically, Saving Time and Money," Informationweek, No. 648, p. 20, 1 page (Sep. 15, 1997).
Gawen, "PC Based Document Image Processing and Signature Verification," OIS IMC91 Document Imaging, Proceedings of the Information & Image Management Conference, London, pp. 389-391 (Jul. 1991).
Global Concepts—Payment Systems Consulting, Global Concepts, Inc., http://www.global-concepts.com/image_archive.htm, 1 page (Downloaded Nov. 20, 2002).
Graf, R.F., "Modern Dictionary of Electronics," 6th Edition, 5 pages (1997).
"Guardian Analytics FraudDESK," Guardian Analytics, www.guardiananalytics.com, 2 pages, 2016.
Gullo, "NCR, Unisys Plan Check Imaging for IBM Systems," American Banker, vol. 156, No. 249, p. 1(2), 2 pages, (Dec. 30, 1991).
Gwendolyn Lohse et al., "Federal Operating Rules for Healthcare Administrative Simplification," 2011 Payments, NACHA—The Electronic Payments Association, pp. 1-32, Apr. 3-6, 2011.
Hakeda, "The Image Object Content Architecture," IBM Systems Journal, vol. 29, No. 3, pp. 333-342 (1990).
Hanna, FSTC Image Exchange, POS Image Capture Pilot—Reader-Scanner Study, RDM Corp, 1 page (May 21, 1996).
Harding et al., "Object Storage Hierarchy Management," IBM Systems Journal, vol. 29, No. 3, pp. 384-397 (1990).
"Healthcare in the Electronic Environment, Payment, Information and Communication Within the Revenue Cycle," Alacriti Clearwave, 2011 Payments, pp. 1-30, Apr. 3-6, 2011.
Helm, "Banks Check Into Image Processing," Computers in Banking, vol. 7, No. 3, p. 25(7), 8 pages (Mar. 1990).
Helm, "Who's Doing What in Image Processing. (includes definition of image processing)," ABA Banking Journal, vol. 83, No. 1, p. 31(3), 6 pages (Jan. 1991).
Helms, "Introduction to Image Technology," IBM Systems Journal, vol. 29, No. 3, pp. 313-332 (1990).
Henry Ijams et al., "Evaluating ePayables Opportunities to Improve A/P Efficiencies," pp. 1-28, Jun. 22, 2011.
High-Volume Data Capture Sans the Paper, Bank Systems & Technology, p. 35 (May 1996).
Horine, "AT&T and Fiserv Team to Offer Imaging Solutions," AT&T News Release, http://www.att.com/news/0995/950913.nca.html, 2 pages (Sep. 13, 1995).

(56) References Cited

OTHER PUBLICATIONS

Huntington Bancshares in the Forefront of Technology with Purchase of Unisys Check Imaging System, PR Newswire, p. 1 (Oct. 11, 1989).
IBM 3898 Image Processor, Product Announcement, IBM, 3 pages (Mar. 19, 1990).
"IBM 3995 Optical Library Dataserver—Economical, high-capacity, removable optical storage," IBM Corporation, 4 pages (1991).
"IBM Proposal for FRB Phase Four: Image Archive System," IBM Financial Document Processing, IBM, 175 pages (Nov. 7, 1991).
"IBM ImagePlus Fact Sheet," IBM Corporation, 2 pages (1991).
"IBM's ImagePlus eases transformation of the Worker's Compensation Board," IBM Corporation, 2 pages (1991).
"IBM's ImagePlus key to improving Royal Trust's customer service," IBM Corporation, 2 pages (1991).
"IBM's ImagePlus: Making USAA's 'Impossible Dream' a reality," IBM Corporation, 3 pages (1991).
IBM X9.46 Pilot Status—Summary, 3 pages (no date available).
"Ibnamed, A Load Balancing Name Server Written in Perl," http://www.standford.edu/-schemers/docs/lbnamed/lbnamed.html, 5 pages (Sep. 17, 1995).
"ICI Project Security Work Session, Agenda," 3 pages (May 10, 1996).
IdeaCopTM OpenOpposition Prior Art Report for U.S. Pat. No. 5,910,988 by PatenTrakkerTM, Email regarding USPTO Reexam. C.N. 90/007,829, Requested Date: Nov. 25, 2005, from "PT" <admin@patentrakker.com>, pp. 1-13 (May 10, 2006).
"Image Archive Forum—Payments Systems Task Force—Economic Framework," 33 pages (Jan. 27, 1998).
"Image Archive Forum—Payments System Task Force—Introduction," 52 pages (1998).
Image Can Be . . . Everything!, At Your Service, A Newsletter from the Federal Reserve Bank of Kansas City, pp. 1-6 (Special Edition—Summer 1995).
Image Processing Survival Guide, vol. II—Sure-Fire Strategies for Implementing Image-Remittance, Phillips Business Information, Inc., 40 pages (1996).
"Image systems garner NOAC spotlight (American Bankers' Association's National Operations and Automation Conference)," Computer in Banking, vol. 6, No. 7, p. 8(4), 9 pages (Jul. 1989).
"Image Quality Functional Requirements," FSTC, Chase Manhattan Bank, 19 pages (Jul. 26, 1995).
Imaging Products, United States Banker, vol. 100, No. 8, p. 23(3), 6 pages (Aug. 1990).
Imaging Technology: Generating New Bank Revenues in the Age of the Consumer, NCR Reports—Financial Services Trends & Technologies, NCR Corporation, Issue 1, 4 pages (Jan. 1997).
Imaging Vendors Shape Processing, Banking Management, vol. 69, No. 4, p. 29, 1 page (Apr. 1993).
Implementing Imaging Payment Systems: Managing Change to Achieve Results, NCR Reports—Financial Services Trends & Technologies, NCR Corporation, Issue 2, 3 pages (Feb. 1997).
Implementing National Electronic Payment System in Emerging Economies, NCR Reports—Financial Services Trends & Technologies, NCR Corporation, vol. 1, Issue 7, 12 pages (1997).
"Industry Security Leader Racal Supports Visa/Mastercard Proposal for Internet," PR Newswire, 2 pages (Apr. 17, 1996).
Information Technology Outsourcing: Sharpening Management Focus in Financial Institutions, NCR Reports—Financial Services Trends & Technologies, NCR Corporation, Issue 5, 6 pages (1997).
Integrated, Customer-Focused Banking Architecture: Tomorrow's Competitive Edge, NCR Reports—Financial Services Trends & Technologies, NCR Corporation, Issue 3, 6 pages (Mar. 1997).
Interbank Check Image Project, FSTC, PowerPoint Presentation, no1016V4[1].ppt, 18 pages (no date available).
Interbank Check Imaging, FSTC General Meeting—Orlando, Florida, 5 pages (Apr. 17, 1997).
International Search Report for Application No. PCT/US00/33010 mailed Jun. 21, 2002, 4 pages.

Introducing the Age of Document-Image Processing, FileNetTM Brochure, FileNet Corporation, 13 pages (1984).
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-6, Nov. 15, 2010.
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-5, Nov. 18, 2011.
Item Processing Leaps Ahead with VisualImpact and Windows NT. (Sponsored Supplement: Unlock Your Back Office with Microsoft BackOffice), US Banker, vol. 105, No. 6, p. S4(3), 4 pages (Jun. 1995).
J. Estep, "Ninth National Medical Banking Institute, The Growing Collaboration of eHealth and Medical Banking, Banks Engaging in Healthcare Reform," pp. 1-20, Feb. 21, 2011.
J. Steven Stone et al., "Healthcare Reform: What Does It Really Mean for Banks?," NACHA, pp. 1-37, 2011.
J.P. Morgan, "Addressing the Administrative Cost Trajectory in a New Environment," Post-Reform Opportunities for Healthcare Payments, pp. 1-14, Apr. 27, 2010.
Janusky, FSTC Interbank Check Imaging, 6 pages (Apr. 29, 1996).
Janusky, FSTC Interbank Check Imaging, 7 pages (May 22, 1996).
Jim St. Clair et al., "Ninth National Medical Banking Institute, The Growing Collaboration of eHealth and Medical Banking, Banking Platforms: Creating Programs to Speed Innovation in Healthcare," pp. 1-28, Feb. 11, 2011.
Joint Marketing & Referral Agreement Between ACS Image Solutions, Inc. and JPMorgan Chase Bank, 27 pages (Mar. 15, 2002).
JPMorgan Chase and DataTreasury Settle Patent Dispute, Company Announcement, DataTreasury Corporation, http://www.finextra.com/fullpr.asp?pf=y&id=4989, 1 page (Jul. 6, 2005).
Kingman III et al., "Operational Image Systems: A New Opportunity," IBM Systems Journal, vol. 29, No. 3, pp. 304-312 (1990).
Kingson et al., "E-Processing by Banks: Idea Gains Ground," American Banker, 2 pages (Apr. 26, 2001).
Kniskern, "Engineering A Visionary Solution," Datamation, vol. 36, No. 8, pp. 1-3 (Apr. 15, 1990).
Kniskern, J.M., "Strategic Rethinking," 6 pages (date unknown).
Kutler, "AT&T, IBM and Unisys Join Bank Research Group. (Financial Services Technology Consortium)," American Banker, vol. 159, No. 124, p. 14(1), 3 pages (Jun. 29, 1994).
Lee et al., NOVAHID: A Novel Architecture for Asynchronous Hierarchical, International, Distributed, Real-Time Payments Processing, IEEE Journal on Selected Areas in Communications, vol. 12, No. 6, pp. 1072-1087 (Aug. 1994).
MagTek Adds Enhanced Reading To MICRImageTM—New Reading Capability Supports Check Conversion with Higher Reliability, MagTek Press Release, 3 pages (Jan. 9, 2003).
MagTek Unveils Excella, a Dual-side Scanner for Check 21 Applications, 1 page (May 10, 2004).
MagTek Upgrades Its MICRImageTM Check Reader/Scanner—V. 34 Modem Supports High-Speed Image Archiving for Check Conversion, MagTek Press Release, 3 pages (Jun. 12, 2002).
MagTek's MICRImage Transmits Check Images at Speed of Ethernet, MagTek Press Release, 2 pages (Feb. 14, 2002).
Mantel, "Notes Gets In The Picture," Datamation, pp. 87 & 88 (Jul. 15, 1992).
Marjanovic, "Home Loan Bank to Offer Check-image Statements to Members' Customers. (Federal Home Loan Bank of Pittsburgh)(Brief Article)," American Banker, vol. 159, No. 248, p. 14(1), 2 pages (Dec. 29, 1994).
Marjanovic, "Mich. National Streamlines Imaging with IBM System. (check imaging)," American Banker, vol. 160, No. 176, pp. 1-2 (Sep. 13, 1995).
Marjanovic, "Payment Groups Square Off Over Electronic Check Plan," American Banker, 1 page (May 8, 1996).
Matt Brodis et al., "Best Practices for Migrating Healthcare Payments to ACH," pp. 1-39, Apr. 3-6, 2011.

(56) References Cited

OTHER PUBLICATIONS

Matthew Smith and Victoria Terekhova, "Electronic Payments in Healthcare: Overcoming the Challenges," pp. 1-25, Apr. 3-6, 2011.
McGinn, "IBM ImagePlus High Performance Transaction System. (IBM Harnesses Image Processing to Make its 389x/XP Cheque Processors More Efficient)(Product Announcement)," Computergram International, No. 1389, p. CG103210008, 2 pages (Mar. 21, 1990).
Messmer, "Hurdles Stand in Way of Electronic Checking," Network World, p. 33, 1 page (Sep. 4, 1995).
Messmer, E., "Banks Turn to Web for Check Processing," Network World, Framingham, vol. 17, Issue 25, 3 pages (Jun. 19, 2000).
Methodology and Value, Image Archive Forum, 20 pages (Sep. 19, 1997).
Meyerson, "PACES Redeposit Processing," pp. 1-60 (no date available).
MICR Technology Helps Eliminate POS Check Fraud, Chain Store Age Executive, p. 79 (Sep. 1991).
"Microsoft Introduces SNA Server Version 3.0, Begins Beta Testing," Microsoft Press Release, http://www.microsoft.com/presspass/press/1996/jun96/sna30pr.mspx, 4 pages (Jun. 17, 1996).
Minoli, D., "Imaging in Corporate Environments Technology and Communication," McGraw-Hill, Inc., 315 pages (1994).
Moore, "IBM, Unisys Test Check Systems for Fed Reserve," Federal Computer Week, vol. 6, No. 21, p. 6(2), 1 page (Jul. 27, 1992).
Moreau, "Payment by Authenticated Facsimile Transmission A Check Replacement Technology for Small and Medium Enterprises—Payment Processing Overview," CONNOTECH, http://connotech.com/PAYPROC.HTM, 23 pages (Downloaded Nov. 25, 2006).
Morris et al., "Image System Communications," IBM Systems Journal, vol. 29, No. 3, pp. 371-383 (1990).
Morton, W., "E-Commerce (A Special Report): A Consumer's Guide—Payments—Check It Out: The Web is suddenly crowded with online-payment services; Here's how they compare," The Wall Street Journal, New York, NY, p. R13, 4 pages (Dec. 10, 2001).
Murphy, POD Check Imaging Faces New Challenges (In 1995 vs 1996, banks raised investment in check imaging by 9% from $198 mil and $215 mil; new low cost POD technology keeps it down), Bank Technology News, vol. 10, No. 3, p. 23, 3 pages (Mar. 1997).
National City, NCR Form Strategic Imaging Partnership, AT&T News Release, http://www.att.com/news/1192/921109.nca.html, 3 pages (Nov. 9, 1992).
NCR, CKI to Market Image-based Credit Card Chargeback System, AT&T News Release, http://www.att.com/news/0193/930106.ncb.html, 2 pages (Jan. 6, 1993).
NCR and Arkansas Systems Announce Strategic Alliance, AT&T News Release, http://www.att.com/news/0793/930712.ncb.html, 2 pages (Jul. 12, 1993).
NCR and Cincinnati Bell Offer Image Processing Service, AT&T News Release, http://www.att.com/news/0194/940111.nca.html, 2 pages (Jan. 11, 1994).
NCR and NYCH to Develop Image-based Check Notification System, AT&T News Release, http://www.att.com/news/0892/920824.ncb.html, 2 pages (Aug. 14, 1992).
NCR and Signet Banking to Provide Item Processing Services, AT&T News Release, http://www.att.com/news/0793/930713.ncb.html, 2 pages (Jul. 13, 1993).
NCR Demonstrates Full Line of Retail Products at NFR Conference, AT&T News Release, http://www.att.com/news/0193/930118.ncd.html, 3 pages (Jan. 18, 1993).
NCR Demonstrates Systems for Insurance and Accounting Industry, AT&T News Release, http://www.att.com/news/0592/920531.nca.html, 3 pages (May 31, 1992).
NCR Deposit Processing Technology Speeds Banking Operations, AT&T News Release, http://www.att.com/news/1292/921207.ncc.html, 3 pages (Dec. 7, 1992).
NCR Document Management System Includes Kodak, Ricoh Products, AT&T News Release, http://www.att.com/news/0493/930406.ncc.html. 3 pages (Apr. 6, 1993).
NCR Introduces Scalable Image Item Processing Solution, AT&T News Release, http://www.att.com/news/0196/960119.nca.html, 3 pages (Jan. 19, 1996).
NCR Offers New Image-Based Document Management System, AT&T News Release, http://www.att.com/news/0692/920623.ncb.html 3 pages (Jun. 23, 1992).
NCR Reports—Financial Services Trends & Technologies, NCR Corporation, Issue 4, 6 pages (1997).
NCR Signs DSI Alliance for Imaging Statement Processing, AT&T News Release, http://www.att.com/news/0792/920720.nca.html, 2 pages (Jul. 20, 1992).
NCR Unveils Client-Server Check Imaging (NCR introduced NCR Scalable Image Item Processing Solution, a client-server based system for image-based check processing), Bank Technology News, vol. 9, No. 3, p. 23, 1 page (Mar. 1996).
New ATM from AT&T GIS Features Automated Document Processing, AT&T News Release, http://www.att.com/news/1194/941129.ucb.html, 4 pages (Nov. 29, 1994).
New Mexico Uses NCR Imaging Systems for Tax, Revenue Processing, AT&T News Release, http://www.att.com/news/0793/930712.ncc.html, 2 pages (Jul. 12, 1993).
"New Universal Payment Identification Code Will Become Industry Standard for I-Enabled Payments," The Clearing House Press Release, 2 pages (Apr. 24, 2001).
"New York Clearing House—A Proposal for an Image-based Return Item Processing System," Unisys, Document No. PDC 1010-16, 126 pages (Jun. 1991).
News Release, Retail Banking Solution Enhanced, AT&T News Release, http://www.att.com/news/0590/900521.nca.html, 2 pages (May 21, 1990).
"Ninth National Medical Banking Institute, The Growing Collaboration of eHealth and Medical Banking, HIMSS G7 Operating Rules in Healthcare," pp. 1-11, Feb. 15, 2011.
Nixdorf Computer Introduces DCPA Image—A Sophisticated Document Image Processing System with Unglue Capabilities, PR Newswire, 3 pages (Aug. 15, 1989).
Nixon, "Is Check Imaging For You? (automation in banking)(includes related articles)," Savings & Community Banker, vol. 2, No. 10, p. 28(6), 6 pages (Oct. 1993).
Norwest Bank Selects NCR Image-based Processing Systems, AT&T News Release, http://www.att.com/news/0893/930802.nca.html, 3 pages (Aug. 2, 1993).
Nugent, W.R., "Specifications for a Stack Droid: Robotics Required For Large Libraries of Digitized Images on Optical Disk," 1 page (date unknown).
"NYCH Project Shows Promise for Facilitating E-Payments," AFP Pulse, The News Source for Financial Professionals, 2 pages (Mar. 2002).
O'Heney, Prepare for The Image Revolution. (Bankers and Vendors)(image processing; includes related article listing image processing products)(buyers guide), Computers in Banking, vol. 6, No. 10, p. 24(6), 8 pages, (Oct. 1989).
On The Imaging Technology Front (Unisys Corp is in an accord to Remarket Broadway & Seymore Inc's VisualImpact software, a midrange check-imaging system), American Banker, vol. CLXI, No. 68, p. 26, 1 page (Apr. 10, 1996).
"PACES—Paperless Automated Check Exchange & Settlement—Business Requirements," FSTC, PACESBusReq3[1].doc, 7 pages (Apr. 3, 1998).
PACES—Paperless Automated Check Exchange & Settlement—Project Proposal, FSTC, PACESPRO[1].doc, 25 pages (Apr. 23, 1998).
PACES—Paperless Automated Check Exchange & Settlement—Requirements Document, FSTC, PACESRequirements[1].doc, 25 pages (Apr. 3, 1998).
Padgett, T., "Melville, N. Y.—Based DataTreasury Fights J.P. Morgan Chase over Patent," Newsday, 4 pages (Oct. 22, 2003).
Paperless Automated Check Exchange and Settlement (PACES), FSTC Projects, http://www.fstc.org/projects/paces/projstatus.cfm, 2 pages (Jun. 22, 2000).
"Payment Trends in the Healthcare Industry," A Survey of Healthcare Providers, pp. 5-38, Fall 2010.

(56) References Cited

OTHER PUBLICATIONS

Perry et al., "Experience Gained in Implementing ImagePlus," IBM Systems Journal, vol. 29, No. 3, pp. 467-488 (1990).
Plesums et al., "Large-Scale Image Systems: USAA Case Study," IBM Systems Journal, vol. 29, No. 3, pp. 343-355 (1990).
Priya Malhotra, "Clearing House Enumerates e-Payment Ills," American Banker, 4 pages (Aug. 13, 2002).
"Real-Time Gross Settlement Systems," Bank for International Settlements, 66 pages (Mar. 1997).
Regions Bank Selects ImageSoft to Provide Imaging Solution, Business Wire, p. 9161220, 2 pages(Sep. 16, 1997).
"Request for Proposal for Check Image Processing and Archival and Retrieval Systems for the Federal Reserve," Federal Reserve Bank of Boston, Version 1.0, 246 pages (Apr. 21, 1994).
Richard D. Marks, "Ninth National Medical Banking Institute, The Growing Collaboration of eHealth and Medical Banking, Health Record Banking: Changing the Game for Healthcare Information Technology, An Analysis of Checking Accounts for Health Information," pp. 1-13, Feb. 10, 2011.
Rivest et al., "A Method for Obtaining Digital Signatures and Public-Key Cryptosystems," 15 pages (Feb. 1978).
Robert Hunter, "Letter Re: CMS-0024-IFC, Adoption of Standards for Health Care EFTs and Remittance Advice," pp. 1-10, Mar. 12, 2012.
Roldan, Jr., "Image Quality White Paper," FSTC PACES Project Document, Chase Manhattan Bank, pp. 1-18 (Feb. 18, 1999).
Roldan, PACES—Paces Models—FSTC Project, Chase Manhattan Bank, 19 pages (Jul. 17, 1997).
Roldan, "Project Overview—PACES Planning Meeting", New York City, FSTC, PacesOverview40[1].ppt, 28 pages (Dec. 19, 1997).
Roth, A., "Banks Fund B2B Payment System Effort," American Banker, 1 page (Apr. 24, 2001).
Russ Waterhouse, "Administrative Simplification under the Patient Protection and Affordable Care Act Standards and Operating Rules for Electronic Funds Transfer (EFT) and Remittance Advice (RA)," National Committee of Vital and Health Statistics (NCVHS) Subcommittee on Standards, pp. 1-11, Dec. 3, 2010.
Russ Waterhouse, "National Committee on Vital and Health Statistics (NCVHS) Subcommittee on Standards, Administrative Simplification Under the Patient Protection and Affordable Care Act, Standards and Operating Rules for Electronic Funds Transfer (EFT) and Remittances Advice (RA)," The Clearing House, pp. 1-5, Dec. 3, 2010.
Russ Waterhouse et al., "The Healthcare Payments Solution: What's In It for the Banking Industry," NACHA Payments 2011, pp. 1-17, Apr. 5, 2011.
Ryman, "Personal Systems Image Application Architecture: Lessons Learned from the ImagEdit Proaram," IBM Systems Journal, vol. 29, No. 3, pp. 408-420 (1990).
"SAS® Fraud Management—Real-time scoring of all transactions for fast, accurate fraud detection," Product Brief, SAS, www.sas.com, 6 pages, 2015.
Scheschuk, B., "Pay it on the Net," CMA Management, vol. 75, Issue 4, pp. 30-34, 4 pages (Jun. 2001).
Schwartz, "Banks to Test Imaging for Clearing Checks," CommunicationsWeek, p. 35, 2 pages (Sep. 14, 1992).
Signet Bank Processes Over 2,500 Documents/Hour in Unisys Check Imaging Tests, PR Newswire, p. 0409P8428, 2 pages (Apr. 9, 1991).
Softchec Licenses 'Envision' Image Solution to West Suburban Bank, PR Newswire, p. 116SETU002, 2 pages (Jan. 16, 1996).
Spencer, "Scanning Goes Vertical: A Big Future for Specialized Check Scanning; Check Scanning Technology," Advanced Imaging, pp. 42-44 (Oct. 1997).
Stanley, P., "Pilot Overview," 8 pages (Apr. 3, 1995).
"Supplement to Authentication in an Internet Banking Environment," Federal Financial Institutions Examination Council, http://www.ffiec.gov/pdf/auth-its-final%206-22-11%20(ffiec%20formated).pdf, pp. 1-12, published 2011.

"SurePOS ACE Electronic Payment Support PRPQ for 4690 OS User's Guide," Version 1, Release 5, IBM, 281 pages (Mar. 2002).
"Suspicious Activity Monitoring—Anti-Money Laundering Solutions," NICE-Actimize, www.niceactimize.com, 4 pages, Mar. 15, 2014.
Technical Volume—Check Image Processing Archive and Retrieval System—Proposal, BancTec, Inc., 469 pages (Jul. 8, 1994).
Ten Dyke, R.P., "Books," IBM Systems Journal, vol. 29, No. 1, pp. 489-490, 2 pages (1990).
Terminal Data to Supply NCR with Document Microfilmers, AT&T News Release, http://www.att.com/news/1093/931013.nca.html, 2 pages (Oct. 13, 1993).
"The Bank Internet Payment System (BIPS): Leading the Way to Electronic Commerce," FSTC, http://www.fstc.org/projects/bips/index.cfm, 3 pages (Downloaded Feb. 27, 2003).
The Check Information Age, Vision Executive Summary Image Archive Forum, Payment System Task Force, 10 pages (Jan. 27, 1998).
The Clearing House, "Healthcare EFT Enrollment, Mar. 25, 2011 Stakeholder Meeting Minutes & Wrap-Up," NACHA—The Electronic Payments Association, pp. 1-22, Apr. 20, 2011.
The Clearing House, "Healthcare EFT Enrollment, Stakeholder Meeting Materials," NACHA—The Electronic Payments Association, pp. 1-43, Mar. 25, 2011.
The Clearing House, "Healthcare EFT Enrollment, Stakeholder Meeting: Pre-read Materials," NACHA—The Electronic Payments Association, pp. 1-21, Mar. 25, 2011.
The Clearing House, "Mayo Clinic Interview," Healthcare EFT Enrollment, NACHA—The Electronic Payments Association, Healthcare EFT Enrollment, pp. 1-6, Mar. 14, 2011.
The New Era of Check Scanning Technology—Introducing Excella, Specifically Designed to Meet the Processing Requirements of Check21, MagTek, Inc., 22 pages (2005).
"The Remaining Barriers to ePayments and Straight-through Processing," Research Conducted Oct. 2001-Mar. 2002 by The Clearing House, The Clearing House, 24 pages.
The Wachovia Story, RDM Corporation, 1 page (Oct. 1993).
Tracey, "IBM Unveils First Stage of Image-check System (product announcement), " Computers in Banking, vol. 7, No. 4, p. 13(3), 3 pages (Apr. 1990).
Tucker, "Broadway Rolls Out Check Imaging System for Community Banks (Broadway & Seymour Inc.)," American Banker, vol. 160, No. 61, p. 14(1), 2 pages (Mar. 30, 1995).
Understanding EDI, 2 pages (Mar. 2, 1996).
Unisys Acquires VisualImpact Solution for Check Processing, Archive & Image Delivery, Business Wire, p. 9181204, 3 pages (Sep. 19, 1997).
Unisys Enhances Check Imager (Unisys Corp. Makes Effort to Appeal to Wider Range of Financial Institutions), American Baker, vol. CLIX, No. 205, p. 15A, 1 page (Oct. 24, 1994).
Unisys Enters Image Processing Market with Two New Products and Major Financial and Industrial Customers. (product announcement), PR Newswire, p. 1011PH009, 3 pages (Oct. 11, 1989).
Unisys Integrates Retail/Wholesale Lockbox Solution for Remittance Processors, Business Wire, p. 03251075, 4 pages (Mar. 25, 1997).
Unisys Provides Services to Bank of the West to Support Retail Banking, Business Wire, p. 9180098, 2 pages (Sep. 19, 1995).
Unisys Solution will Support Check Processing at Vermont Federal, Business Wire, p. 5201185, 3 pages (May 20, 1996).
Unisys Wins Contract to Supply Imaging Solution to Chase Manhattan/FISERV Check Processing Alliance, Business Wire, p. 6121175, 2 pages (Jun. 12, 1995).
Unix-based Imge Statement Software (Cincinnati Bell Information Systems Inc. introduces ImageBanc II computer software)(Brief Article), ABA Banking Journal, vol. 85, No. 2, p. 80(1), 1 page (Feb. 1993).
Universal Card Purchases BancTec ImageFIRST System, AT&T News Release, http://www.att.com/news/1292/921222.uca.html, 2 pages (Dec. 22, 1992).
U.S. Office Action for U.S. Appl. No. 15/488,848 mailed Aug. 7, 2019.

(56) References Cited

OTHER PUBLICATIONS

U.S. Appl. No. 15/970,058, filed May 3, 2018 entitled "Bill Pay Service With Federated Directory Model Support".
Verifone Software Links PCs to the Point of Sale (Brief Article), American Banker, vol. 158, No. 156, p. 13A(1), 2 pages (Aug. 16, 1993).
Vermeire, D.R., "Prosecution of Check Image Patent," letter to Peter Hanna, 1 page (Jul. 11, 1997).
Wachovia Tests NCR's New Imaging Item Processing System, AT&T News Release, http://www.att.com/news/1091/911015.nca.html, 2 pages (Oct. 15, 1991).
Wagner, "Banc One Checks Out Web," Computerworld, vol. 30, No. 35, p. 69, 2 pages (Aug. 26, 1996).
Walter, G. "Making Optical Disk Based Systems Pay," Electronic Imaging '88—Advanced Printing of Paper Summaries, vol. 1, Oct. 3-6, 1988, Boston, MA, 11 pages.
Western Bank Purchases NCR's Document Managing System, AT&T News Release, http://www.att.com/news/0893/930831.nca.html, 3 pages (Aug. 31, 1993).
What Is A Financial Transaction Switch?, NCR Reports—Financial Services Trends & Technologies, NCR Corporation, vol. 1, Issue 6, 6 pages (1997).
Winig, E., "Cracking the Code," Washington Business Journal, vol. 20. No. 11, 2 pages (Jul. 20-26, 2001).
Wong et al., FSTC Check Image Quality Subproject Status and Project Plan Update, 6 pages (May 22, 1996).
You Have Requested Data From 32 Answers—Continue? Y/(N): Y, INSPEC, pp. 175-198 (2001).
"Proposal to Faster Payments Task Force," Faster Payments Qiat, The Clearing House and FIS, Feb. 21, 2017, 170 pages.
Caron, in "The Evolving Payments Landscape," in IEEEE Compute Society, 2018 (Year: 2018).
"TCH Real-Time Payments BAFT/ABA Global Payments Symposium," The ClearingHouse, Jul. 14, 2016, 6 pages.
Davey, Peter, "Real-Time Payments: Addressing Decades-Old Chalenges Facing Treasury Professionals," The ClearingHouse, Mar. 2017, 28 pages.
"Information Interchange 2016—Hit it Out of the Park with Payments!", EastPay, Mar. 2, 2016, 6 pages.
"TCH Real-Time Payments," The ClearingHouse, Mar. 9, 2016, 18 pages.
"TCH Real-Time Payments," The ClearingHouse, Feb. 17, 2016, 12 pages.
"TCH Real-Time Payments Briefing for the OCC," The ClearingHouse, Mar. 18, 2016, 6 pages.
"TCH Real-Time Payments," The ClearingHouse, Oct. 7, 2016, 13 pages.
Ledford, Steve, "Real-time Payments Overview," The ClearingHouse, Oct. 3, 2016, 9 pages.
"Real-Time Payments Operations Playbook, Version 1.01," The ClearingHouse, May 2016, 48 pages.
"TCH Real-Time Payments," The ClearingHouse, Aug. 19, 2016, 17 pages.
"Appendix: Payment Opportunities Detail," The ClearingHouse, Real-time Payments Stockholder Engagement Session, New York, Jun. 14-15, 2016, 46 pages.
"U.S. Real-Time Payments Business Playbook, Version 1.03," The ClearingHouse, Mar. 2016, 45 pages.
"U.S. Real-Time Payments Technology Playbook, Version 1.0," The ClearingHouse, Nov. 2016, 35 pages.

\* cited by examiner

SECURE PAYMENT PROCESSING

CROSS-REFERENCE TO RELATED APPLICATION

This application claims priority to and is a Continuation of U.S. patent application Ser. No. 17/685,983, filed Mar. 3, 2022, which is a divisional application of U.S. patent application Ser. No. 14/926,112, filed Oct. 29, 2015, now U.S. Pat. No. 11,295,308, which claims priority to U.S. Provisional Patent Application No. 62/072,021, filed Oct. 29, 2014, which applications are incorporated herein by reference in their entirety.

BACKGROUND

In the recent past, consumers' options for making payment were relatively limited; the consumer physically presented the merchant with cash, a check, or a credit or debit card. In some instances, the consumer may have provided a credit card or debit card number over the phone. The opportunities for fraud were relatively limited so long as the cash, credit/debit card, or check was physically secure.

The mass adoption of the Web and mobile technology has resulted in a deluge of new payment options. For example, consumers may now register their credit/debit cards with on-line services such as PayPal, and provide payment for transactions over the Web using their PayPal account. Consumers may also register their credit/debit cards and bank accounts directly with on-line merchants. For example, consumers may register their credit/debit card account data with on-line merchants such as Amazon and eBay, and pay for purchases at those on-line merchants using their registered accounts. Even traditional bricks-and-mortar retailers now have an on-line presence and allow for consumers to register their credit/debit cards so as to facilitate payments.

The proliferation of mobile devices has spurred the development of new services that facilitate payment transactions in the mobile space. Mobile payment service providers, which may be referred to as mobile wallet or virtual wallet providers, vary in the mechanics of their operation, but many require that users register their credit or debit card accounts with the service. When consumers initiate payment transactions using their mobile devices via a virtual wallet service, the consumers' registered accounts are used to provide payment.

On-line and mobile payment services have proven to be convenient and have facilitated commerce in the on-line and mobile spaces. However, these services have not come without downsides. In particular, the distribution of consumers' credit/debit card account information and bank account information to numerous different entities has increased the opportunity for consumers' sensitive information to be compromised. For example, in the scenario where a consumer has registered his or her credit card with an on-line payment service, an on-line merchant, and a mobile wallet service, a breach in security at any one of these three entities could result in the consumer's account information being compromised. As the number of payment services continues to proliferate and the complexity of payment transactions escalates, the opportunities for a consumer's financial account data to be compromised will likewise increase.

SUMMARY

Applicants have developed computer systems and computer-implemented methods for payment transaction processing. According to one aspect of the disclosed embodiments, consumers' account information including account numbers is maintained on a secure system which may be referred to as an issuer vault system. The issuer vault system generates payment items, which correspond to consumer account information and which replicate the structure of the account information but do not include consumers' actual account number. The payment items, rather than the actual account information, are communicated to on-line and mobile payment services for use by consumers in payment transactions. When a consumer uses a payment item in a payment transaction and the transaction undergoes authorization processing, the payment authorization network uses the payment item to request and receive the actual account information from the issuer vault system. The authorization network uses the actual account information for the limited use of authorizing the transaction. Once the transaction has been authorized using the actual account information, the processing of the transaction continues using the payment item information rather than the actual account information.

According to an example embodiment, account information such as, for example, credit card account information is maintained at the issuer vault system. Payment items, which may be referred to as tokens, are generated by the issuer vault system for the accounts stored on the system. The payment items are generated so as to have a format that is consistent with formatting that is traditionally applied to actual account numbers. For example, in a scenario wherein the accounts correspond to credit or debit cards, the account information stored with the account may comprise track 1 and/or track 2 formatted data corresponding to the magnetic stripes that are traditionally included on credit/debit cards. Track 1 and track 2 data comprises a primary account number (PAN). The payment items that are generated by the issuer vault system may be formatted so as to correspond to the track 1 and/or track 2 formatting and may comprise a temporary identification number that corresponds to the actual primary account number (PAN).

A second computing system, which may be referred to as a secure cloud system, operates as an interface to the issuer vault system. Messages to and from the issuer vault system are routed through the secure cloud system. The payment items, and not the actual account numbers, are transmitted from the issuer vault system via the secure cloud computing system to a third computing system such as, for example, virtual wallet provider system.

The wallet provider system uses the payment item in the same manner as it would otherwise use actual account information. For example, a consumer may download the payment item from the wallet provider system to their mobile device and present the payment item to a merchant in the same manner that the consumer would download the actual account information to their mobile device. In the example scenario where the relevant account is a credit card account, the mobile device may download a payment item comprising data formatted as track 1 and/or track 2 data and including a temporary identification number formatted similar to a primary account number.

At a merchant system, the payment item data received from the mobile device is processed in the same fashion as the actual account information would be processed had it been received from the mobile device. Accordingly, the merchant system transmits the payment item data for authorization processing of the payment transaction.

An acquirer computing system receives the authorization request and payment item. Generally, the acquirer system forwards payment transactions to a specialized authorization network such as, for example, a credit card authorization network. According to an aspect of the disclosed embodiments, the acquirer computing system identifies from the payment item data that the particular transaction requires further processing at the secure cloud computing system prior to communication to the authorization network. In an exemplary scenario, the acquirer computing system may identify a bank identification number (BIN) in the payment item data that indicates to the acquirer system that the payment item should be routed to the secure cloud computing system.

The secure cloud system identifies that the particular request should be transmitted to the issuer vault system. For example, in an example scenario, the secure cloud system may identify that for the BIN in the payment item data, the payment item data should be communicated to the particular issuer vault system, which may be one of many issuer vault systems.

The issuer vault system uses the payment item data to search its computing memory for the actual account number corresponding to the received payment item data. Upon locating the actual account number corresponding to the payment item data, the issuer vault system generates a response comprising the actual account number. In an example scenario, wherein the payment data comprises data formatted as track 1 and/or track 2 data, the issuer vault system may identify the primary account number (PAN) and include the PAN in the response. The response is communicated to the secure cloud system.

The secure cloud system communicates the responsive information including the actual account number that was received from the issuer vault system to the acquirer system. In an example scenario, the secure cloud system transmits the primary account number (PAN) typically included in the track 1 and 2 data of a magnetic card stripe.

The acquirer system then generates and communicates a request to the authorization network so that the payment for the transaction can proceed through authorization process. The generated request comprises the actual account number, e.g., PAN, that was received from the issuer vault system via the secure cloud system. The authorization process continues through its normal processing which may include transmitting the actual account information to the bank issuer.

The acquirer system receives a response from the authorization system. The acquirer system then prepares and communicates a response for eventual receipt at the merchant system. The acquirer system formats the response so as to be consistent with the request that had been initiated by the merchant terminal. For example, the acquirer system prepares a response that comprises the payment item data as received from the merchant terminal, and not the actual account number. In an example scenario, the acquirer system formats the response to include the payment item data that was received in the original request rather than the primary account number that was retrieved from the issuer vault computing system and transmitted to the authorization network.

The response is received at the merchant terminal where it is used by the merchant to either complete the sale or to deny the transaction.

In the disclosed systems and methods, consumers are able use payment technologies such as virtual wallets, while the consumers' account data is isolated and secure at the issuer vault system. Accordingly, the opportunity for consumers' data to be compromised is reduced.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Figure 1:
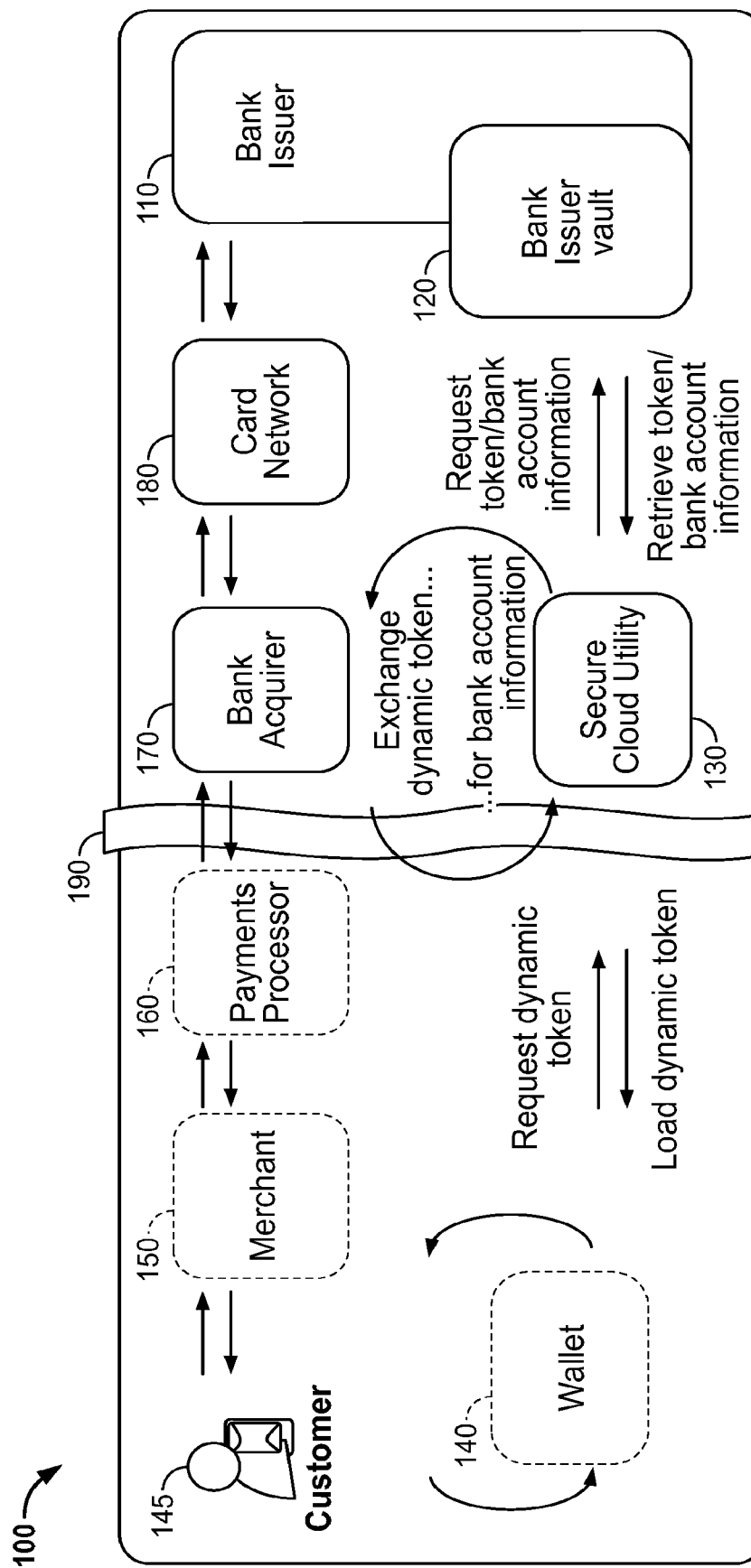
FIG. 1 is a diagram of an illustrative environment for payment processing.

FIG. 1 depicts an example arrangement of systems in a payment transaction environment 100. As shown, environment 100 comprises one or more issuer vault systems 120. Issuer vault systems 120 operate to store consumer financial account data, to generate payment items for use by consumers in performing payment transactions, and to respond to requested payment transactions by retrieving the actual account information. Issuer vault systems 120 may comprise account data regarding any type of financial account that may be used in providing payment. For example, issuer vault system 120 may comprise account data regarding credit card accounts, debit card accounts, bank accounts, or any other type of financial account that may be used to provide payment. Issuer vault systems 120 are typically operated by or on behalf of the financial institutions such as banks. It should be appreciated that while only one issuer vault system 120 is depicted in FIG. 1, a plurality of issuer vault systems 120 may be employed. Further, the plurality of vault systems may be associated with different institutions such as, for example, different banks, each of which may issue credit and debit cards.

Payment items, which may be referred to as tokens, are generated by issuer vault system 120 for the accounts stored on the system. Issuer vault system 120 may generate payment items on its own initiation when, for example, it determines that a particular account is likely to need a payment item for use in a transaction. Issuer vault system 120 may also generate payment items in response to a request for a payment item that is received from an external system. The payment items are generated so as to have a format that is consistent with any formatting that is traditionally applied to the actual account information. In an example scenario wherein the accounts correspond to credit or debit cards, the account information stored with the account may comprise track 1 and/or track 2 formatted data corresponding to the magnetic stripes traditionally included on credit/debit cards. In such a scenario, the account information further comprises a primary account number (PAN) that is typically comprised in track 1 and track 2 data. Where the account data comprises track 1 and/or track 2 data, the payment items generated by issuer vault computing system 120 may be formatted so as to correspond to the track 1 and/or track 2 data. The payment items may comprise a temporary identification number that corresponds to the actual primary account number (PAN).

Issuer vault system 120 is communicatively coupled to second computing system 130, which may be referred to as a secure cloud system. Secure cloud system 130 operates as an interface to the issuer vault system 120. Requests to and responses from issuer vault system 120 are routed through secure cloud 130. The payment items, rather than the actual account numbers, are transmitted from issuer vault system 120 via secure cloud system 130 to a third computing system such as, for example, virtual wallet provider system 140. It should be appreciated that while only one secure cloud system 130 is depicted in FIG. 1, a plurality of secure cloud systems 130 may be employed. Further, the plurality of secure cloud systems may be operable to communicate with a plurality of issuer vault systems 120.

Wallet provider system 140 is a system that provides virtual wallet services to consumers. For example, wallet provider system 140 allows consumers to provide payment using their mobile devices. In connection with the methods described herein, wallet provider system 140 processes the payment item in the same manner as it would typically processes actual account information. For example, consumer 145 may download the payment item from wallet provider system 140 to their mobile device and present the payment item to a merchant in the same manner that consumer 145 might download the actual account information to their mobile device. In the example scenario where the relevant account is a credit card account, the consumer's mobile device may download a payment item comprising data formatted as track 1 and/or track 2 data.

Merchant system 150 is a system employed by a merchant to conduct payment transactions. For example, merchant system 150 may be a point of sale system that is adapted to receive credit card information in payment for goods or services. In connection with the processes described herein, at merchant system 150, the payment item data received from the mobile device may be processed in the same fashion as the actual account information would be processed had it been received from the mobile device. Accordingly, merchant system 150 transmits the payment item data to payment processor system 160. In the scenario where the payment item is formatted as track 1 and/or track 2 data associated with a credit card, the payment item track 1 and/or track 2 data is transmitted to payment processor system 160.

Generally, a payment processor is a company (often a third party) appointed by a merchant to handle credit card transactions for merchant acquiring banks. Payment processors often have connections to various card associations and supply authorization and settlement services to the merchant banks' merchants. In an operation that will usually take a few seconds, the payment processor will both check the details received by forwarding them to the respective card's issuing bank or card association for verification, and also carry out a series of anti-fraud measures against the transaction. Referring to FIG. 1, payment processor system 160 receives the transaction payment request from merchant system 150 and transmits the request to acquirer computing system 170.

Generally, an acquirer, or acquiring bank, is the bank or financial institution that processes credit and or debit card payments for a merchant. The term acquirer indicates that the bank accepts or acquires credit card payment from the card-issuing banks within a card association such as, for example, Visa, MasterCard, Discover, American Express, etc. Referring again to FIG. 1, acquirer computing system 170 processes authorization requests originating from merchant system 150. Generally, acquirer computing system 170 communicates received payment transaction data to authorization network 180 for payment authorization. According to an aspect of the disclosed embodiments, acquirer computing system 170 identifies from the payment item data that the particular transaction requires further processing at the secure cloud system 130 prior to communicating the transaction to authorization network 180. More particularly, acquirer system 170 analyzes the received payment item data and determines that processing should be forwarded to secure cloud 130. In an exemplary scenario, acquirer computing system 170 may identify a bank identification number (BIN) in the payment item data that indicates to acquirer system 170 that the payment item should be routed to secure cloud system 130.

Secure cloud system 130 processes the payment item data received from acquirer system 170 to identify that the particular request should be transmitted to issuer vault system 120, which may be one of a plurality of different issuer vault systems. For example, in an illustrative scenario, secure cloud system 130 retrieves a BIN value from the payment item and searches its database for one of a plurality of different issuer vault systems that corresponds to the particular BIN. In an example scenario, secure cloud system searches its database and identifies that based on the BIN the request should be forwarded to issuer vault system 120.

Issuer vault system 120 uses the payment item data to search its computing memory for the actual account number corresponding to the received payment item data. Upon locating the actual account number corresponding to the payment item data, issuer vault system 120 generates a response comprising the actual account number. In an example scenario, wherein the payment item data comprises data formatted as track 1 and/or track 2 data, the issuer vault system 120 may identify the primary account number (PAN) and include the PAN in the response. The response is communicated to secure cloud system 130.

Secure cloud system 130 communicates the responsive information including the actual account number that was received from issuer vault system 120 to acquirer system 170. In an example scenario, secure cloud system 130 transmits the actual primary account number (PAN) for the account.

Acquirer system 170 then generates and communicates a request to authorization network 180 so that the payment for the transaction can proceed through authorization process. The generated request comprises the actual account number that was received from issuer vault system 120 via secure cloud system 130. In an example scenario involving a credit card account, the primary access number (PAN) that was retrieve from issuer vault system 120 is communicated. Authorization network 180 may comprise any of the plurality of networks that operate to provide transaction authorization including, for example, VISA, MasterCard, Discover, American Express, etc. Authorization network 180 continues through its processes which may include transmitting the actual account information to the bank issuer system 110.

Acquirer system 170 receives a response from authorization system 180. For example, the response may indicate that the transaction has been authorized or alternatively that the transaction has been denied. Acquirer system 170 then prepares and communicates a response for eventual receipt at merchant system 150. Acquirer system 170 formats the response so as to be consistent with the request that had been initiated by the merchant terminal. In an example scenario, acquirer system 170 formats the response to include the payment item data that was received in the original request rather than the primary account number that was retrieved from issuer vault system 120 and transmitted to authorization network 180.

The response is received at merchant terminal 150 where it is used by the merchant to either complete the sale or to deny the transaction.

Accordingly, in the disclosed embodiment, the consumer's actual account information is maintained at issuer vault system 120 and shared only as needed to complete authorization of a transaction and only with a minimum number of computing systems. For example, in the disclosed embodiment, the actual account number information is not stored on or otherwise shared with wallet provider system 140, merchant system 150, or payment processor system 160. Accordingly, the opportunities for the consumer's information to be compromised have been minimized.

Figure 2:
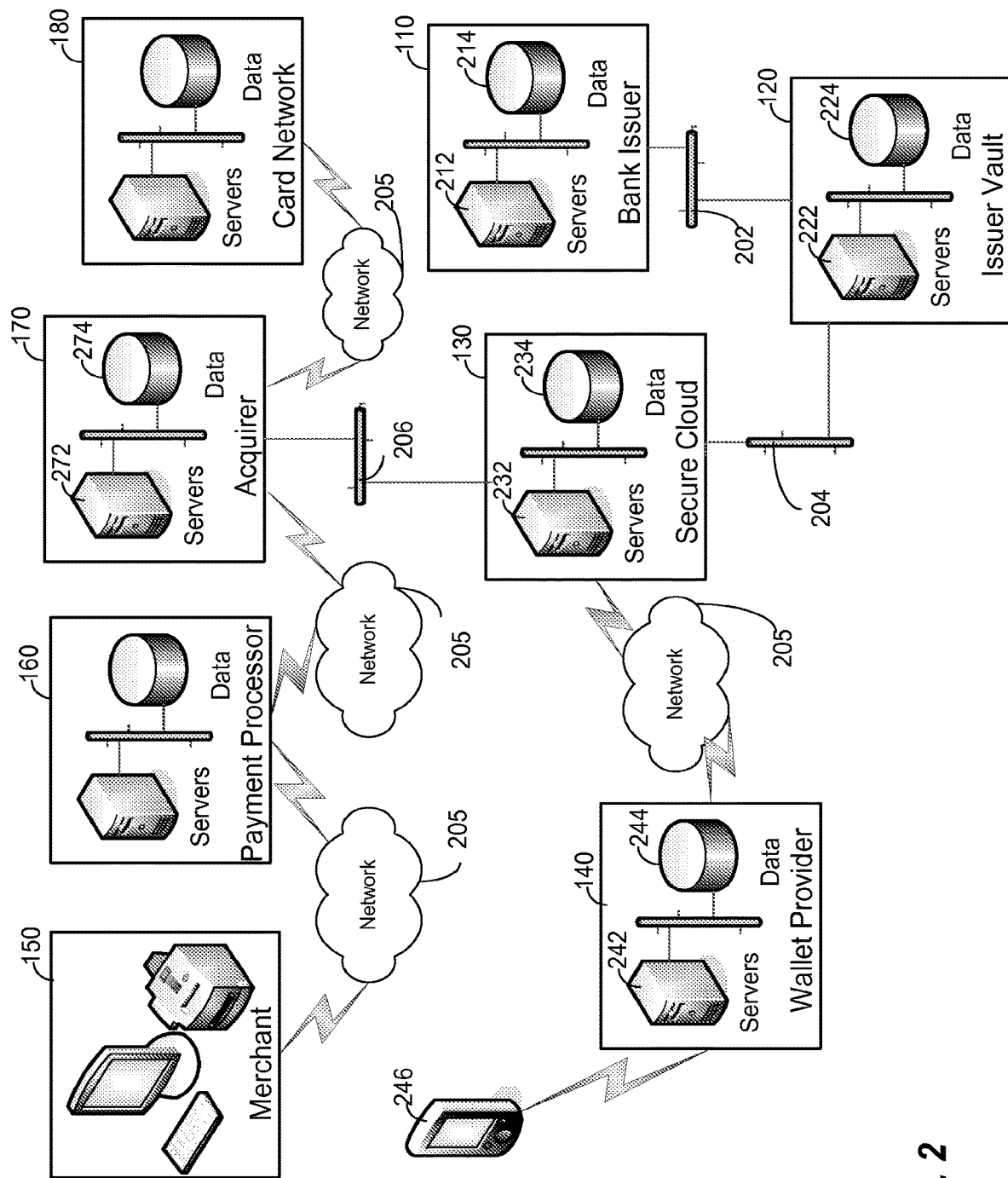
FIG. 2 is a diagram depicting networked systems in a payment processing system.

FIG. 2 depicts an illustrative diagram depicting component parts of an example payment processing environment. As shown, issuer vault computing system 120 comprises computing servers 222 and computing memory storage 224. In an example embodiment, computing memory storage 224 has stored therein data regarding consumer accounts. The account data may correspond to any financial account that might be used in a consumer's payment transaction. For example the account data may comprise data corresponding to credit card accounts, debit card accounts, checking accounts, or any other type of account. In an example embodiment, issuer computing memory storage 224 may comprise for each account, data identifying, for example: an account number; an account reference number; a wallet provider identifier identifying any wallet provider that is registered to perform transactions using the account, and any other relevant account information. Issuer computing memory storage 224 may further comprise data identifying any payment items that may be generated for a particular account. For example, issuer computing memory storage 224 may have stored therein data identifying for any one account, one or more of the following: a payment item identifier; a payment item; a payment item expiration date; a payment item transaction dollar limit; a payment item transaction number limit; and any other information needed to perform the processing as described herein.

Issuer vault server 222 is programmed with instructions to provide the processing as described herein in connection with the issuer vault system 120. For example, issuer vault server 222 may comprise instructions to interface with secure cloud 130, to search computing memory storage 224, to retrieve data from issuer computing memory storage 224, and to update information stored in computing memory storage 224. For example, issuer vault server 222 may be programmed with instructions to perform logic such as generating payment items, transmitting payment items, receiving a request for actual account number corresponding to a payment item, searching for an account number corresponding to the payment item, and returning an account number.

Issuer vault system 120 is communicatively coupled to secure cloud system 130 using any suitable networking technology. In an example embodiment, issuer vault system 120 and secure cloud system 130 are communicatively coupled using dedicated communications links 204 and may employ secure socket layer protocols during communications.

In an example embodiment, secure cloud system 130 comprises computing server 232 and cloud computing memory storage 234. Computing memory storage 234 may have stored therein data used in performing the functions described herein in connection with secure cloud system 130. In an example embodiment, cloud computing memory storage 234 has stored therein data that allows secure cloud system 130 to route communications to and from issuer vault 120. For example, secure cloud computing memory storage 224 may have data specifying a mapping between BIN numbers and issuer vault systems 120.

Secure cloud server 232 is programmed with instructions to provide the processing as described herein in connection secure cloud system 130. For example, secure cloud server 232 may comprise instructions to interface with issuer vault 120, to interface with acquirer system 170, and to interface with wallet provider 140. Secure cloud server 232 may be programmed with instructions to receive a request from acquirer system 170, search computing memory 234 for an issuer vault corresponding to a payment item, and transmit a request to the identified issuer vault 120.

Secure cloud system 130 is communicatively coupled to wallet provider system 140 using any suitable networking technology. In an example embodiment, secure cloud system 130 and wallet provider 140 may be communicatively coupled using an Internet link 205. The communications may be made using secure protocols such as secure sockets and HTTPS.

In an example embodiment, wallet provider system 140 comprises computing server 242 and computing memory storage 244. Wallet computing memory storage 244 may have stored therein data used in the performing the functions described herein in connection with wallet provider system 140. In an example embodiment, wallet provider memory storage 244 may have stored therein data specifying details regarding consumers' wallets including any payment items that have been received from issuer vault system 120. For example, wallet provider memory storage 244 may have stored therein, for each of a plurality of wallet accounts, data specifying one or more payment accounts (e.g., debit/credit card) that are associated with the particular wallet account. Further, wallet provider memory storage 244 may have stored therein, for each payment account, data specifying any payment items that have been provisioned to the wallet for the particular account.

Wallet provider server 242 is programmed with instructions to provide the processing as described herein in connection wallet provider system 140. For example, wallet provider server 242 may comprise instructions to interface with secure cloud 130 to request and receive payment items. Wallet provider server 242 may be programmed to interface with consumers' mobile devices 246 to download payment items for use in payment transactions.

In an example embodiment, acquirer system 170 comprises computing server 272 and computing memory storage 274. Acquirer computing memory storage 274 may have stored therein data used in performing the functions described herein in connection with acquirer computing system 170. In an example embodiment, acquirer computing memory storage 274 has stored therein data specifying bank identification numbers (BINs) that identify instances wherein processing should be transferred to secure cloud system 130 for identification of an actual or real account number.

Acquirer server 272 is programmed with instructions to provide the processing as described herein in connection acquirer system 170. For example, acquirer server 272 may comprise instructions to perform the following: receive payment authorization requests originating from merchant computing system 150; identify a request requires processing at secure cloud 130; and transmit request for authorization to authorization network 180.

Acquirer system 170 is communicatively coupled with secure cloud system 130 using any suitable networking technology. In an example embodiment, secure cloud system 130 and acquirer system 170 are communicatively coupled using dedicated communications links 206 and may employ secure socket connections during communications.

Each of merchant system 150, payment processor system 160, authorization network 180, and bank issuer 110 similarly comprise computing memory and server computing systems that are programmed so as to provide the processing described herein. Communications between and amongst merchant system 150, payment processor system 160, acquirer system 270, and authorization network 180 is made via any suitable networking technologies. In an example embodiment communications may be made via an Internet link 205 with secure protocols.

Figure 3:
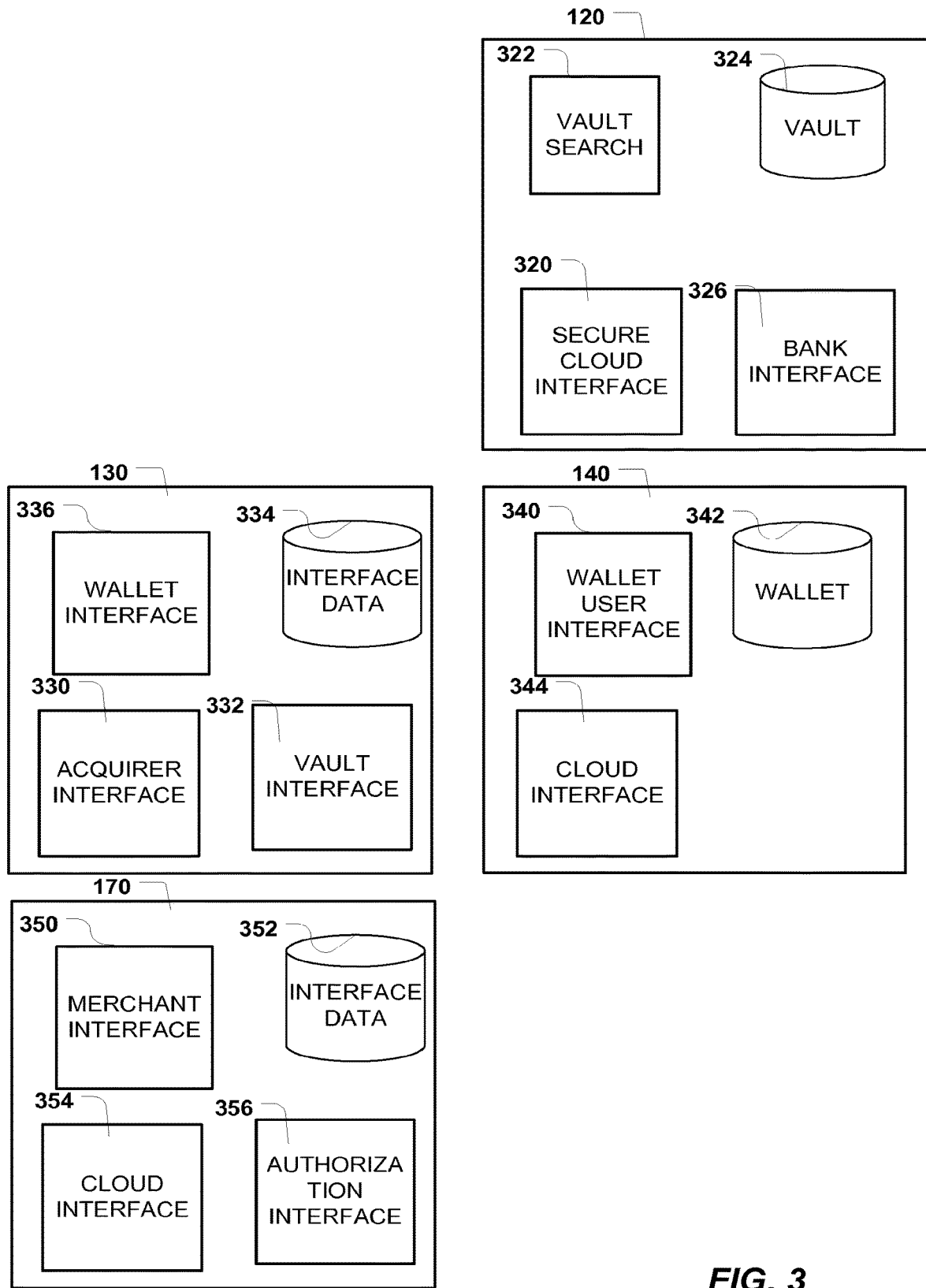
FIG. 3 is a diagram depicting functional components of illustrative systems.

FIG. 3 depicts a block diagram illustrating example logical components of systems 120, 130, 140, and 170. It should be appreciated that the described components may comprise hardware and software.

Issuer vault system 120 comprises vault database 324 which may have stored therein data relating to the financial accounts for which payment processing may be undertaken. In an example embodiment, vault database 324 may have stored therein data identifying credit card accounts, debit card accounts, checking accounts, or any other type of account. The data may comprise for each account: an account number; an account reference number; a wallet provider identifier identifying any wallet provider that is registered to perform transactions using the account, and any other relevant account information. Vault database 324 may further comprise data identifying any payment items that may be generated for a particular account. In an example embodiment, vault database 324 may have stored therein data identifying for any one account, one or more of the following: a payment item identifier; a payment item; a payment item expiration date; a payment item transaction dollar limit; a payment item transaction number limit; and any other information needed to perform the processing as described herein.

Vault search server 322 operates to search and retrieve information from vault database 324. Accordingly, when requests are received at issuer vault 120, vault search server 322 may operate to access vault database 324 in order to actually provide the requested data and processing.

Secure cloud interface server 320 operates to receive requests from secure cloud system 130 and to forward responses to secure cloud system 130. For example, when a request is received from secure cloud system 130 to provide account data corresponding to a payment item, secure cloud interface 320 receives the request, coordinates retrieving the relevant data, and communicating a response.

Bank interface server 326 operates to handle interactions with issuer system 110. For example, when bank issuer system 110 requests to update information regarding accounts stored in vault database 324, bank interface server 326 receives the request, coordinates accesses to vault 324, and communicates a response.

Secure cloud system 130 comprises interface database 334 which may have stored therein data specifying the mapping between wallet providers 140 and issuer vault systems 120. The mapping may identify for each wallet provider the vault systems that have accounts active at the wallet provider. Interface database 334 may also have stored therein data specifying for the issuer vault systems that correspond to each of a set of bank identification numbers or issue identification numbers.

Vault interface server 332 operates to receive and respond to requests from issuer vault system 120. For example, requests from issuer vault system 120 to push a payment item are handled by vault interface 332. Similarly, requests to issuer vault system 120 to provide an account number corresponding to a payment item may be handled by vault interface 332.

Wallet interface server 336 operates to receive requests from wallet provider system 140 and to forward responses and requests to wallet provider system 140. For example, when a request is received from wallet provider system 140 to provide a payment item, the wallet provider interface coordinates processing of the request including return of the response which may include the requested payment item. Similarly, when a payment item is being pushed to a wallet, wallet interface 336 performs the processing.

Acquirer interface server 330 operates to receive and respond to requests from acquirer system 170. For example, when a request is received from acquirer system 170 for an account number corresponding to a payment item, acquirer interface 330 receives the request, coordinates responsive processing, and returns the response to acquirer system 170.

Wallet provider system 140 comprises wallet database 342 which may have stored therein data relating to activities of the wallet service. For example, wallet database 342 may have account data for the users of the virtual wallet service. The database may comprise account numbers along with related information for the account including, for example, the individual or user who owns the account and the credit or debit card accounts that have been associated with the particular wallet account. Further, the database may comprise for each debit or credit card account, data identifying the payment items that have been provisioned for use in the wallet. Still further, wallet database may comprise data identifying whether payment items have been used in payment transactions and related details including, for example, payment amounts, dates of payments, and transaction numbers.

Wallet user interface server 340 corresponds to the wallet specific functions such as those that are typically experienced by users of the wallet. For example, when a user wishes to manage his or her account or use the wallet for a transaction, wallet user interface server 340 may be used.

Cloud interface server 344 provides functionality for interfacing with secure cloud system 130. For example, cloud interface server 344 operates to receive requests from secure cloud system 130 and to respond to those requests. For example, when a request is received from secure cloud 130 to provision a payment item, cloud interface server 344 coordinates processing of the request including receiving the payment item, coordinating storing of the payment item, and communicating a response.

Acquirer system 170 comprises interface data 352 which may have stored therein data that is used to route requests to the appropriate system or service. For example, database 352 may have stored therein data specifying issuer vaults responsible for processing of payment items with particular BIN's. Acquirer database 352 may further comprise information regarding payment transactions that have been communicated to acquirer system 170 for approval. For example, acquirer database 352 may have stored therein for each transaction that has been forwarded, a transaction number, a transaction date, a transaction amount, an account number (which may be, in some instances, a temporary identification number), and an indication of whether the transaction has been authorized.

Merchant interface server 350 operates to receive and respond to requests from merchant system 150. For example, when a request is received from merchant system 150 to authorize a transaction, merchant interface server processes the request. For example, merchant interface server 350 may analyze the request to determine whether the request requires further processing at secure cloud 130 prior to processing at authorization system 180.

Cloud interface server 354 operates to communicate information to and receive information from secure cloud system 130. For example, when acquirer system 170 determines based upon the received BIN number that processing is required at secure cloud 130, cloud interface server 354 processes that request. Likewise, when a response is received from the secure cloud system 130 containing an actual account number, cloud interface server 354 processes the response.

Authorization interface server 356 operates to process to communicate information to and receive information from authorization system 180. For example, a request by acquirer 170 to authorize a payment transaction may be communicated by authorization interface 356 to authorization network 180, and to receive any response from authorization network 180.

Payment Item Format

As noted above, issuer vault system 120 generates payment items which are used by wallet provider system 140 and consumer mobile device 246 to provide payment. During generation of the payment items, the payment items are formatted so as to be compatible with a consumer's actual account data. For example, in an embodiment wherein the customer accounts are credit and/or debit card accounts, issuer vault system 120 may store data formatted to be compatible with track 1 and/or track 2 formatted data that is typically stored in the magnetic strip of physical credit/debit cards.

Figure 4:
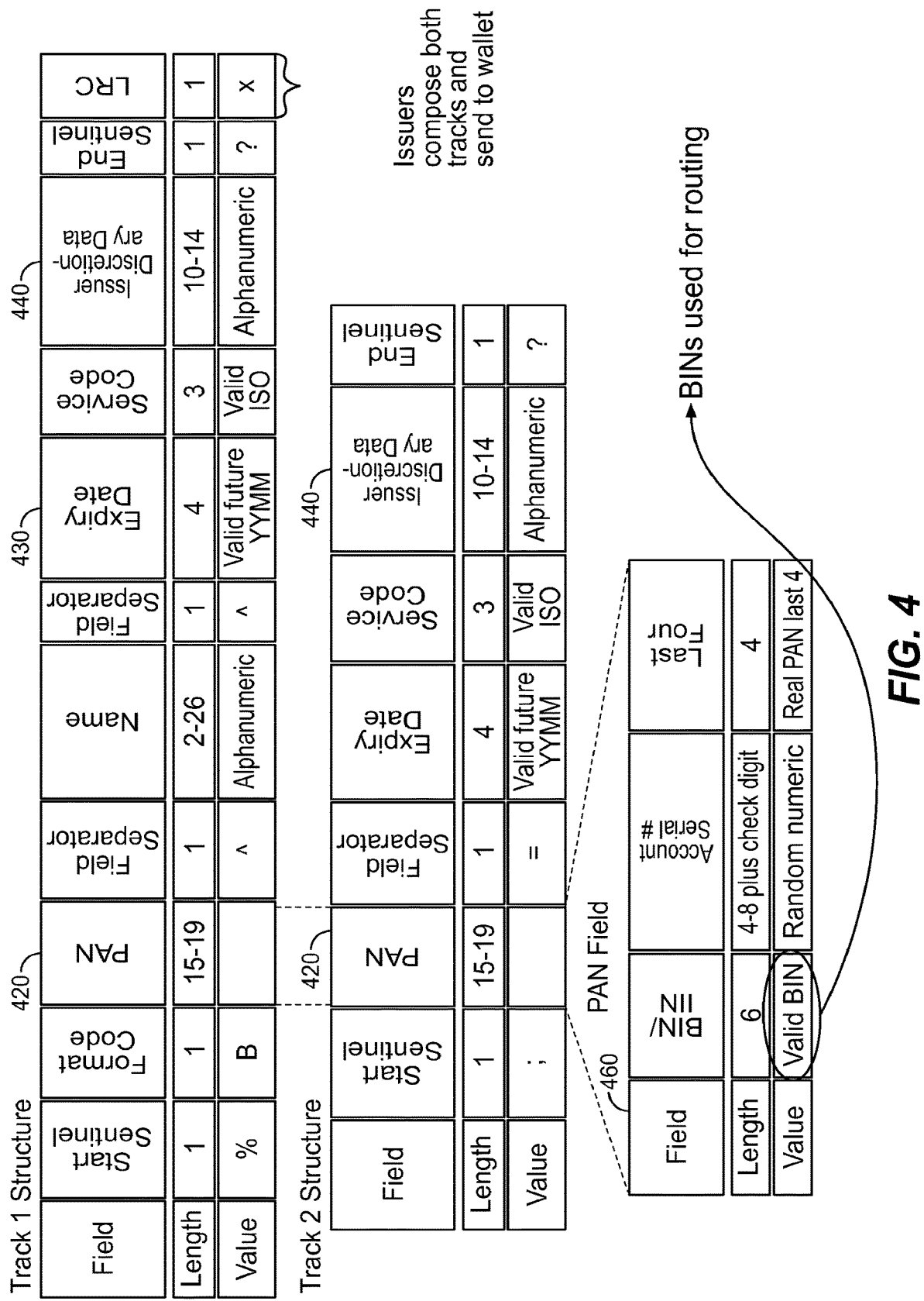
FIG. 4 is a diagram depicting example payment item formatting.

FIG. 4 includes a diagram depicting the typical structure of track 1 and track 2 data. Issuer vault system 120 may follow such formatting structure when generating payment items. As shown, track 1 formatted data comprises a series of defined fields that are separated by field separators. Track 2 formatted data similarly comprises a series of fields that are defined by field separators. Track 1 formatted data is typically longer than track 2 data and comprises several additional fields. Both track 1 and track 2 comprise, for example: field 420 designated to hold a primary account number (PAN); field 430 designated to hold an expiration date indicating the date the particular card account expires; and field 440 designated to hold issuer discretionary data. In some embodiments, the payment item data may specify a version identifying the version of the track 1/track2 format used for the particular payment item. In the context of credit cards and debit cards, the PAN generally is the number that appears on the physical card and the contents of which specify both the issuer of the card and the cardholder account.

Issuer vault system 120 generates payment items so as to be compatible with track 1 and track 2 formatting, but does not include the actual account number in the data. In other words, the actual card number is not included in the data generated by issuer account system 120. With respect to the PAN field, issuer account system 120 generates temporary identification number or value 460 that corresponds to the formatting requirement of the PAN field in the track 1 and/or track 2 data. According to track 1 and track 2 formatting specifications, the PAN, and therefore the temporary identification number 460 may comprise 15 to 19 digits. As shown, and consistent with track 1 and track 2 formatting, the leftmost data item specifies the length of the field. Issuer vault system 120 may generate the temporary identification number so that it uniquely identifies the payment item for a particular combination of wallet service provider and issuer bank.

Consistent with typical PAN formatting, the next left most six (6) characters of the temporary identification value 460 are used to designate an issuer identification number (IIN) or bank identification number (BIN) which generally signifies the entity that is responsible for the financial account corresponding to the particular payment item. In connection with generating a payment item, issuer account system 120 generates a number that is used within the processing described herein to identify the particular issuer vault system 120. There may be a plurality of issuer vault systems 120, each having a unique leftmost set of digits to identify the particular issuer vault system.

According to an embodiment, issuer vault system 120 generates temporary identification value 460 so that the rightmost or last four spaces or digits are made to correspond to the last four digits of the actual or real PAN. For example, where the last four digits of the actual account number or PAN are 1212, issuer vault system 120 identifies the last four digits of the generated payment item as 1212.

With respect to the remaining digits, those between the leftmost digits identifying the BIN and the rightmost identifying the last four digits of the actual account number, issuer vault system 120 formats the data so as to create a unique identifier for the payment item and so that any format checking normally undertaken during transaction processing will be satisfied. Depending upon the length of the PAN field, the middle digits may vary in length from 4 to 8 characters in length. In an example embodiment, the middle digits comprise 6 characters or digits. In such a scenario, issuer vault system 120 selects the leftmost five digits of the middle six digits so that the five digits identify a unique identifier for those payment items that are currently being used for the particular issuer. The sixth digit of the middle six digits is selected so that a requirement of a check digit operation performed on the temporary identification number is satisfied. In an example embodiment, the check digit operation may be a checksum operation. More particularly, the checksum operation may be a modulus 10 operation. Issuer vault system 120 may perform a check sum operation by performing the following or similar operations: beginning with the second right most digit of the temporary identification number, doubling every other digit; for every digit wherein doubling the digit generates a number that is more than one digit, adding the digits of the number to obtain a single digit number; adding the digits of the temporary identification number to arrive at a sum; dividing the sum by 10 to arrive at a quotient; determining the temporary identification number is valid when the quotient is a whole number; and determining the temporary identification number is invalid when the quotient is not a whole number.

According to another potential embodiment, issuer vault system 120 generates a payment item so that a combination of the data stored in the PAN field and the data in the issuer discretionary data field provide uniqueness. According to track 1 and track 2 formatting, issuer discretionary data may vary from 10 to 14 characters (i.e., 10, 11, 12, 13, or 14). Issuer vault system 120 may use the additional characters of the issuer discretionary field 440 to generate unique payment items. More particularly, issuer vault system 120 may generate a temporary identification number as described above, but in some instances, may additionally select or generate issuer discretionary data so that the combination of the data in the PAN field and the data in the issuer discretionary data provide a unique combination for the particular issuer. The larger number of characters for use in providing randomness enables issuer vault system 120 to change payment items frequently while minimizing the possibility of depleting the pool of unique numbers. In anticipated embodiments, other fields of the track 1/track 2 data may also be combined with the PAN field to provide unique identifiers.

Push Provisioning of Payment Items

Figure 5:
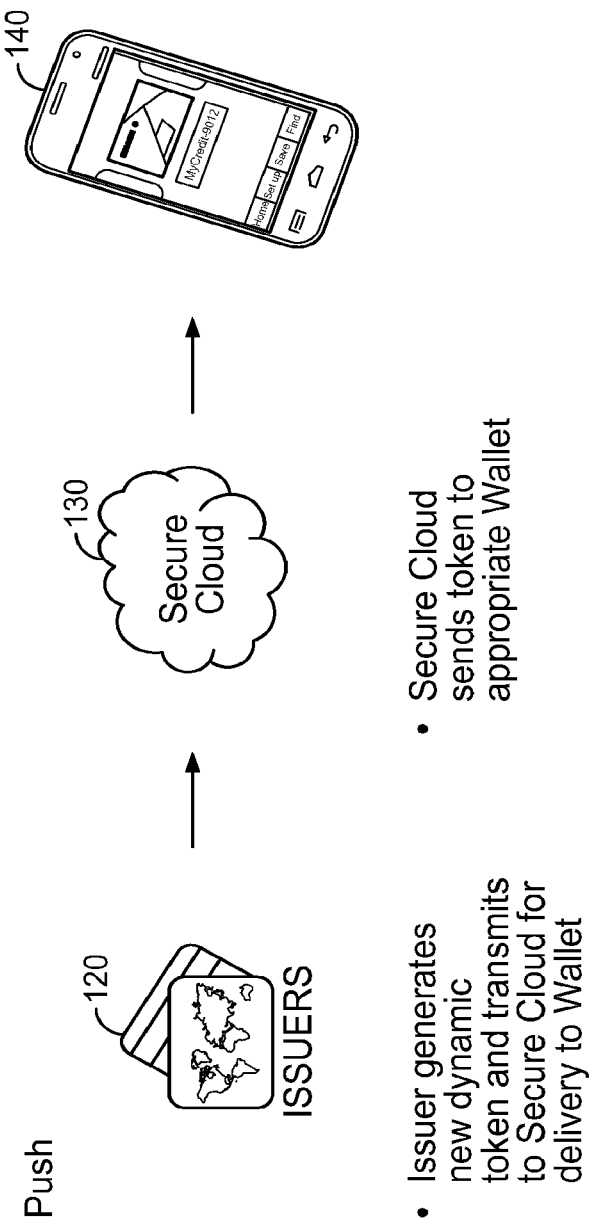
FIG. 5 is a diagram depicting push provisioning of payment items between systems.

In an example embodiment, issuer vault system 120 may initiate transmitting one or more payment items to a wallet provider account. The process of deploying a payment item when initiated by the issuer vault system 120 may be referred to as a "push." FIG. 5 provides a diagram depicting at a high processing level the "push" processing. As shown, issuer vault 120 generates one or more payment items for an account and transmits the generated payment items to secure cloud system 130. The payment items may be generated and transmitted individually in real time, or may be generated and transmitted in batch. In some instances where a communication link is not operating, payment items may be communicated via physically moving a storage device. Secure cloud system 130 transmits the generated items to virtual wallet provider 140. Virtual wallet provider 140 may generate and transmit a confirmation to issuer vault system 120 via secure cloud system 130.

Figure 6:
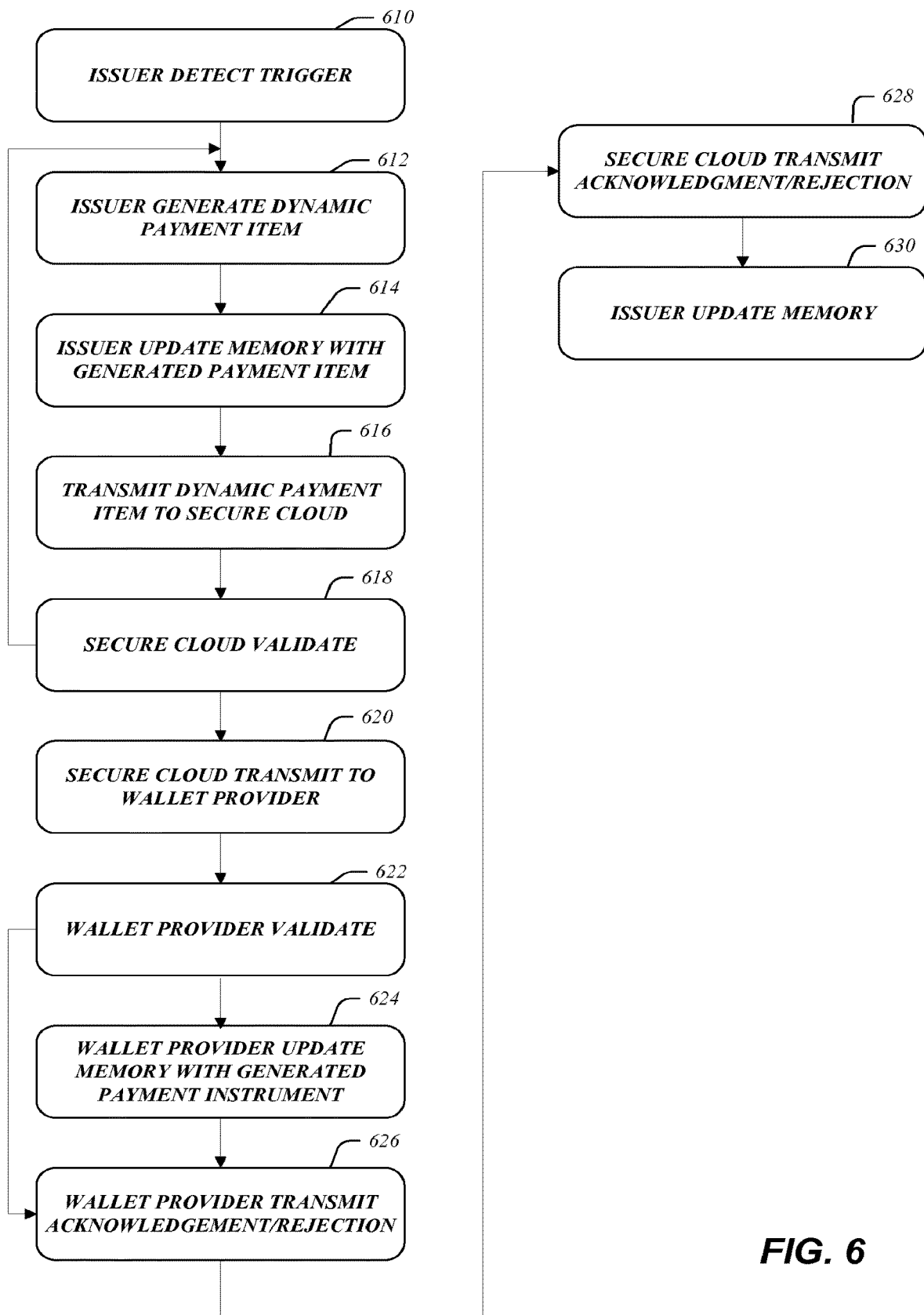
FIG. 6 is a flow diagram of an example process for push provisioning of payment items.

FIG. 6 provides a flow chart of example processing performed during push deployment of a payment item. At block 610, issuer vault system 120 detects a set of circumstances that triggers or causes it to generate one or more payment items. Issuer vault system 120 may initiate transmitting payment items when its processing of account data stored at issuer vault system 120 indicates that particular account on wallet provider 140 is likely to require an additional payment item. Any suitable criteria may be used by issuer vault system 120 in order to determine whether or not to generate payment items for a particular account. For example, issuer vault system 120 may search data 224 and compare the outstanding payment items for each account, which may be credit card accounts, to a threshold value. For example, the threshold may identify a minimum number of active payment items, i.e. those that have not been used, that should be associated with a credit card account and its primary account number. The threshold may alternatively identify the minimum number of active payment items that should be associated with a particular wallet provider account.

At block 612, issuer vault system 120 generates the one or more payment items. Issuer vault system 120 generates payment items so that the payment items correspond to formatting used for the actual account number. As discussed above in connection with FIG. 4, where the account numbers are credit or debit cards, issuer vault system 120 may generate payment items that conform to track 1 and/or track 2 credit card data and comprise a temporary identification number as described above that corresponds to the primary account number.

At block 614, issuer vault system 120 updates data storage 224 in computing memory 224 to reflect the new payment item. More particularly, issuer vault system 120 updates computing memory, which may comprise a database, to include the generated at least one payment item and data identifying a relationship to the identified account requiring a payment item. More particularly, issuer vault system 120 may store in memory the payment item including the temporary identification number and create a relationship in the database to the primary account number of the credit card to which the payment item relates. In an example scenario, issuer vault system 120 may store in a database: the payment item; a payment item identifier uniquely identifying the payment item; a payment item expiration date identifying a date after which the payment item is no longer valid; a wallet provider identifier identifying a virtual wallet service provider; a wallet instance identifier identifying an instance of a virtual identifier associated with a customer; an issuer identifier identifying an issuer of the generated at least one payment item; and an account reference number which may be used within the system to identify a particular account such as, for example, a credit or debit card, to which the particular payment item is related. In an example scenario, the wallet provider identifier may identify wallet provider 140 and the issuer identifier may identify issuer vault system 120. Issuer vault system 120 stores the primary account number, i.e., the actual account number to which the payment item relates, in relation to each payment item.

Issuer vault system 120 may further store in its database information specifying limitations regarding the use of the particular payment item. For example, the database may be updated to comprise information that specifies the payment item may only be used for transactions prior to a particular date or time. Likewise, the database may be updated to reflect that the payment item may only be used for transactions up to a certain dollar limit. Furthermore, the database may be updated to indicate the payment item may only be used in transactions by a particular mobile device such as one with a particular unique identifier or device fingerprint.

Still further, the database may be updated with information indicating the payment item may only be used in transactions in a particular geographic area.

At block 616, issuer vault system 120 transmits the generated payment item to secure cloud 130 for eventual receipt at wallet provider 140. In an example embodiment, issuer vault system 120 transmits: the generated at least one payment item, the payment item identifier uniquely identifying the payment item; the payment item expiration date identifying a date after which the payment item is no longer valid; a wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card. The payment item and the request to provision it are transmitted over a secure network connection to secure cloud system 130.

At block 618, secure cloud system 130 validates the request and the contents of the request. For example, secure cloud system 130 may check the message content to determine that all of the data items that it expects in a push provisioning request have been included and that they are valid values. In an example scenario, secure cloud system 130 may have stored in computing memory 234 data identifying valid values for a wallet provider identifiers and issuer identifiers, and a mapping showing established relationships between wallet provider identifiers and issuer identifiers noting entities. Secure cloud system 130 searches the data in its database and compares the received data to identify whether or not the data is valid and whether secure cloud system 130 is able to perform the requested push operation. If not, secure cloud system 130 generates and transmits a communication indicating there has been an error and identifying the reason for the error.

At block 620, assuming secure cloud system 130 has validated the request, secure cloud system 130 generates and transmits a request to wallet provider 140 to add the payment item to the wallet instance identified in the request. In an example embodiment, secure cloud system 130 generates and transmits a request that comprises the following data: the generated at least one payment item; the payment item identifier uniquely identifying the payment item; the payment item expiration date identifying a date after which the payment item is no longer valid; a wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card.

At block 622, wallet provider system 140 validates the request and the contents of the request. For example, wallet provider system 140 may check the message content to determine that all of the data items that it expects in a push provisioning request have been included and that they have valid values. In an example scenario, wallet provider system 140 may have stored in computing memory 244 data identifying all valid values for wallet provider identifiers and issuer identifiers, and a mapping showing established relationships between wallet provider identifiers and issuer identifiers. Wallet provider system 140 searches the data in its database and compares the received data to identify whether or not the data is valid and whether wallet provider system 140 is able to perform the requested push operation. If not, wallet provider system 140 generates and transmits a communication indicating there has been an error and identifying the reason for the error.

At block 624, assuming wallet provider 140 has validated the request, wallet provider 140 updates its computing memory to indicate the newly generated payment item has been provisioned and assigned to the wallet instance identified in the request. More particularly, wallet provider 140 may update data store 244 to associate the following information with the wallet instance identified by the wallet instance identifier: the generated at least one payment item; the payment item identifier uniquely identifying the payment item; the payment item expiration date identifying a date after which the payment item is no longer valid; the wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card.

At block 626, wallet provider 140 prepares and transmits a response to secure cloud 130. The response may be an error message identifying the reason that the requested push provisioning was ineffective. Alternatively, the response may generate and transmit a response indicating the push provisioning was effective. The response may comprise information identifying the particular provisioning request that was forwarded to wallet provider 140. For example, the response may comprise the following information: the wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card.

At block 628, secure cloud 130 receives the response and uses the issuer identifier to identify which issuer vault to which to forward the response. More particularly, secure cloud 130 retrieves the issuer identifier from the response and uses it to generate and forward the response to the appropriate issuer vault. The forwarded response may comprise the following: the wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card.

At block 630, issuer vault system 120 receives the response from secure cloud 130 and updates its computing memory to reflect the response. If the response indicates that the push provisioning was unsuccessful, issuer vault system 120 updates its memory to indicate the generated payment item has not been provisioned. If the response indicates the push provisioning was successful, issuer vault system 120 updates its memory to indicate the generated payment item has been provisioned.

Pull Provisioning of Payment Items

Figure 7:
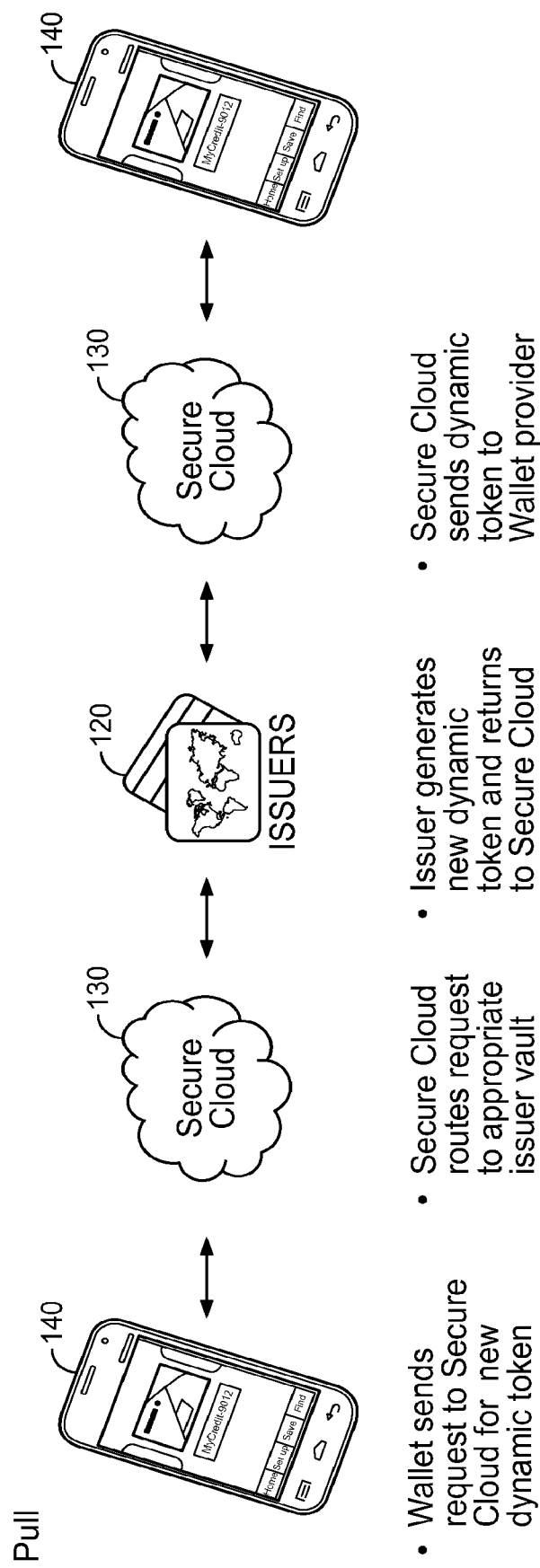
FIG. 7 is a diagram depicting pull provisioning of payment items between systems.

In an example embodiment, the generation and disposition of payment items also may be initiated by wallet provider 140. The process of deploying a payment item that is initiated by wallet provider system 140 may be referred to as a "pull" provisioning. FIG. 7 provides a diagram depicting at a high level the "pull" processing. As shown, wallet provider 140 generates a request for a payment item. The request may be in response to a request by a user of the wallet provider service 140 or may be initiated by the wallet provider service 140 based upon its own internal processing. The request is received at secure cloud 130 which may identify the particular issuer vault system to which the request should be routed based upon the wallet provider and wallet provider account identified in the request. Secure cloud system 130 then communicates the request to issuer vault system 120. Issuer vault system 120 generates the requested one or more payment items for the account identified in the request and transmits the generated payment items to secure cloud system 130. Secure cloud system 130 transmits the generated items to virtual wallet provider system 140. Virtual wallet provider system 140 stores the received payment item in memory and may generate and transmit a confirmation to issuer vault system 120 via secure cloud system 130.

Figure 8:
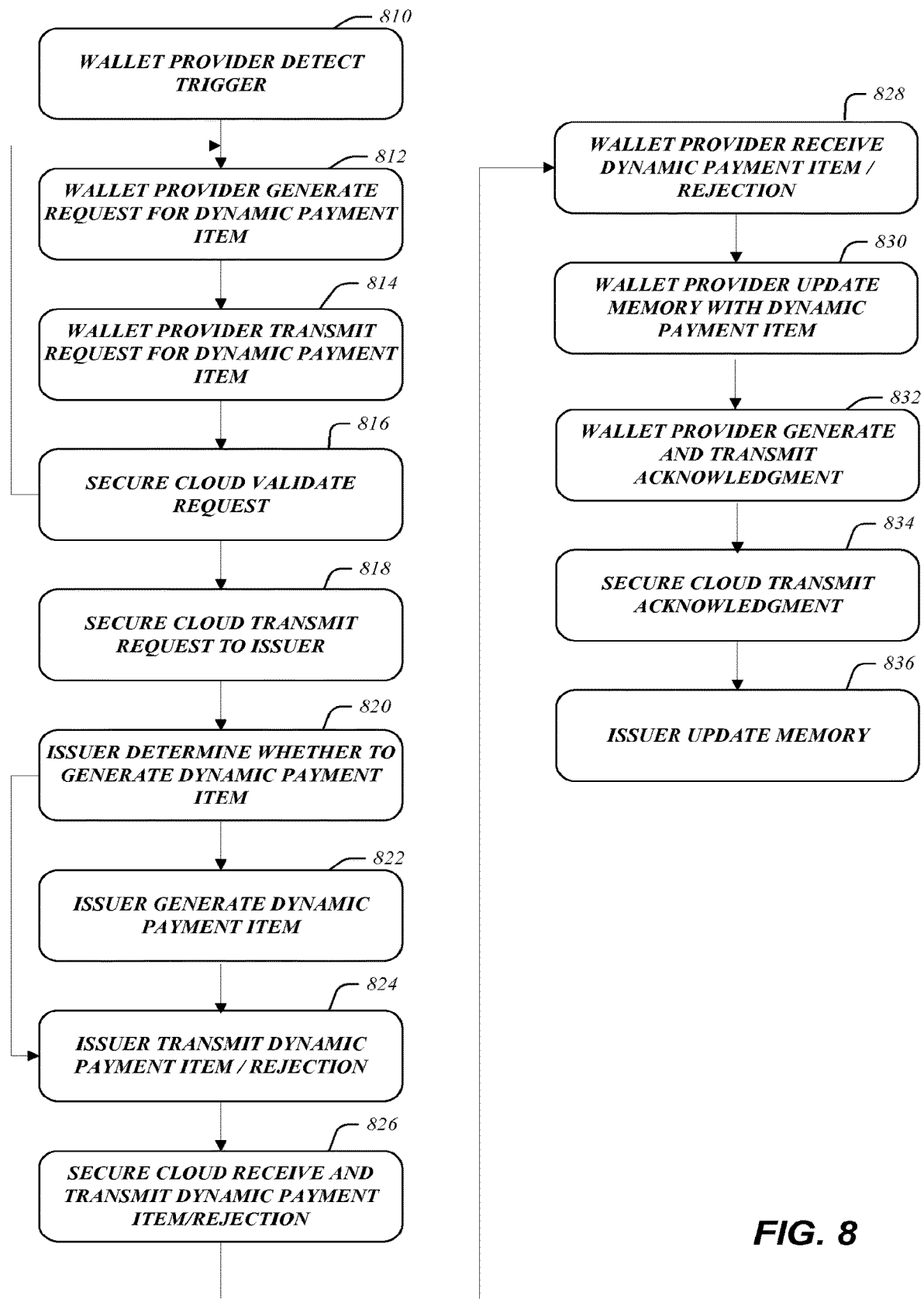
FIG. 8 is a flow diagram of an example process for pull provisioning of payment items.

FIG. 8 provides a flow chart of example processing performed during "pull" deployment of a payment item. At block 810, wallet provider system 140 detects a set of circumstances that triggers or causes it to generate a request for one or more payment items. For example, wallet provider system 140 may receive a request from a user of the wallet provider system 140 to retrieve additional payment identifiers. The user request for a payment item may be a request to purchase a good or service using the service. Alternatively, wallet service provider system 140 may initiate transmitting payment items when its processing of wallet account data stored at wallet provider system 140 indicates that a particular account on wallet provider 140 requires a payment item. Any suitable criteria may be used by wallet provider system 140 in order to determine whether or not to generate payment items for a particular account. For example, wallet provider system 140 may search data 244 and compare the number of payment items for each account to a threshold value. For example, the threshold may identify a minimum number of active payment items, i.e. those that have not been used, that should be associated with a wallet account or wallet instance. The threshold may alternatively determine that a particular wallet account requires a payment item after a period of time has expired since a new payment item was provisioned to the account.

At block 812, wallet provider 140 generates a request for a payment item. The request comprises information that allows the secure cloud to identify which issuer vault to which the request should be routed, as well as which wallet account to which the request is related. In an example embodiment, wallet provider system 140 generates a request comprising the following information: a wallet provider identifier identifying the virtual wallet service provider from which the request originated; a wallet instance identifier identifying an instance of a virtual identifier associated with a customer; an issuer identifier identifying an issuer to which the request for a payment item is directed; and an account reference number corresponding to a particular payment card.

At lock 814, wallet provider system 140 transmits the request for the payment item.

At block 816, secure cloud system 130 validates the received request. Secure cloud system 130 compares the received data items to data items specified in memory to determine if all of the data items were received and valid. Secure cloud system 130 maintains in computing memory 234 data specifying valid mappings between wallet providers and issuer vaults. Secure cloud system 130 validates that the wallet provider from which the request was received and as identified in the request is associated with the issuer vault system that is identified in the request. If secure cloud system 130 fails to validate the request, secure cloud system 130 transmits a response to wallet provider 140 identifying that the request failed.

If the validation is successful, at block 818, secure cloud system 130 generates and transmits a request to the issuer vault system that corresponds to the issuer identifier specified in the request received from the wallet provider 140. In an example scenario, the request comprises information sufficient for the issuer vault to identify the particular account to which the request is relevant. In an example situation, the request may comprise: a wallet provider identifier identifying the virtual wallet service provider from which the request originated; a wallet instance identifier identifying an instance of a virtual identifier associated with a customer; and an account reference number corresponding to a particular payment card.

At block 820, issuer vault system 120 validates the request and the information specified in the request and may apply authorization rules to determine whether or not to generate the requested payment item. With respect to validating the request, issuer vault 120 may confirm by searching its computing memory that the information in the request is valid. Issuer vault 120 may also determine if the requested payment is authorized given the circumstances. For example, in a potential embodiment, issuer vault 120 may search computing memory to determine whether or not the card associated with the account reference number is active. If issuer determines that the request is not valid or should not be filled, issuer vault system 120 will prepare to communicate an error.

In the instance where the request is determined to be valid and authorized, at block 822, issuer vault system 120 generates the one or more payment items. Issuer vault system 120 generates payment items so that the payment items correspond to formatting used for the actual account number. As discussed above in connection with FIG. 4, where the account numbers are credit or debit cards, issuer vault system 120 generates payment items that conform to track 1 and/or track 2 credit card data and comprise a temporary identification number. Issuer vault system 120 updates data storage 224 in computing memory to reflect the new payment item. More particularly, issuer vault system 120 updates computing memory, which may comprise a database, to include the generated at least one payment item and data identifying a relationship to the identified account. In an example embodiment, issuer vault system 120 may store in a database: the payment item; a payment item identifier uniquely identifying the payment item; a payment item expiration date identifying a date after which the payment item is no longer valid; a wallet provider identifier identifying a virtual wallet service provider; a wallet instance identifier identifying an instance of a virtual identifier associated with a customer; an issuer identifier identifying an issuer of the generated at least one payment item; and an account reference number. In an example scenario, the wallet provider identifier may identify wallet provider 140 and the issuer identifier identifies issuer vault system 120. The data regarding a payment identifier is stored with a relation to the primary account number to which the payment item relates.

Issuer vault system 120 may further store in its database information specifying limitations regarding the use of the particular payment item. For example, the database may be updated to comprise information that specifies the payment item may only be used for transactions prior to a particular date or time. Likewise, the database may be updated to reflect that the payment item may only be used for transactions up to a certain dollar limit. Furthermore, the database may be updated to indicate the payment item may only be used in transactions by a particular mobile device such as one with a particular unique identifier or device fingerprint. Still further, the database may be updated with information indicating the payment item may only be used in transactions in a particular geographic area.

At block 824, issuer vault system 120 transmits a response to the request for a payment item. The response may be an error where the request did not meet the validation processing. Where issuer vault system 120 generated one or more payment items in response to the request, the response comprises: the generated at least one payment item, the payment item identifier uniquely identifying the payment item; the payment item expiration date identifying a date after which the payment item is no longer valid; a wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card. The payment item and the request to provision it are transmitted over secure network to secure cloud system 130.

At bock 826, secure cloud system 130 validates the request and the contents of the request. For example, secure cloud system 130 may check the message content to determine that all of the data items that it expects in a pull provisioning request have been included and that they are valid values. In an example scenario, secure cloud system 130 may have stored in computing memory 234 data identifying valid values for a wallet provider identifiers and issuer identifiers, and a mapping showing established relationships between wallet provider identifiers and issuer identifiers noting entities. Secure cloud system 130 searches the data in its database and compares the received data to identify whether or not the data is valid and whether secure cloud system 130 is able to perform the requested pull operation. If not, secure cloud system 130 generates and transmits a communication indicating there has been an error and identifying the reason for the error.

Assuming secure cloud system 130 has validated the request, secure cloud system 130 generates and transmits a request to wallet provider 140 to add the payment item to the wallet instance identified in the request. In an example embodiment, secure cloud system 130 generates and transmits a request that comprises the following data: the generated at least one payment item; the payment item identifier uniquely identifying the payment item; the payment item expiration date identifying a date after which the payment item is no longer valid; a wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card.

At block 828, wallet provider system 140 validates the request and the contents of the request. For example, wallet provider system 140 may check the message content to determine that all of the data items that it expects in a pull provisioning request have been included and that they are valid values. In an example scenario, wallet provider system 140 may have stored in computing memory 244 data identifying valid values for wallet provider identifiers and issuer identifiers, and a mapping showing established relationships between wallet provider identifiers and issuer identifiers noting entities. Wallet provider system 140 searches the data in its database and compares the received data to identify whether or not the data is valid and whether wallet provider system 140 is able to perform the requested pull operation. If not, wallet provider system 140 generates and transmits a communication indicating there has been an error and identifying the reason for the error.

Assuming wallet provider 140 has validated the request, wallet provider 140 updates its computing memory to indicate the newly generated payment item has been provisioned and assigned to the wallet instance identified in the request. More particularly, wallet provider 140 may update data store 244 to associate the following information with the wallet instance identified by the wallet instance identifier: the generated at least one payment item; the payment item identifier uniquely identifying the payment item; the payment item expiration date identifying a date after which the payment item is no longer valid; the wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card. In addition to updating its network database to indicate a payment item has been received, wallet provider 140 may transmit the payment item and related data to user device 246 where it may be stored on the device.

At block 832, wallet provider 140 prepares and transmits a response to secure cloud 130. The response may be an error message identifying the reason that the requested pull provisioning was ineffective. Alternatively, the response may generate and transmit a response indicating the pull provisioning was effective. The response may comprise information identifying the particular provisioning request that was forwarded to wallet provider 140. For example, the response may comprise the following information: the wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card.

At block 834, secure cloud 130 receives the response and uses the issuer identifier to identify which issuer vault to which to forward the response. More particularly, secure cloud 130 retrieves the issuer identifier from the response and uses it to generate and forward the response to the appropriate issuer vault. The forwarded response may comprise the following: the wallet provider identifier identifying a virtual wallet service provider; the wallet instance identifier identifying an instance of a virtual identifier associated with a customer; the issuer identifier identifying an issuer of the generated at least one payment item; and the account reference number identifying a specific payment card At block 836, issuer vault system 120 receives the response from secure cloud 130 and updates its computing memory to reflect the response. If the response indicates that the provisioning was unsuccessful, issuer vault system 120 updates its memory to indicate the generated payment item has not been provisioned. If the response indicates the provisioning was successful, issuer vault system 120 updates its memory to indicate the generated payment item has been provisioned.

Purchase Payment Processing

Figure 9:
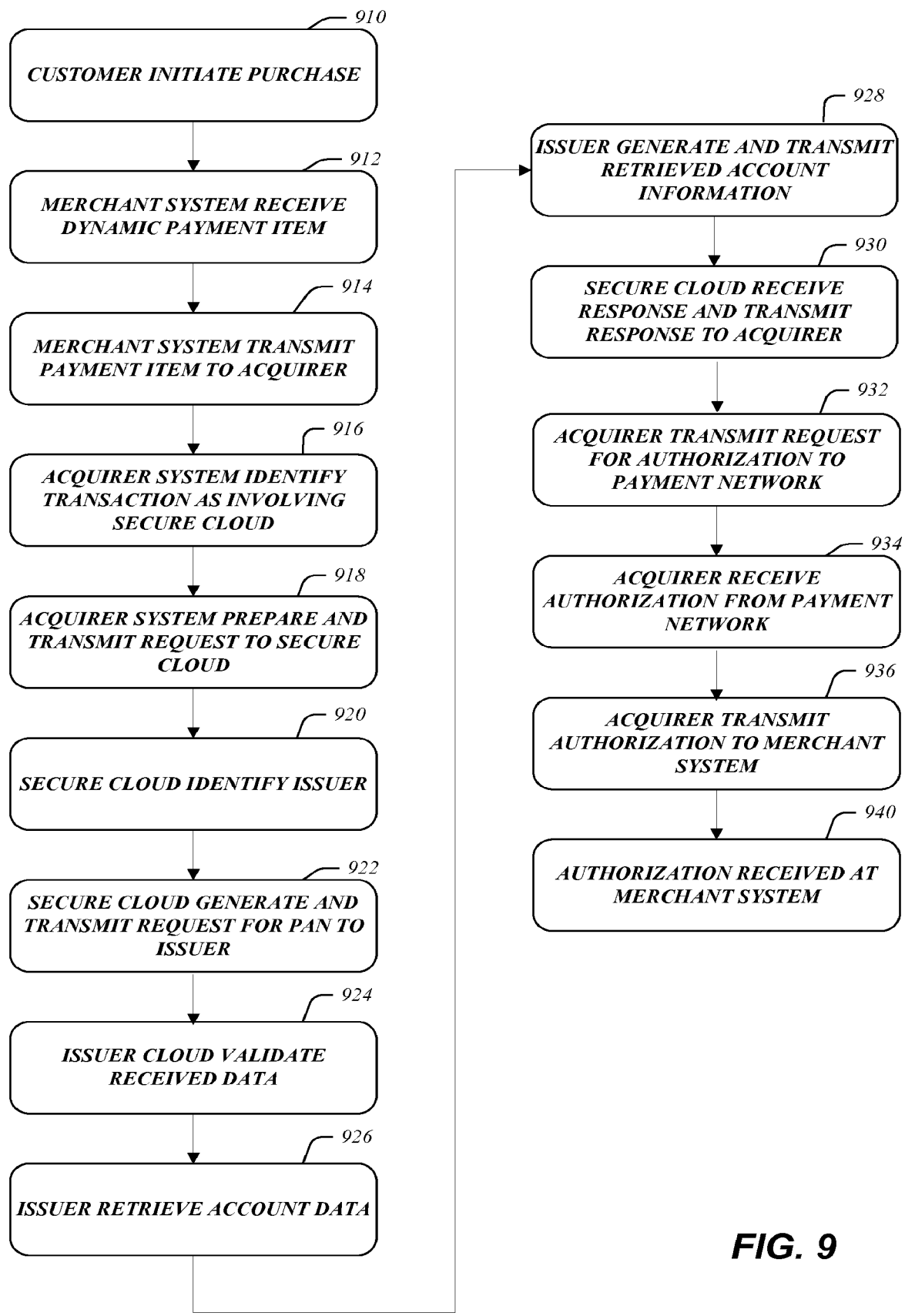
FIG. 9 is a flow diagram of an example process for purchase transaction processing.

Once payment items have been provisioned to wallet provider service 140, consumers whose virtual wallet accounts have been provisioned with payment items may use those payment items to pay for goods and services. FIG. 9 provides a flow chart of processing performed in connection with a payment transaction. As shown, at block 910, a customer initiates a purchase transaction. For example, a consumer may wish to purchase some goods at a convenience store.

At block 912, the consumer communicates one of his or her payment items to the merchant's point of sale system 160. The consumer may communicate the payment item to the merchant system 160 by any suitable means. In an example scenario, the consumer may have previously downloaded a payment item to his or her mobile device and may use the device to communicate, perhaps wirelessly, to the merchant system. In an example, embodiment, device 246 may be used to display the payment item information in some manner so that it can be communicated to merchant system 150. For example, the consumer's mobile device 246 may display a bar code or QR code which has encoded therein the payment item information. Merchant point of sale system 150 may scan the bar code or QR code to retrieve the payment item information. In an alternate embodiment, the merchant point of sale system 150 may request and receive the payment item directly from wallet provider 140 rather than via device 246.

In an example embodiment, at the time of the consumer interfacing with merchant system 150 to initiate the transaction, data may be collected about the consumer's mobile device 246 or the location of the transaction so that the data may be used later during an authorization process. In an example scenario, during the consumer transaction, an identifier associated with the consumer's mobile device 246 may be collected by merchant system 160. The mobile device identifier may be any information associated with the device that provides the capability to uniquely identify the device. In an example scenario, the mobile device identifier may be an identifier that has been assigned to the phone by a manufacturer of the mobile device 246 or a component within the device such as a processor. In another example scenario, a device fingerprint for mobile device 246 may be collected. A device fingerprint is information that is generated about or from the hardware and software of a device and which may be used to distinguish that device from others. For example, the device fingerprint may reflect specific processor on mobile device 246, the specific operating system running the device, the screen size, and the version of installed software and plug ins. In additional scenario, the location of the device or transaction may be collected. Any type of location information may be collected including, for example, a postal address, a zip code, a city or state, or a latitude/longitude pair.

At block 914, merchant system 150 generates and transmits an authorization request. The authorization request may comprise any data that may be required by subsequent systems to evaluate whether the transaction should be authorized. In an example embodiment, the request for authorization may comprise: the payment item which may comprise data formatted consistent with track 1 and/or track 2 credit card data; a transaction reference number that identifies the transaction to which the request applies; transaction date and time; transaction amount; and a transaction currency type. In an example scenario, the data collected about mobile device 246 such as any information identifying the device or the location of the device may also be included in the authorization request. In an example scenario, the payment item data that is communicated may comprise only a portion of the payment item such as, for example, the temporary identification number. The authorization request may be communicated by payment processor system 160 to acquirer system 170.

At block 916, acquirer system 170 processes the received authorization request in order to determine the next step in processing. For example, acquirer system 170 evaluates the data provided with the request in order to determine whether processing may proceed directly to authorization network 180 or whether processing is first required at secure cloud system 130 and issuer vault system 120. In one potential scenario, acquirer computing system 170 identifies from the payment item data, which may be the temporary identification number, that the particular transaction requires further processing at the secure cloud system 130 prior to communicating the transaction to authorization network 180. More particularly, acquirer system 170 analyzes the received payment item data and determines that processing should be forwarded to secure could 130 for identification of the actual account number, e.g., the primary account number. In an exemplary scenario, acquirer system 170 may have stored in computing memory a database or listing of BIN's that require processing at secure cloud system 130. When acquirer system 170 retrieves data from the payment item, it retrieves data corresponding to the location of a BIN in track 1/track 2 formatting and the retrieved data to BINs stored in memory. Acquirer computing system 170 may identify a bank identification number (BIN) in the payment item data that indicates to acquirer system 170 that the payment item should be routed to secure cloud system 130.

At block 918, acquirer system 170 prepares and transmits a request to secure cloud system 130. The request may seek, for example, validation of the payment item and a return of the real primary account number that corresponds to the temporary identification number in the payment item. In an example embodiment, the request may comprise: an acquirer identifier uniquely identifying the acquirer system that generated the request; the payment item or a portion thereof such as the temporary identification number; the transaction reference number; the transaction date and time; the transaction amount; and the transaction currency type. In an example scenario, the data collected about mobile device 246 such as any information identifying the device or the location of the device may also be included in the request. In an example scenario, any data received from the merchant system 150 regarding mobile device 246 such as any information identifying the device or the location of the device may also be included in the request.

At block 920, secure cloud system 130 processes the payment item data received from acquirer system 170 to identify that the particular request should be transmitted to issuer vault system 120, which may be one of a plurality of different issuer vault systems. For example, in an illustrative scenario, secure cloud system 130 retrieves an issuer identification number (IIN) or BIN value from the payment item data and searches its database for one of a plurality of different issuer vaults that corresponds to the particular BIN. In an example scenario, secure cloud system searches its database and identifies that, based on the IIN or BIN, the request should be forwarded to issuer vault 120.

At block 922, secure cloud system 130 generates and transmits a request to the identified issuer vault 120. The request may comprise, for example, the information that was received from acquirer system 170.

At block 924, issuer vault system 120 validates the received data. For example, issuer vault system 120 confirms that it has received the data fields that are expected in a request related to transaction processing.

At block 926, issuer vault system 120 retrieves the account data corresponding to the request and determines whether the requested transaction is authorized. More particularly, issuer vault system 120 uses the payment item data, and in particular the temporary identification number, to identify the corresponding account in the issuer vault system database 224. Issuer vault system 120 identifies in the database the real account number corresponding to the payment item/temporary identification number. In an example embodiment wherein the account is a credit card account, the real account number may be the primary account number (PAN).

Issuer vault system 120 may also search the database for any limitations that may restrict use of the particular payment item. For example, the database may comprise information indicating that the account or user device to which the payment item has been provisioned has been compromised in some manner such as having been lost or stolen. Similarly, the database may indicate whether or not the payment instrument or card corresponding to the payment item has been lost or stolen. The database may comprise information that specifies the payment item may only be used for purchases by a particular device as noted by a device identifier or a device fingerprint, and/or may only be used for transactions within a particular geographic area. Still further, the database may comprise information that specifies the payment item may only be used in transactions up to a particular maximum dollar amount. The database may also comprise information that specifies the payment item may only be used for transactions prior to a particular expiration date or time. Still further, the database may comprise information specifying the payment item may be used in a maximum number of payment transactions. Where limits are imposed on the number of transactions, the database may have stored therein for each payment item (and temporary identification number) the number of transactions in which the payment item has been used. Similarly, wherein limits are imposed on the dollar amount of transactions in which a payment item may be used, the database may have stored therein for each payment item (and temporary identification number) the dollar amount of transactions in which the payment item has been used.

Upon identifying any limitations in the database, issuer vault system 120 compares the received transaction data to determine whether it satisfies the limitations specified in the database. For example, issuer vault system 120 uses the data in the database to determine whether the mobile device to which the payment item (including temporary identification number) has been compromised (lost or stolen). Likewise, issuer vault system 120 may use the database data to determine whether the instrument, i.e., credit or debit card account, has been compromised (lost or stolen). Issuer vault system 120 may also determine whether or not the requested transaction would cause any limits for use of the payment item to be exceeded by the transaction. For example, issuer vault system 120 may compare the number of transactions in which the payment item (and temporary identification number) has been used in (including that requested) with a maximum number that is specified in the database. Similarly issuer vault system 120 may compare the total dollar amount of the transactions in which the payment item (and temporary identification number) has been used in (including that requested) with a maximum number that is specified in the database. Similarly, issuer vault system 120 may determine whether or not the transaction took place after a date or time specified in the database. Still further, issuer vault system 120 may determine whether or not the requested transaction was made by a device with a device identifier or fingerprint matching those stored in the database, and/or whether the requested transaction is in a geographic area corresponding to a geographic area identified in the database. If issuer vault system 120 determines that the requested transaction is inconsistent with any of the limits imposed by the data in database 224, the response to the request will indicate the transaction should be denied. The denial is forwarded in the response to the request and, ultimately, transmitted to merchant terminal 150.

Assuming issuer vault system 120 determines the requested transaction satisfies any limits specified in data 224, at block 928, issuer vault system 120 generates and transmits a response. Issuer vault system 120 retrieves from computing memory the actual account number corresponding to the payment item. In an example embodiment, where the payment item is formatted as track 1 formatted data, issuer vault system 120 returns from computing memory the primary account number (PAN) stored in memory and which is formatted as track 1 data. Where the payment item is formatted as track 2 formatted data, issuer vault system 120 returns from computing memory the primary account number stored in memory and which is formatted as track 2 data. The response generated by issuer vault system 120 may comprise any data suitable for further processing. In an example embodiment, issuer vault system 120 generates a response comprising, for example: an acquirer identifier identifying the acquirer from which the request was forwarded; the actual primary account number which may be formatted consistent with track 1 or track 2 data; the transaction reference number that was received in the request; the transaction date and time that was received in the request; and a response code.

At block 930, secure cloud system 130 receives the response and transmits the response to acquirer system 170. In an example scenario, secure cloud system 130 transmits the actual primary account number (PAN) corresponding to the temporary identification number.

At block 932, acquirer system 170 receives the response and retrieves from the response the real or actual account number from the response data. Acquirer system 170 prepares and transmits a request for authorization of the transaction where the request comprises the actual account information. For example the acquirer system 170 may generate and transmit a request for authorization to authorization network 180. The request may comprise a primary account number returned by issuer vault 120. The request for authorization may be communicated to any suitable authorization network such as, for example, a credit card authorization network such as Visa, MasterCard, Discovery, etc. Authorization network 180 implements its authorization processes which may include transmitting the actual account information to the bank issuer system 110.

At block 934, acquirer system 170 receives the authorization response from authorization network 180. The response indicates whether or not the transaction has been authorized by the authorization network.

At block 936, acquirer system 170 prepares and transmits a response for eventual receipt at merchant system 150. The response is formatted so as to remove the actual account number that was retrieved from issuer vault 120 at block 928. Acquirer system 170 formats the response so as to be consistent with the request that had been initiated by the merchant terminal. In an example scenario, acquirer system 170 formats the response to include the payment item data, e.g. temporary identification number, that was received in the original request rather than the primary account number that was retrieved from issuer vault system 120 and transmitted to authorization network 180. The response indicates whether or not the transaction that was specified in the original request has been authorized.

At block 940, the response is received at merchant system 150. Merchant system 150 either completes the sale or denies the transaction based upon the response.

Accordingly, it should be appreciated that in the example embodiment described in connection with FIG. 9, the actual payment account number is maintained within issuer vault 120 and only shared outside of vault system 120 for the limited purpose of allowing authorization processing. By limiting the number of entities that have access to the real account number, the opportunities for the account information to be compromised have been reduced.

Figure 10:
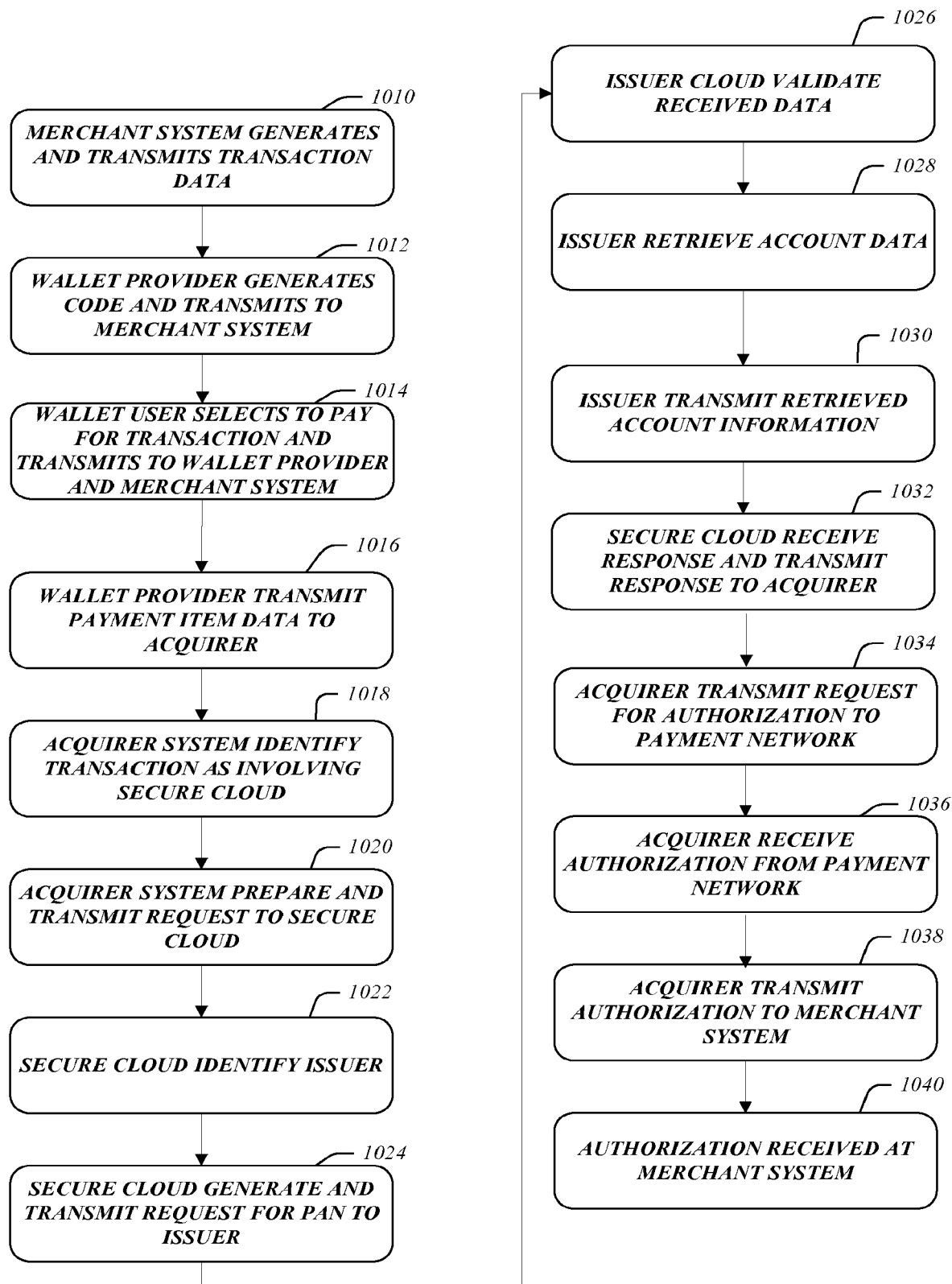
FIG. 10 is a flow diagram of an example process for purchase transaction processing.

As noted above in connection with block 912, at the time of a payment transaction, payment item data may be transmitted to merchant system 150 in any suitable manner. In the example embodiment described in connection with FIG. 9, payment item data may be communicated to merchant system 150 via scanning information into merchant system 150 from a mobile device having a representation of the payment item stored thereon. FIG. 10 is a diagram depicting a processing flow that involves an alternative process for communicating payment item data to merchant system 150.

At block 1010, in response to a consumer attempting to purchase a good or service, merchant system 150 generates transaction data. The transaction data may comprise, for example, a transaction reference number, a transaction data and time, a transaction amount, and a transaction currency. The transaction data is communicated to wallet provider system 140.

At block 1012, wallet provider system 140 receives the transaction data and in response generates an identifier code to correspond to the transaction. The identifier code may have any suitable format. In an example embodiment, the identifier code is formatted as a QR code, but might alternatively be, for example, a bar code, or even text. Wallet provider system 140 stores the transaction data and the generated identifier code in computing memory 244.

Wallet provider system 140 communicates the code to merchant system 150.

At block 1014, the customer uses mobile device 246 to retrieve the code that was transmitted to merchant system 150 and to indicate that the customer wishes to pay using his or her wallet provider account. In an example embodiment, the customer may scan a QR code that is displayed or generated by merchant system 150 and enter input into an application on device 246 that indicates the customer will pay using a particular account at wallet provider system 140. The customer input is communicated to merchant system 150 and wallet provider system 140.

At block 1016, wallet provider system 140 identifies a payment item corresponding to the wallet account specified by the customer and generates an authorization request for the transaction. The authorization request contains information similar to that described above in connection with block 914. The authorization request is transmitted for receipt at acquirer 170, which, at block 1018 identifies the transaction as involving the secure cloud 130. Processing of the authorization as noted in blocks 1020 through 1040 proceeds substantially as described above in connection with FIG. 9 and blocks 918 through 940. In the scenario that the payment item is determined to be authorized for the requested transaction, a communication may be received at both merchant system 150 and wallet provider system 140.

Figure 11:
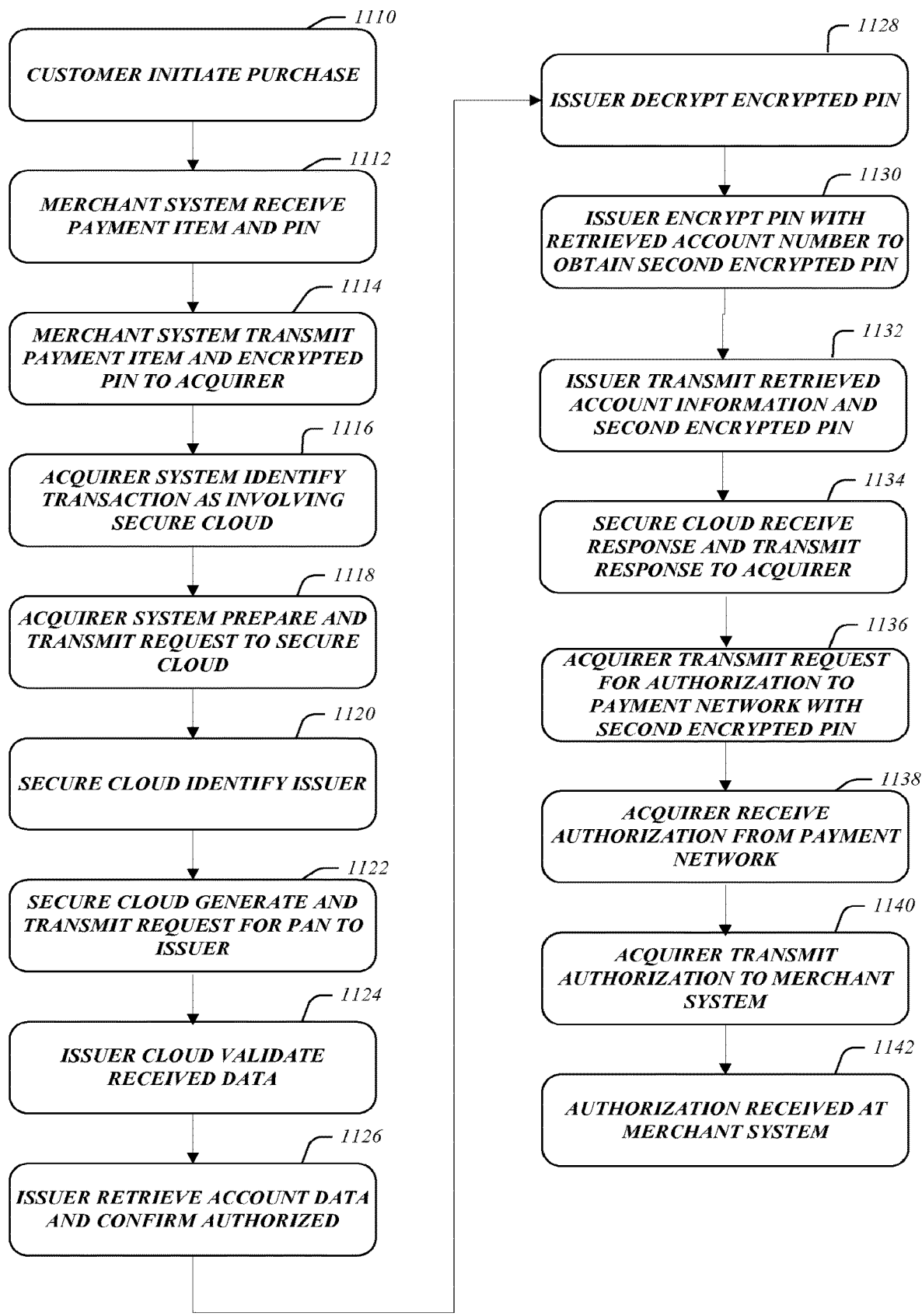
FIG. 11 is a flow diagram of an example process for purchase transaction processing.

Some financial accounts require that account owners enter personal identification numbers (PINs) when using the accounts for purchases. This is frequently the case when debit cards are used to make purchases. The processing consistent with that described above in connection with FIG. 9 may be used, with minor additions, to accommodate use of PINs. FIG. 11 depicts a flow chart of example processing where a PIN is entered during a payment transaction.

As shown, at block 1110, a customer initiates a purchase transaction. For example, a consumer may wish to purchase goods at a convenience store.

At block 1112, the consumer communicates one of his or her payment items to the merchant's point of sale system 160. The consumer may communicate the payment item to the merchant system 160 in any suitable means. In an example scenario, the consumer may have previously downloaded a payment item to his or her mobile device and the device may display the payment item information in some manner so that it can be communicated to merchant system 150. For example, the consumer's mobile device 246 may display a bar code or QR code which has encoded therein the payment item information. Merchant point of sale system 150 may scan the bar code or QR code to retrieve the payment item information. In an alternate embodiment, the merchant point of sale system 150 may request and receive the payment item from wallet provider 140.

In the embodiment of FIG. 11, the customer may be required to enter some form of identification information. In an example scenario, the customer may be required to enter a PIN. The PIN may be entered at merchant system 150 using, for example, a keypad.

At block 1114, merchant system 150 generates and transmits an authorization request. The authorization request may comprise any data that may be required by subsequent systems to evaluate whether the transaction should be authorized. In an example embodiment, the request for authorization may comprise: the payment item which may comprise data formatted consistent with track 1 and/or track 2 credit card data and, in particular, a temporary identification number; a transaction reference number that identifies the transaction to which the request applies; transaction date and time; transaction amount; and a transaction currency type. In the context of a scenario wherein the consumer or user was required to enter a PIN at the time of the transaction, merchant system 150 will also generate an encrypted PIN and include it in the authorization request. The PIN may be encrypted by merchant system 150 at the time that it is being entered. In an example scenario, the encryption may involve encrypting the PIN using an encryption algorithm that requires a second data input stream, which may be for example, all or part of the payment item. More particularly, the second data input may comprise all or portion of the temporary identification number. The authorization request may be communicated by payment processor system 160 to acquirer system 170.

At blocks 1116 through 1126 processing continues substantially as described above in connection with blocks 916 through 926 of FIG. 9. As described above in connection with blocks 916 through 926, the authorization request is received at acquirer system 170, forwarded to secure cloud system 130, and forwarded to issuer vault 120 which uses the payment data to retrieve the actual account number. One slight variation from the processing described in connection with blocks 916 through 926 is that in connection with processing wherein a PIN has been entered by a customer, the encrypted PIN data is communicated between systems with the other payment item data.

At block 1128, the payment item data and the encrypted PIN have been received at issuer vault system 120 and the actual account number has been retrieved from computing memory. In an example embodiment, issuer vault system 120 decrypts the encrypted PIN. In an example embodiment, the decryption may be performed in a specially secured device so as to protect the encryption algorithm as well as the decrypted PIN. The decryption algorithm may take as an input all or part of the payment item.

At block 1130, issuer vault system 120 encrypts the decrypted PIN, and uses the same algorithm that was originally used to encrypt the PIN at merchant system 150, but uses as an input in encrypting the PIN the actual account number. Accordingly, whereas the encryption of the PIN at merchant system 150 involved using the payment item as an input to the encryption algorithm, at issuer vault system 120 the actual account number is used as an input to the encryption algorithm.

At blocks 1132 through 1138 processing continues substantially as described above in connection with blocks 928 through 934 of FIG. 9. As described above in connection with blocks 928 through 934, the retrieved actual account information is forwarded from the secure cloud system 130 to the acquirer system 170, which uses the actual account information in its request to the authorization network 180. With respect to processing in connection with blocks 1132 through 1138, one slight variation from the processing described in connection with blocks 928 through 934 is that in connection with processing wherein a PIN has been entered by a customer, the encrypted PIN data (encryption of the actual account number) is communicated between systems with the other payment item data.

At block 1140, and assuming the requested transaction has been authorized, acquirer system 170 prepares and transmits a response for eventual receipt at merchant system 150. The response is formatted so as to remove the actual account number that was retrieved from issuer vault 120 at block 928. Acquirer system 170 formats the response so as to be consistent with the request that had been initiated by the merchant terminal. In an example scenario, acquirer system 170 formats the response to include the payment item data that was received in the original request rather than the primary account number that was retrieved from issuer vault system 120 and transmitted to authorization network 180. In one example embodiment, acquirer system 170 may also transmit the encrypted PIN with the response. In such a scenario, acquirer system 170 transmits the encrypted PIN as it was encrypted using payment item data and as it was received in the request generated by issuer vault 120. The response indicates whether or not the transaction that was specified in the original request has been authorized.

At block 1142, the response is received at merchant system 150. Merchant system 150 either completes the sale or denies the transaction based upon the response.

Accordingly, the described embodiments accommodate payment transaction processing for accounts that require use of identifying information such as PIN's. Alternative embodiments of the processing as depicted in FIG. 11 may involve relocating the decryption of the PIN and the re-encryption with the actual account number from the issuer vault 120 to either secure cloud system 130 or acquirer system 170. Indeed, the decryption of the PIN received from merchant terminal 150 and encryption of the PIN with the actual account number may be performed at any location within the system that otherwise accommodates the required authorization processing.

It should be appreciated that there are numerous variations of the processing that may take place in connection with processing a transaction. In one potential variation of the above described embodiments, issuer vault system 120 may selectively enforce the requirement that a PIN be used in connection with a payment item. For example, issuer vault system 120 may track and store in computing memory whether a payment item is being submitted for the first time in connection with a particular account. In the scenario wherein a payment item is the first submitted in connection with a particular account, issuer vault system 120 may require that a PIN be input in connection with the transaction. Issuer vault system 120 may further specify that subsequent transactions using the same account may not be required to have a PIN entered with the transaction.

In another variation of the above described embodiments, issuer vault system 120 may authorize transactions from a particular wallet wherein the payment item is no longer valid. For example, in a situation wherein data regarding a transaction is received at issuer vault system 120 and the payment item is no longer valid because it was previously used or has expired, issuer vault system 120 may authorize the transaction. For example, in the situation where issuer vault system 120 is attempting to provision one or more new tokens to the particular wallet provider account, issuer vault system 120 may authorize the request. In such a situation, issuer vault system 120 may apply a grace period during which transactions with expired payment items may be authorized.

Return Processing

The disclosed systems and methods support return processing as well. Generally, when a request is made to return an item that was purchased using a payment item as described above, the request is processed so as to update the various systems regarding the return and to accommodate existing return processing at an authorization network.

Figure 12:
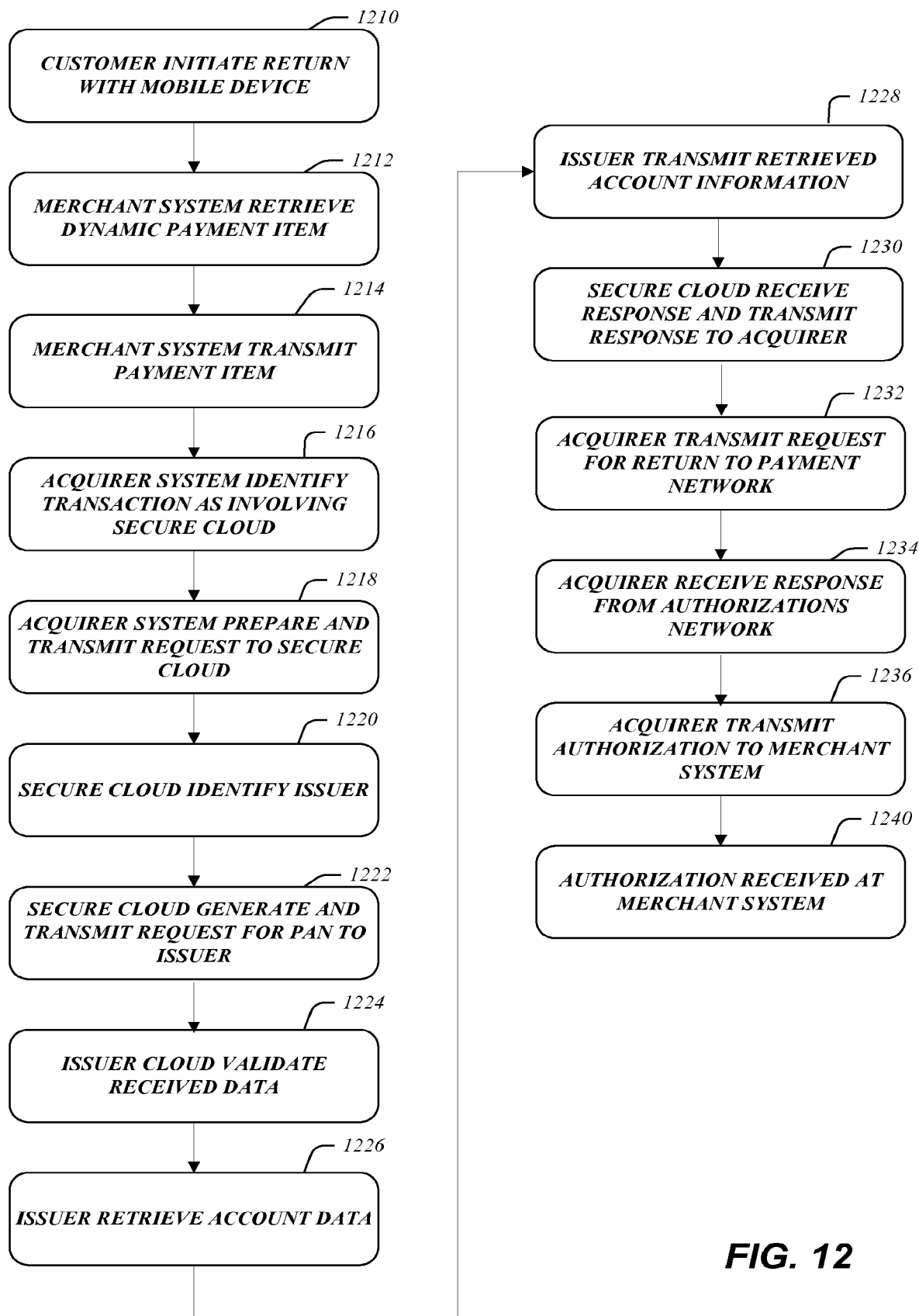
FIG. 12 is a flow diagram of an example process for return transaction processing.

FIG. 12 depicts a flow diagram of exemplary processing associated with a product return. As shown, at block 1210, a customer initiates a return of a previously purchased item.

At block 1212, the merchant's point of sale system 150 retrieves the payment item that was used in purchasing the good. There are several variations as to where the payment item information for the original purchase may be retrieved from. In one scenario, merchant system 150 may have the payment item stored in its own computing memory. In another scenario, the customer may use his or her mobile device 246 to identify that the returned purchase. Mobile device 246 communicates the return to virtual wallet system 140 which retrieves the relevant payment item from computing memory 244 and forwards it to merchant system 150.

At block 1214, merchant system 150 generates and transmits a return request. The return request may comprise any data that may be required by subsequent systems to evaluate whether the transaction should be authorized. In an example embodiment, the return request may comprise: the payment item (or a portion thereof) which may comprise data formatted consistent with track 1 and/or track 2 credit card data; a transaction reference number that identifies the transaction to which the request applies; transaction date and time; transaction amount; and a transaction currency type. The return request may be communicated by payment processor system 160 to acquirer system 170.

At block 1216, acquirer system 170 processes the received return request in order to determine the next step in processing. For example, acquirer system 170 evaluates the data provided with the request in order to determine whether processing may proceed directly to authorization network 180 or whether processing is first required at secure cloud system 130 and issuer vault system 120. In one potential scenario, acquirer computing system 170 identifies from the payment item data that the particular transaction requires further processing at the secure cloud system 130 prior to communicating the transaction to authorization network 180. More particularly, acquirer system 170 analyzes the received payment item data and determines that processing should be forwarded to secure could 130. In an exemplary scenario, acquirer system 170 may have stored in computing memory a database or listing of BIN's that require processing at secure cloud system 130. When acquirer system 170 retrieves data from the payment item (which may be the temporary identification number), it compares a BIN from the received payment item to those in the listing stored in memory. Acquirer computing system 170 may identify a bank identification number (BIN) in the payment item data that indicates to acquirer system 170 that the payment item should be routed to secure cloud system 130.

At block 1218, acquirer system 170 prepares and transmits a request to secure cloud system 130. The request seeks validation of the payment item and a return of the real primary account number that corresponds to the temporary identification number in the payment item. In an example embodiment, the request may comprise: an acquirer identifier uniquely identifying the acquirer system that generated the request; the payment item; the transaction reference number; the transaction date and time; the transaction amount; and the transaction currency type.

At block 1220, secure cloud system 130 processes the payment item data received from acquirer system 170 to identify that the particular request should be transmitted to issuer vault system 120, which may be one of a plurality of different issuer vault systems. For example, in an illustrative scenario, secure cloud system 130 retrieves a BIN value from the payment item and searches its database for one of a plurality of different issuer vaults that corresponds to the particular BIN. In an example scenario, secure cloud system searches its database and identifies that based on the BIN the request should be forwarded to issuer vault 120.

At block 1222, secure cloud system 130 generates and transmits a request to the identified issuer vault 120.

At block 1224, issuer vault system 120 validates the received data. For example, issuer vault system 120 confirms that it has received the data fields that are expected in a request related to transaction processing.

At block 1226, issuer vault system 120 retrieves the account data corresponding to the request. More particularly, issuer vault system 120 uses the payment item data, which may be the temporary identification number, to identify the corresponding account in the issuer vault system database 224. Issuer vault system 120 identifies in the database the real account number corresponding to the payment item/temporary identification number.

At block 1228, issuer vault system 120 generates and transmits a response. Issuer vault system 120 retrieves from computing memory the actual primary account number corresponding to the payment item. In an example embodiment, where the payment item is formatted as track 1 formatted data, issuer vault system 120 returns from computing memory the primary account number stored in memory and which is formatted as track 1 data. Where the payment item is formatted as track 2 formatted data, issuer vault system 120 returns from computing memory the primary account number stored in memory and which is formatted as track 2 data. The response generated by issuer vault system 120 may comprise any data suitable for further processing. In an example embodiment, issuer vault system 120 generates a response comprising, for example: an acquirer identifier identifying the acquirer from which the request was forwarded; the actual primary account number which may be formatted consistent with track 1 or track 2 data; the transaction reference number that was received in the request; the transaction date and time that was received in the request; and a response code.

At block 1230, secure cloud system 130 receives the response and transmits the response to acquirer system 170. In an example scenario, secure cloud system 130 transmits the actual primary account number (PAN) for the relevant account.

At block 1232, acquirer system 170 receives the response and retrieves from the response the real or actual account number from the response data. Acquirer system 170 prepares and transmits a request for return processing where the request comprises the actual account information. For example, the acquirer system 170 may generate and transmit a request for return processing to authorization network 180. The request may comprise the primary account number returned by issuer vault 120. The request may be communicated to any suitable authorization network such as, for example, a credit card authorization network such as Visa, MasterCard, Discovery, etc. Authorization network 180 implements its return processes which may include transmitting the actual account information to the bank issuer system 110.

At block 1234, acquirer system 170 receives the response from authorization network 180. The response indicates whether or not the return transaction has been authorized by the authorization network.

At block 1236, acquirer system 170 prepares and transmits a response for eventual receipt at merchant system 150. The response is formatted so as to remove the actual account number that was retrieved from issuer vault 120 at block 928. Acquirer system 170 formats the response so as to be consistent with the request that had been initiated by the merchant terminal. In an example scenario, acquirer system 170 formats the response to include the payment item data that was received in the original request rather than the primary account number that was retrieved from issuer vault system 120 and transmitted to authorization network 180. The response indicates whether or not the return transaction that was specified in the original request has been authorized.

At block 1240, the response is received at merchant system 150. Merchant system 150 either completes the return or denies the transaction based upon the response.

Adding Payment Instrument

Wallet provider systems 140 comprise data identifying a relationship between a user's virtual wallet account and the user's credit or debit card accounts, which may be referred to as instruments. The disclosed systems and methods may be used to establish a relationship between a virtual wallet and a user's financial accounts or instruments. Once a relationship has been established, payment items corresponding to a particular credit/debit card account or instrument may be provisioned to the user's wallet and used in financial transactions as described herein.

Figure 13:
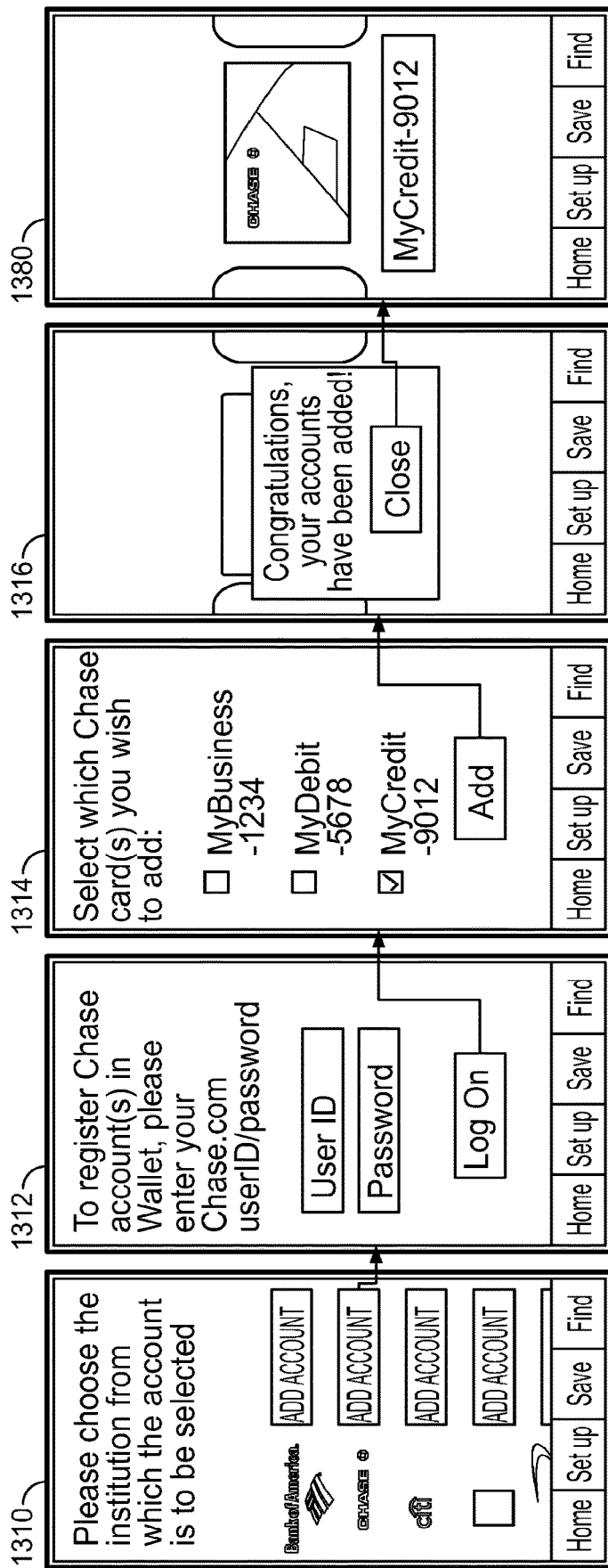
FIG. 13 is a diagram depicting example user interface samples presented during processing to add a payment account to a wallet account.
Figure 14:
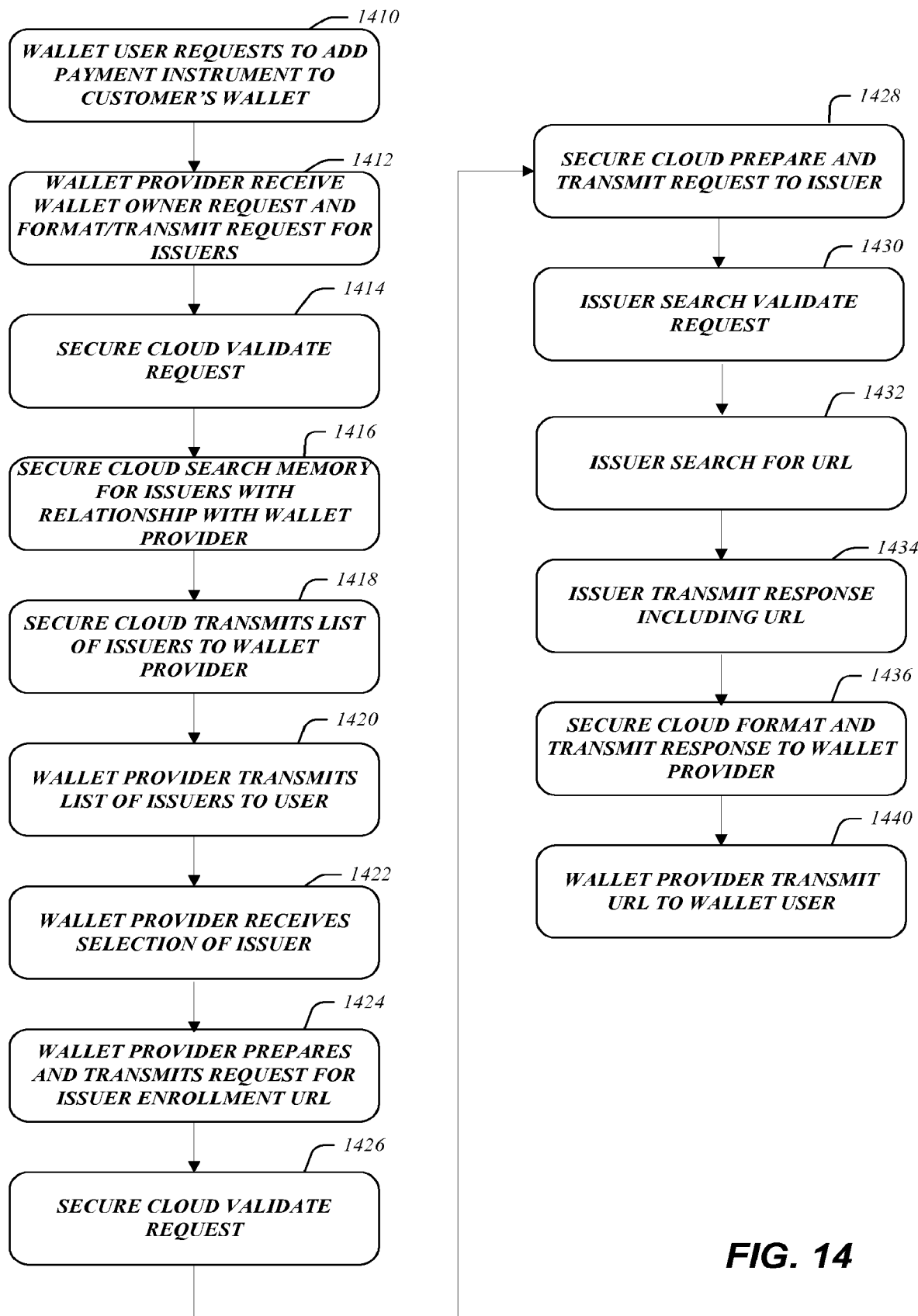
FIGS. 14 and 15 are diagrams depicting an example process for adding a payment account to a wallet account.
Figure 15:
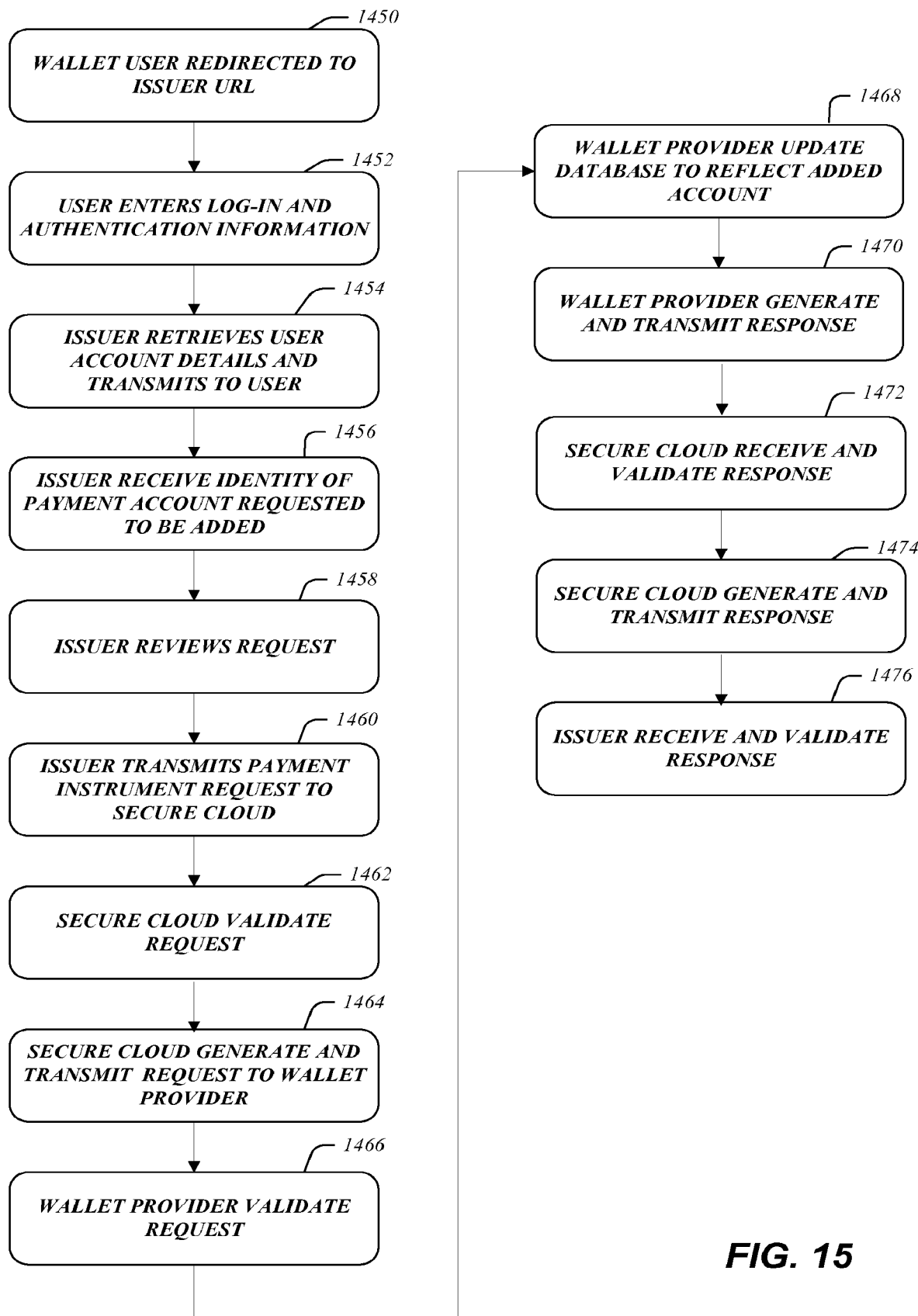

FIG. 13 depicts a series of example user interface screens that may be presented in the process of adding an instrument or account to a virtual wallet account. FIGS. 14 and 15 depict diagrams illustrating example processing associated with adding an instrument.

FIG. 14 depicts flow of example processing as may be encountered upon a virtual wallet service user requesting to add an instrument. It will be appreciated that the process of adding an instrument may be initiated from other than virtual wallet provider 140. For example, the process may alternatively be initiated by a user of a mobile banking application. Referring to FIG. 14, and specifically block 1410, a wallet user enters a request at his or her wallet account to add an account or instrument to their virtual wallet. At block 1412, wallet service provider system 140 receives the request and, in response, generates a response for a listing of issuers.

At block 1414, secure cloud system 130 receives the request and validates that the request is properly formatted and from a legitimate wallet provider system 140.

At block 1416, secure cloud system 130 searches its computing memory for issuers that support the particular wallet provider. For example, secure cloud system 130 may have stored in computing memory a listing of issuers that have established relationships with each wallet service provider. Secure cloud system 130 may use information in the request identifying the wallet provider system 140 to search its data for issuers associated with that particular wallet service provider system.

At block 1418, secure cloud system 130 formats and transmits a response comprising a list of issuers to wallet provider system 140. In an example embodiment, the response comprises information identifying each issuer that is available, and for each issuer, data identifying a name. In an example embodiment, the response comprises an issuer identifier for each issuer, and for each issuer identifier, an issuer name, and data corresponding to a logo for the particular issuer.

At block 1420, wallet provider 140 formats and transmits data for presentation in a user interface. The transmitted data comprises a listing of the issuers that are available to the user through the particular wallet provider system 140. Referring to FIG. 13, an example user interface is depicted at 1310. As shown, the user may be presented with a user interface with a number issuers listed therein. The listings may comprise a logo or similar identifier. The interface also comprises selectable items corresponding to each of the issuers.

At block 1422, wallet provider 140 receives a selection of a particular issuer. At block 1424, wallet provider 140 prepares and transmits a request for information by which the user may enroll an account held by the selected issuer. In an example embodiment, the request may be for a location of an application with which an account may be enrolled. In an example scenario, the request may be for a uniform resource locator (URL) at which an enrollment application may be accessed. The request may comprise information identifying: the wallet provider, e.g., a wallet provider identifier; information identifying the particular wallet account or instance of the wallet, e.g., wallet instance identifier; and information identifying the issuer, e.g., an issuer identifier.

At block 1426, secure cloud system 130 receives and validates the request. In an example embodiment, secure cloud system 130 validates that the request is properly formatted and comprises the necessary information. In an example embodiment, secure cloud system 130 validates that the particular wallet provider identified in the request is supported by the issuer identified in the request.

At block 1428, secure cloud system 130 prepares and transmits a request to issuer vault system 120. In an example scenario, the request may be for a uniform resource locator (URL) at which an enrollment application may be accessed. The request may comprise information identifying: the wallet provider, e.g., a wallet provider identifier; and information identifying the particular wallet account or instance of the wallet, e.g., wallet instance identifier.

At block 1430, issuer vault system 120 receives and validates the request. For example issuer vault system 120 may confirm that the request is properly formatted and search its memory to confirm that it comprises information for the identified wallet provider 140.

At block 1432, issuer vault system 120 searches its computing memory for the location of an application with which the user may link an instrument or account with a virtual wallet account. In an example scenario, issuer vault system 120 comprises a URL or other identifier that specifies where an application for performing the function may be accessed. Issuer vault system 120 retrieves the information and at block 1434 transmits the response including the retrieved information.

At block 1436, secure cloud system 130 receives the responsive information and, at block 1436, transmits the information to wallet provider 140.

At block 1440, wallet provider 140 receives the responsive information and transmits the location of the application to user device 246 which uses the information to access the particular application. The location may be the location of an application on issuer vault system 110 which may be a banking application.

Referring to FIG. 15, at block 1450, wallet user is redirected to software that provides the ability to link an instrument to a wallet account. The application may cause a user interface screen to be presented to the user at user device 246. The interface may request authentication and verification information such as, for example, a user identifier and a password. Referring to FIG. 13, the user may be presented with a user interface such as is identified by reference numeral 1312. In an example embodiment, the user interface may further request that the user enter an account or card number that the user wishes to add to the virtual account. The authentication and verification processing may be a several step process. For example, the processing may require that the user enter preliminary identification information, and in response, the system communicates a code or text to the user via an electronic medium such as email or text message. The processing may require that the user then enter the communicated code.

Referring back to FIG. 15, at block 1452, the user enters his or her credentials. In response, at block 1454, issuer vault system 120 retrieves account details corresponding to the entered log-in credentials. The retrieved information may comprise, for example, information identifying any instruments or accounts associated with the particular user. In an example scenario, the retrieved information may comprise account numbers for the particular user's credit card(s) and/or debit card(s). The retrieved instrument information is transmitted to the user. Referring to FIG. 13, a user interface screen such as that noted by reference numeral 1314 may be presented to the user.

At block 1456, issuer vault system 120 receives a selection from the user application identifying a particular account or instrument that has been selected for linking to the user's virtual wallet. At block 1458, issuer vault system 120 evaluates the request. For example, issuer vault system 120 may search its database to confirm that there are no limits that prevent linking the account.

At block 1460, issuer vault system 120 generates and transmits a request to add the selected payment instrument. The request may comprise any information that is needed to perform the linking. For example, the request may comprise: a wallet provider identifier; a wallet instance identifier identifying the particular account to which the instrument is to be linked; an issuer identifier identifying the issuer vault system 120; an account reference number assigned to the account that is being linked to the wallet account; and a status for the account reference number which may be, for example, active or pending activation. In a potential embodiment, the request may also include one or more payment items which are to be available via the account.

At block 1462, secure cloud 130 receives and validates the request. For example, secure cloud 130 may verify all of the expected fields have been received.

At block 1464, secure cloud 130 transmits the request to add the selected payment instrument to the wallet provider identified in the request from the issuer vault system 120.

At block 1466, wallet provider 140 validates the request. For example wallet provider 140 confirms that the request is in the proper format and all mandatory fields are present.

At block 1468, wallet provider 140 updates its records or database to indicate that the selected instrument is now associated with the user's virtual wallet account. In an example embodiment, wallet provider 140 may update its database to make an association between the account reference number of the selected account and the particular user's wallet account. The update may require updating data at wallet server 242, and may also comprise updating database at user device 246 as well depending upon the particular implementation of the virtual wallet.

Wallet provider 140 may also generate and transmit an interface providing acknowledgment that the instrument or account has been added to the user's virtual wallet. For example, wallet provider 140 may generate and transmit a series of user interface screens such as those noted by reference number 1316 and 1318 on FIG. 13.

At block 1470, wallet provider 140 generates and transmits a response acknowledging the request to add the payment instrument. The response may comprise information identifying that the payment instrument has been added to the virtual wallet. account In an example embodiment, the response may comprise: the wallet provider identifier for the wallet; the wallet instance identifier associated with the wallet account to which the instrument was added; the account reference number associated with the particular instrument, e.g., credit card, that was associated with the wallet; and a response code identifying that the instrument has been added to the wallet.

At block 1472, secure cloud 130 receives and validates the response. In an example embodiment, secure cloud 130 may validate that the response is in the proper form and contains the expected data items.

At block 1474, secure cloud generates and transmits a response. The response may comprise information identifying that the status of the request to add the payment instrument. In an example embodiment, the response may comprise: the wallet provider identifier for the wallet; the wallet instance identifier associated with the wallet account to which the instrument was added; the account reference number associated with the particular instrument, e.g., credit card, that was associated with the wallet; and a response code identifying that the instrument has been added to the wallet.

At block 1476, issuer vault system 120 receives and validates the response. In an example embodiment, secure cloud 130 may validate that the response is in the proper form and contains the expected data items. Issuer vault system 120 updates its database to indicate the association of the payment instrument with the wallet account has been confirmed.

It will be appreciated that once an instrument such as a credit card is associated with a virtual wallet, the processes of provisioning payment items relating to the instrument as discussed above may take place.

Device Status Processing

In several embodiments disclosed herein, payment items may be provisioned to mobile devices and payments initiated from the mobile device. Accordingly, physical possession of the mobile phone takes on added significance from the perspective of payment processing. For example, if a mobile device that has payment items provisioned thereon is stolen, the person who has stolen the device may use the payment items to make purchases. Even in the circumstance where a mobile device is lost, the person who eventually finds the device may have the capacity to make purchases. In the disclosed environment, specialized processing may be applied to the status of a mobile device so as to account for physical possession of a user's mobile device and thereby prevent the opportunity for fraud.

Figure 16:
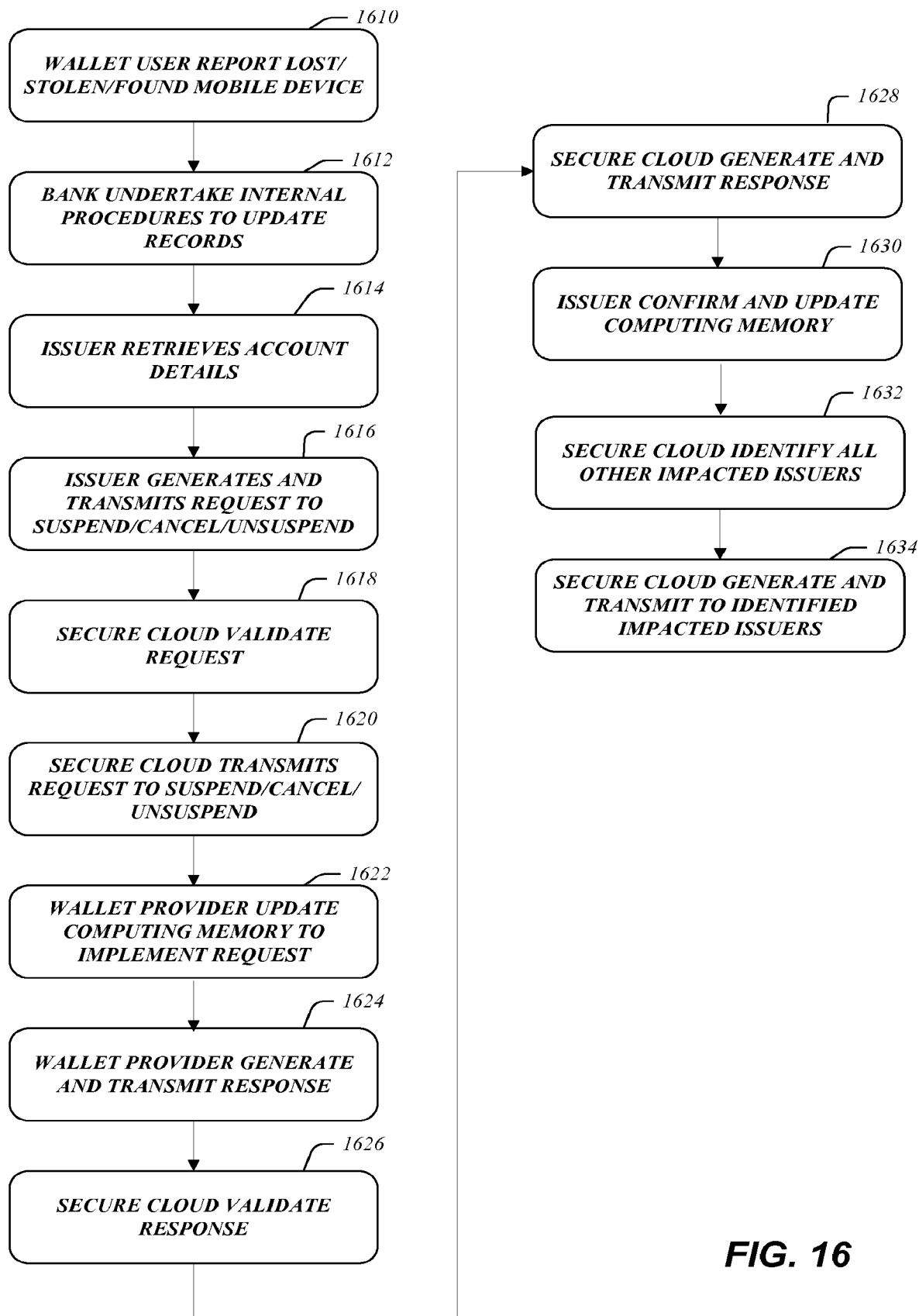
FIG. 16 is a flow diagram of an example process for updating status resulting from a lost, stolen, or found mobile device.

FIG. 16 depicts a flow diagram of example processing associated with missing or found mobile device. At block 1610, the operator of the mobile device 246 reports that his or her mobile device has been lost, stolen, or (when previously reported lost) found. The operator typically would report the status of mobile device 246 to the entity that issued the account to which the user's virtual wallet is linked. In an example scenario, the virtual wallet owner may contact the bank that had issued the credit or debit card to which the user's virtual wallet account is linked. The issuing institution may require that the owner of the card verify their identity before taking further action. For example, the institution may require entering a username and password. The process may further involve the issuer forwarding a code to the user using some electronic means such as an email or text message, and the user providing the code to the issuer.

At block 1612, assuming the user has been verified, issuer or bank system may undertake internal procedures to update its records. For example, in the instance of a lost or stolen device, the issuer may update systems 212, 214 to note the change in status which may result in further use of the corresponding accounts being prohibited. The procedures may also involve notifying issuer vault system 120 of the change in status of mobile device 246.

At block 1614, issuer vault system 120 searches computing memory 224 for account and payment item data corresponding to the lost/misplaced/found mobile device.

At block 1616, issuer vault system 120 generates and transmits a request to secure cloud 130 to update the status of the wallet instances corresponding to the particular mobile device. The request may comprise any information that may be needed in further processing to update the status of the mobile device. For example, the request may include information sufficient to identify the particular wallet service provider, the particular account impacted, and the change in status (i.e., whether the mobile device has been lost, stolen, or found). In an example scenario, the request may comprise the following data: a wallet provider identifier identifying a virtual wallet service provider; a wallet instance identifier identifying an instance of a virtual identifier associated with a customer; an account reference number; and a data item specifying the status of the relevant account (e.g., suspend, unsuspend, or cancel).

At block 1618, secure cloud system 130 validates that the request. For example, secure cloud 130 may confirm that the request is in the proper format and all of the received data items are valid.

At block 1620, secure cloud system 130 transmits a request to update status to mobile wallet provider system 140.

At block 1622, wallet provider system 140 updates its database records to reflect the current status of the relevant accounts. For example, wallet provider system 140 may update its database to indicate the relevant wallet is suspended (in the case of a lost device), unsuspended (in the case of a found device), or cancelled (in the case of a stolen device).

At block 1624, wallet provider system 140 generates and transmits a response to the request to update status. The response may comprise any information that is required for further processing. In an example embodiment, wallet provider system 140 generates and transmits: a wallet provider identifier identifying a virtual wallet service provider; a wallet instance identifier identifying an instance of a virtual identifier associated with a customer; an account reference number; and a data item specifying the status of the relevant device (e.g., suspend, unsuspend, or cancel).

At block 1626, secure cloud system 130 validates the response. For example, secure cloud 130 may confirm that all of the received data items are valid.

At block 1628, secure cloud system 130 generates and transmits a response to issuer vault system 120. The response may comprise any information that is required for further processing. In an example embodiment, wallet provider system 140 generates and transmits: a wallet provider identifier identifying a virtual wallet service provider; a wallet instance identifier identifying an instance of a virtual identifier associated with a customer; an account reference number; and a data item specifying the status of the relevant device (e.g., suspend, unsuspend, or cancel).

At block 1630, issuer vault system 120 updates its database to reflect that the wallet provider system 140 has updated its database in computing memory to reflect that the particular account has been suspended, unsuspended, or cancelled.

In an example embodiment, records reflecting a particular account, such as a credit card account, may exist at multiple different issuer vaults. In such a situation, secure cloud system 130 is responsible for notifying all other vaults regarding the change in status. Secure cloud 130 may have stored in computing memory data specifying for each wallet provider system 140, issuer vaults that have data stored therein corresponding to accounts of the wallet provider system 140. Accordingly, at block 1632, secure cloud system 130 searches its computing memory for additional issuer vaults that may have data for the particular mobile device. At step 1634, secure cloud system 130 generates and transmits a request to update at the identified issuer vaults information regarding the particular wallet provider account corresponding to the particular device.

It should be appreciated that in the situation that a credit or debit card is lost, stolen, or found, similar processing to that described in connection with FIG. 16 will take place. In other words, when a physical card is lost, stolen, or found, any virtual wallets that are associated with that card may need to be updated. A process such as described in FIG. 16 may be employed to update that status.

Secure Computing Architecture

Figure 17:
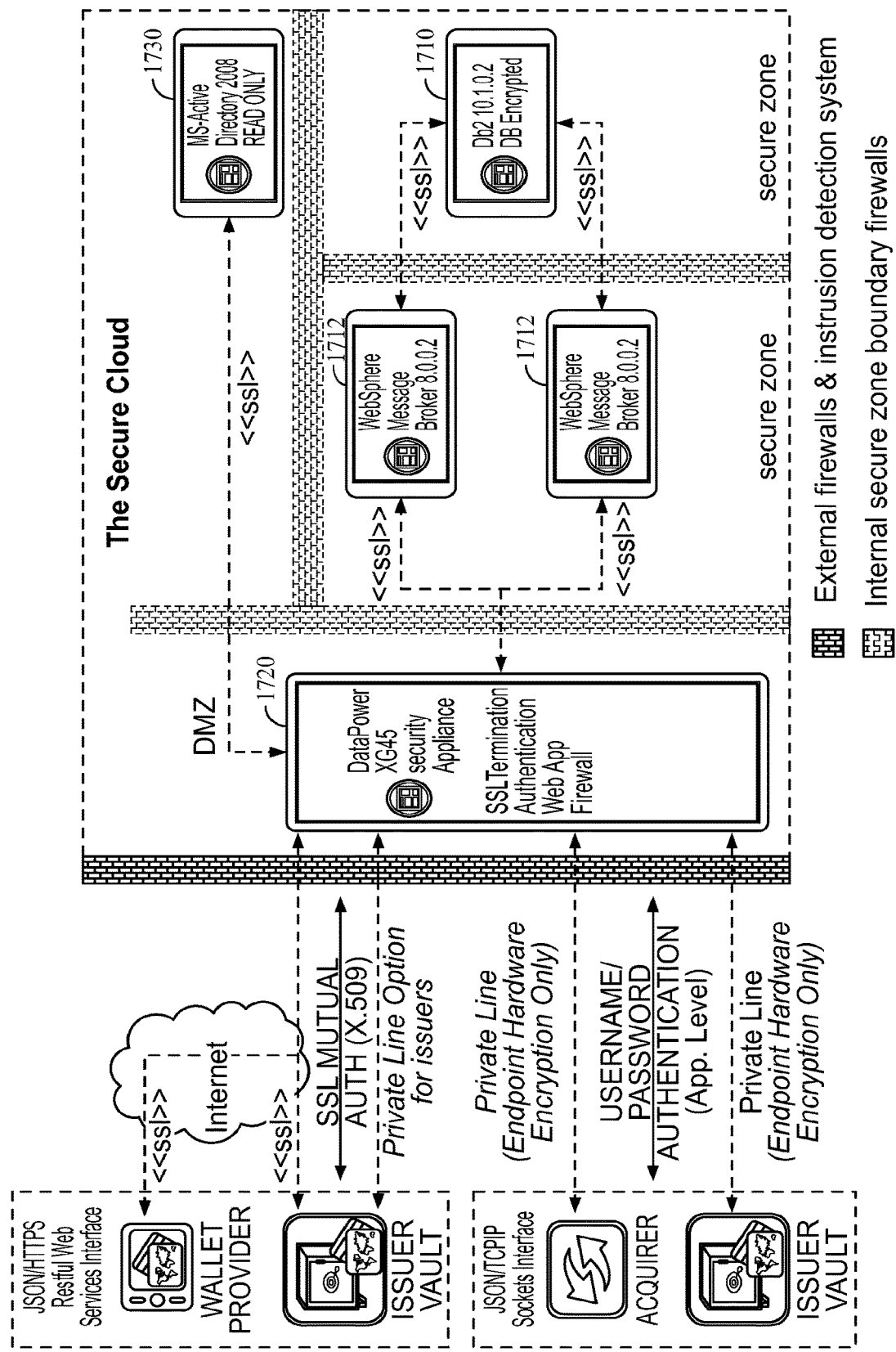
FIG. 17 is a diagram depicting an example architecture for secure communication between component systems.

FIG. 17 depicts an example secure architecture that may be employed at issuer vault 120. As shown, issuer vault system 120 may store its data such as data relating to user financial accounts in encrypted database 1710. Encrypted database 1710 may comprise any suitable software system such as, for example, DB2 database software. Encrypted database 1710 is positioned behind a firewall 1712 so as to prevent unauthorized access. Communications with encrypted database 1710 may use secure sockets and transmitted using an enterprise service bus 1712. In an example embodiment, enterprise service bus 1712 may be Websphere Message Broker.

Issuer vault 120 may comprise security appliance 1720 which operates as a secure gateway through which all communications are conducted including communications with external systems such as issuer vault 120, acquirer system 170, and wallet provider 140. Security appliance 1720 operates to block unwanted communication traffic and prevent unauthorized requests to encrypted database 1710. Security appliance 1720 may be any suitable device that provides the appropriate functionality. In an example embodiment, security appliance 1720 may be an IBM Data-Power security appliance.

In an example embodiment, secure cloud system 130 employs an active directory application 1730 to authenticate all users and computers that attempt to employ secure cloud resources. Accordingly, in an example scenario, when a system attempts to communicate with secure cloud 130, active directory 1730 authenticates the machine from which the request was made.

In an example embodiment, communications between issuer vault system 120 and secure cloud system 130 are made over a private communication line and use secure sockets layer in order to provide enhanced security. Communications between acquirer system 170 and secure cloud system 130 are likewise made over a private communication line using secure sockets layer protocol. Where the communications are over a private security line, secure cloud system 130 has stored thereon the MAC ID of the devices located at wallet provider system 140 and vault system 120 with which communications take place and can thereby authenticate the communication source.

In an example embodiment, communications between wallet provider system 140 and secure cloud system 130 may take place over public networks such as the Internet, but may use secure communication protocols such as HTTPS and secure sockets layer (SSL). In addition to protocol level security, communications between wallet provider system 140 and secure cloud system 130 may involve further authentication processing. For example, secure cloud system 130 and wallet provider system 140 may have stored therein IP addresses for the other system. Each of systems 130 and 140 may also have stored thereon certificates. When communications are made between systems 130 and 140, the communications may comprise the IP address for the system from which the communication was sent as well as the encrypted certificate. When the communication is received, the system validates that the IP address is that of the other system and decrypts the received certificate and compares the certificate to an expected value. Accordingly, another level of authentication is provided between secure cloud system 130 and wallet provider system 140.

Figure 18:
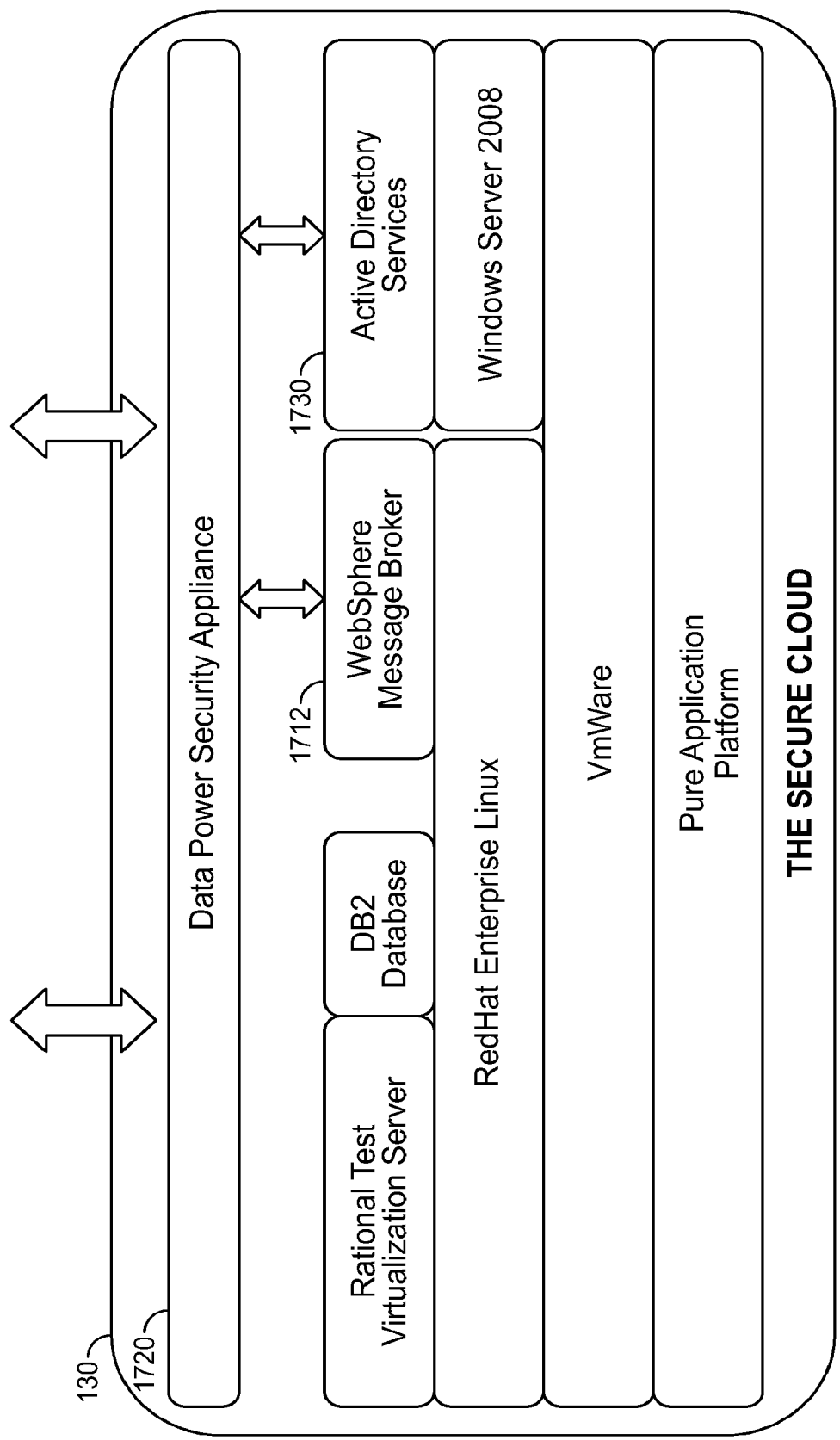
FIG. 18 is a diagram depicting an example software composition for use in systems and methods described herein.

FIG. 18 depicts an example software stack that may be employed on secure cloud system 130. As shown, secure cloud system 130 may comprise a combination of operating system software such as, for example, Linux and Windows Server. Virtualization software such as VMware is employed so as to allow the different operating systems to coexist on the same platform. As noted by the arrows at the top of FIG. 18, all communications into secure cloud system 130 are received at secure appliance 1720. It is through secure appliance 1720 that interactions with secure cloud system 130 take place. Further, and as noted by the arrows extending from secure appliance into secure cloud 130, communications between secure appliance 1720 and the applications located within secure cloud 130 require authorization through active director 1730 and take place over enterprise service bus 1712.

Example Computing Environment

Figure 19:
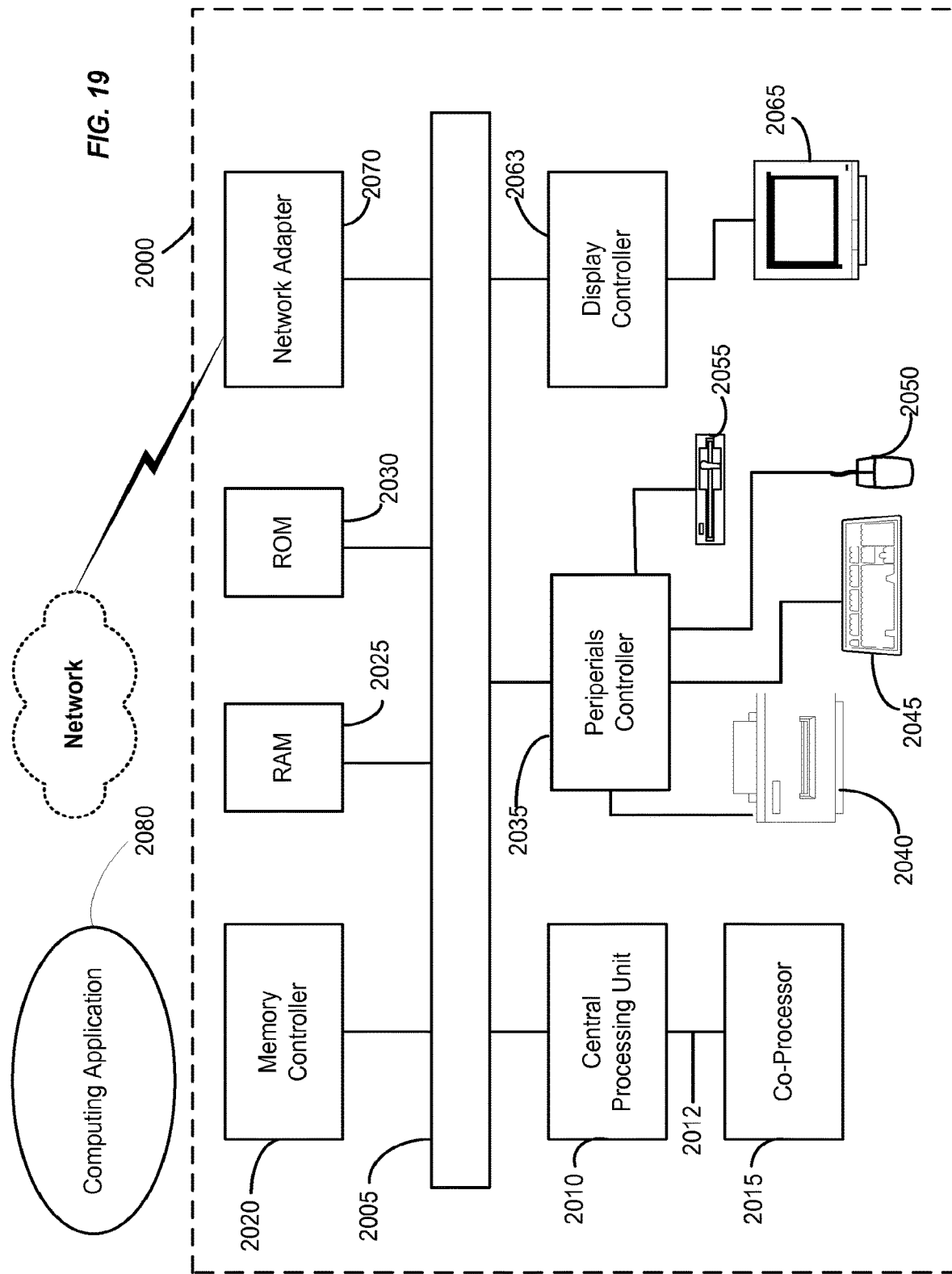
FIG. 19 is a diagram depicting example components of a computing system suitable for use in the systems and methods described herein.

FIG. 19 depicts a block diagram of an exemplary computing environment 2000 that may be used to implement the systems and methods described herein. For example, the computing system 2000 may be used to implement the issuer vault system 120, secure cloud system 130, wallet provider 140, acquirer system 170, merchant system 150, payment processor system 160, card network system 180, and bank issuer vault system 110. The computing system 2000 may be controlled primarily by computer readable instructions that may be in the form of software. The computer readable instructions may include instructions for the computing system 2000 for storing and accessing computer readable instructions themselves. Such software may be executed within a central processing unit (CPU) 2010 to cause the computing system 2000 to perform the processes or functions associated therewith. In many known computer servers, workstations, personal computers, or the like, the CPU 2010 may be implemented by micro-electronic chips CPUs called microprocessors.

In operation, the CPU 2010 may fetch, decode, and/or execute instructions and may transfer information to and from other resources via a main data-transfer path or a system bus 2005. Such a system bus may connect the components in the computing system 2000 and may define the medium for data exchange. The computing system 2000 may further include memory devices coupled to the system bus 2005. According to an example embodiment, the memory devices may include a random access memory (RAM) 2025 and read only memory (ROM) 2030. The RAM 2025 and ROM 2030 may include circuitry that allows information to be stored and retrieved. In one embodiment, the ROM 2030 may include stored data that cannot be modified. Additionally, data stored in the RAM 2025 typically may be read or changed by CPU 2010 or other hardware devices. Access to the RAM 2025 and/or ROM 2030 may be controlled by a memory controller 2020. The memory controller 2020 may provide an address translation function that translates virtual addresses into physical addresses as instructions are executed.

In addition, the computing system 2000 may include a peripherals controller 2035 that may be responsible for communicating instructions from the CPU 1010 to peripherals, such as, a printer 2040, a keyboard 2045, a mouse 2050, and data a storage drive 2055. The computing system 2000 may further include a display 2065 that may be controlled by a display controller 2063. The display 2065 may be used to display visual output generated by the computing system 2000. Such visual output may include text, graphics, animated graphics, video, or the like. The display controller 2063 may include electronic components that generate a video signal that may be sent to the display 2065. Further, the computing system 2000 may include a network adaptor 2070 that may be used to connect the computing system 2010 to an external communication network such as any of networks 202, 204, 206, and 205, described above in FIG. 1.

Accordingly, applicants have disclosed example embodiments of systems and computer-implemented methods for payment transaction processing. The disclosed systems and methods allow for consumers to use payment technologies such as virtual wallets, while limiting the distribution of the consumers' account data to a comparatively small number of systems. Consumers' account information including account numbers is maintained on a secure system which may be referred to as an issuer vault. The issuer vault generates payment items, which correspond to consumer account information and which replicate the structure of the account information but do not include consumers' actual account number. The payment items, rather than the actual account information, are communicated to on-line and mobile payment services for use by consumers in payment transactions. When a consumer uses a payment item in a payment transaction and the transaction undergoes authorization processing, the payment authorization network uses the payment item to request and receive the actual account information from the issuer vault. The authorization network uses the actual account information for the limited use of authorizing the transaction. Once the transaction has been authorized using the actual account information, the processing of the transaction continues using the payment item information rather than the actual account information. By controlling the systems that have access to actual account data, the disclosed systems and methods reduce the opportunity for consumers' data to be compromised.

It will be appreciated that while illustrative embodiments have been disclosed, the scope of potential embodiments is not limited to those explicitly set out. For example, while the system has been described with reference to particular scenarios wherein payment items associated with credit cards undergo sequence of provisioning and transaction processing, the envisioned embodiments extend beyond a particular sequence of processing and to other types of financial accounts.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems.

Those skilled in the art will appreciate that the disclosed embodiments may be provided as a subscription web based solution that anyone with an internet connection may log on and begin using the system. The potential embodiments may be developed and programmed in any web based technology platform. Alternatively, a potential embodiment may be implemented as a standalone application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer implemented method for payment processing, comprising:
   generating, by an issuer vault system, a temporary identification number formatted for use in a payment transaction;
   generating, by the issuer vault system, at least one payment item that includes at least the temporary identification number;
   transmitting, by the issuer vault system, the at least one payment item via a communications network to a wallet interface of a secure cloud system;
   transmitting, by an acquirer interface of the secure cloud system, the at least one payment item via a communications network to a cloud interface of an acquirer system;
   receiving, by the cloud interface of the acquirer system, the at least one payment item transmitted by the acquirer interface of the secure cloud system;
   transmitting, by a merchant interface of the acquirer system, an authorization request including a request for an account number for the at least one payment item, to a vault interface of the secure cloud system;
   receiving, by the vault interface of the secure cloud system from the merchant interface, the request for the account number, the request comprising the temporary identification number included in the at least one payment item;
   transmitting, by the vault interface of the secure cloud system to the secure cloud interface of the issuer vault system, the request for an account number, the request comprising the temporary identification number included in the at least one payment item;
   searching for and retrieving from a vault database, by a vault search server of the issuer vault system, the account number corresponding to the at least one payment item including the temporary identification number;
   transmitting, by the secure cloud interface of the issuer vault system to the vault interface of the secure cloud system, the retrieved account number corresponding to the at least one payment item including the temporary identification number;
   transmitting, by the acquirer interface of the secure cloud system to the cloud interface of the acquirer system, the retrieved account number corresponding to the at least one payment item including the temporary identification number;
   transmitting, by an authorization interface of the acquirer system, the authorization request, including the retrieved account number, to an authorization network;
   receiving, by the authorization interface of the acquirer system, a payment authorization response from the authorization network; and
   transmitting, by the merchant interface of the acquirer system, data indicating the payment is authorized, the data comprising at least a portion of the temporary identification number.

2. The computer implemented method of claim 1,
   wherein the issuer vault system generating at least one payment item comprises the issuer vault system generating a plurality of payment items; and
   wherein the issuer vault system transmits the at least one payment item by transmitting a plurality of payment items.

3. The computer implemented method of claim 1,
   further comprising the vault search server of the issuer vault system searching for and identifying an account requiring a payment item, and
   wherein the issuer vault system generating at least one payment item comprises the issuer vault system generating at least one payment item in response to identifying an account requiring a payment item.

4. The computer implemented method of claim 3, wherein the vault search server searching the vault database for and identifying an account requiring a payment item comprises the issuer vault system identifying that a threshold has been met, the threshold identifying a minimum number of payment items associated with an account.

5. The computer implemented method of claim 3, wherein the vault search server searching the vault database for and identifying an account requiring a payment item comprises the issuer vault system identifying that a threshold has been met, the threshold identifying a minimum number of payment items associated with a virtual wallet.

6. The computer implemented method of claim 3, wherein the issuer vault system comprises the issuer vault system updating the vault database to include the generated at least one payment item and data identifying a relationship to the identified account requiring a payment item.

7. The computer implemented method of claim 1, wherein the request for an account number further comprises a request for an acquirer identifier uniquely identifying an acquirer entity corresponding to the merchant interface of the acquirer system, a payment transaction number, a payment transaction date and time, and a payment transaction amount.

8. The computer implemented method of claim 7, wherein the issuer vault system comprises storing in computing memory for each payment item an indication of whether or not a corresponding account has been compromised.

9. The computer implemented method of claim 8, further comprising:
   the vault search server of the issuer vault system searching the vault database to identify whether the received temporary identification number is associated with an account that has been compromised; and the vault search server of the issuer vault system, upon determining the received temporary identification number is associated with an account that has been compromised, generates and transmits to a merchant system information identifying that any payment transaction involving the received temporary identification number should be denied.

10. The computer implemented method of claim 8, wherein the indication of whether a corresponding account has been compromised comprises an indication of whether a payment card corresponding to an account has been lost.

11. The computer implemented method of claim 8, wherein the vault database data includes an expiration date and expiration time for the payment item associated with the received temporary identification number.

12. The computer implemented method of claim 11, further comprising:
the issuer vault system comparing the received payment transaction date and time to the expiration date and time for the payment item stored in the vault database; and
the issuer vault system identifying a transaction associated with the received temporary identification number that should be denied.

13. A system for payment processing, comprising:
a memory storing a computer program; and
a computer processor, operating under control of the program stored in the memory, configured to:
generate, by an issuer vault system, a temporary identification number formatted for use in a payment transaction;
generate, by the issuer vault system, at least one payment item that includes at least the temporary identification number;
transmit, by the issuer vault system, the at least one payment item via a communications network to a wallet interface of a secure cloud system;
transmit, by an acquirer interface of the secure cloud system, the at least one payment item via a communications network to a cloud interface of an acquirer system;
receive, by the cloud interface of the acquirer system, the at least one payment item transmitted by the acquirer interface of the secure cloud system;
transmit, by a merchant interface of the acquirer system, an authorization request including a request for an account number for the at least one payment item, to a vault interface of the secure cloud system;
receive, by the vault interface of the secure cloud system from the merchant interface, the request for the account number, the request comprising the temporary identification number included in the at least one payment item;
transmit, by the vault interface of the secure cloud system to the secure cloud interface of the issuer vault system, the request for an account number, the request comprising the temporary identification number included in the at least one payment item;
search for and retrieve from a vault database, by a vault search server of the issuer vault system, the account number corresponding to the at least one payment item including the temporary identification number;
transmit, by the secure cloud interface of the issuer vault system to the vault interface of the secure cloud system, the retrieved account number corresponding to the at least one payment item including the temporary identification number;
transmit, by the acquirer interface of the secure cloud system to the cloud interface of the acquirer system, the retrieved account number corresponding to the at least one payment item including the temporary identification number;
transmit, by an authorization interface of the acquirer system, the authorization request, including the retrieved account number, to an authorization network;
receive, by the authorization interface of the acquirer system, a payment authorization response from the authorization network; and
transmit, by the merchant interface of the acquirer system, data indicating the payment is authorized, the data comprising at least a portion of the temporary identification number.

14. The system of claim 13, wherein the vault database comprises data identifying a number of payment transactions completed using the payment item associated with the received temporary identification number and data identifying a maximum number of payment transactions allowed using the payment item associated with the received temporary identification number.

15. The system of claim 14, wherein the computer processor is further configured to:
compare the number of payment transactions completed using the payment item associated with the received temporary identification number with the data identifying a maximum number of payment transactions allowed using the payment item associated with the received temporary identification number; and
identify a transaction associated with the received temporary identification number that should be denied based on exceeding the number of completed transactions.

16. The system of claim 13, wherein the issuer vault system comprises stored in memory: data identifying a number of payment transactions completed using the payment item associated with the received temporary identification number; and data identifying a maximum dollar amount allowed for payment transactions using the payment item associated with the received temporary identification number.

17. The system of claim 16, wherein the computer processor is further configured to:
compare the maximum dollar amount allowed for payment transactions using the payment item associated with the received data identifying a maximum dollar amount allowed for payment transactions using the payment item associated with the received temporary identification number; and
identify a transaction associated with the received temporary identification number that should be denied based on exceeding the maximum dollar amount.

18. The system of claim 13, wherein generating at least one payment item, each at least one payment item comprising a temporary identification number formatted for use in initiating a payment transaction, further comprises:
generating a first plurality of digits uniquely identifying an issuer entity that is responsible for an account corresponding to the at least one payment item;
generating a last plurality of digits corresponding to a last plurality of digits of an underlying primary account number; and
generating a middle plurality of digits positioned between the first plurality of digits and the last plurality of digits, wherein the middle plurality of digits are selected so that the temporary identification number is unique amongst those in use, and wherein the last digit of the middle plurality of digits is selected so that a requirement of a check digit operation performed on the temporary identification number is satisfied.

19. The system of claim 13, wherein receiving from the merchant interface of the acquirer system a request for an account number comprises receiving a geographic location associated with a mobile device initiating a payment transaction, and wherein the system further comprises the issuer vault system, in response to receiving a request for an account number, comparing the received geographic location with information stored at the issuer vault system.

20. A system for payment processing, comprising:

an issuer vault system comprising:
  a first processor; and
  a non-transitory memory containing instructions when executed by the first processor causes the first processor to perform the steps of:
    generating a temporary identification number formatted for use in a payment transaction;
    generating at least one payment item that includes the generated temporary identification number;
    transmitting the at least one generated payment item via a communications network to a wallet interface of a secure cloud system;
    receiving, by the secure cloud interface of the issuer vault system, a request for an account number transmitted by a vault interface of the secure cloud system;
    searching for and retrieving from a vault database, by a vault search server of the issuer vault system, the account number corresponding to the at least one payment item including the temporary identification number; and
    transmitting, by the secure cloud interface of the issuer vault system to the vault interface of the secure cloud system, the retrieved account number corresponding to the at least one payment item including the temporary identification number;

the secure cloud system comprising:
  a second processor; and
  a second non-transitory memory containing instructions when executed by the second processor causes the second processor to perform the steps of:
    transmitting, by an acquirer interface of the secure cloud system, the at least one payment item via a communications network to a cloud interface of an acquirer system;
    receiving, by the vault interface of the secure cloud system from a merchant interface, the request for the account number, the request comprising the temporary identification number included in the at least one payment item;
    transmitting, by the vault interface of the secure cloud system to the secure cloud interface of the issuer vault system, the request for an account number, the request comprising the temporary identification number included in the at least one payment item; and
    transmitting, by the acquirer interface of the secure cloud system to the cloud interface of the acquirer system, the retrieved account number corresponding to the at least one payment item including the temporary identification number;

the acquirer system comprising:
  a third processor; and
  a third non-transitory memory containing instructions when executed by the third processor causes the third processor to perform the steps of:
    receiving, by the cloud interface of the acquirer system, the at least one payment item transmitted by the acquirer interface of the secure cloud system;
    transmitting, by a merchant interface of the acquirer system, an authorization request including a request for an account number for the at least one payment item, to a vault interface of the secure cloud system;
    transmitting, by an authorization interface of the acquirer system, the authorization request, including the retrieved account number, to an authorization network; and
    transmitting, by the merchant interface of the acquirer system, data indicating the payment is authorized, the data comprising at least a portion of the temporary identification number for receipt at a merchant system; and an authorization network system comprising:
  a fourth processor; and
  a fourth non-transitory memory containing instructions when executed by the fourth processor causes the fourth processor to perform the step of:
    receiving, by the authorization interface of the acquirer system, a payment authorization response from the authorization network.

\* \* \* \* \*